US011887607B2

(12) United States Patent
Shlomot et al.

(10) Patent No.: US 11,887,607 B2
(45) Date of Patent: Jan. 30, 2024

(54) STEREO ENCODING METHOD AND APPARATUS, AND STEREO DECODING METHOD AND APPARATUS

(71) Applicant: HUAWEI TECHNOLOGIES CO., LTD., Guangdong (CN)

(72) Inventors: Eyal Shlomot, Long Beach, CA (US); Yuan Gao, Beijing (CN); Bin Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 183 days.

(21) Appl. No.: 17/551,451

(22) Filed: Dec. 15, 2021

(65) Prior Publication Data

US 2022/0108708 A1 Apr. 7, 2022

Related U.S. Application Data

(63) Continuation of application No. PCT/CN2020/096307, filed on Jun. 16, 2020.

(30) Foreign Application Priority Data

Jun. 29, 2019 (CN) ......................... 201910581386.2

(51) Int. Cl.
*G10L 19/008* (2013.01)

(52) U.S. Cl.
CPC .................................. *G10L 19/008* (2013.01)

(58) Field of Classification Search
CPC ..... G10L 19/008; G10L 19/032; G10L 19/13; G10L 19/02; G10L 19/04; G10L 19/18; G10L 21/038

(Continued)

(56) References Cited

U.S. PATENT DOCUMENTS 6,804,639 B1 * 10/2004 Ehara ...................... G10L 19/08 704/223
2003/0004709 A1 * 1/2003 Heikkinen .............. G10L 19/08 704/207

(Continued)

FOREIGN PATENT DOCUMENTS

CN 103247293 A 8/2013
CN 104347077 A 2/2015

(Continued)

*Primary Examiner* — Ahmad F. Matar
*Assistant Examiner* — Sabrina Diaz
(74) *Attorney, Agent, or Firm* — HUAWEI TECHNOLOGIES CO., LTD.

(57) ABSTRACT

A stereo encoding method and apparatus, and a stereo decoding method and apparatus are disclosed. The stereo encoding method includes: performing downmix processing on a left channel signal of a current frame and a right channel signal of the current frame, to obtain a primary channel signal of the current frame and a secondary channel signal of the current frame; and when determining that a frame structure similarity value falls within a frame structure similarity interval, performing differential encoding on a pitch period of the secondary channel signal by using an estimated pitch period value of the primary channel signal, to obtain a pitch period index value of the secondary channel signal, where the pitch period index value of the secondary channel signal is used to generate a to-be-sent stereo encoded bitstream.

20 Claims, 16 Drawing Sheets

(58) Field of Classification Search
USPC ............................................................ 381/23
See application file for complete search history.

(56) References Cited

U.S. PATENT DOCUMENTS

| | | | | |
|---|---|---|---|---|
| 2007/0033056 | A1 | 2/2007 | Herre et al. | |
| 2007/0238415 | A1* | 10/2007 | Sinha | G10L 21/038 455/66.1 |
| 2008/0255832 | A1* | 10/2008 | Goto | G10L 19/008 704/E21.001 |
| 2009/0319263 | A1* | 12/2009 | Gupta | G10L 25/90 704/229 |
| 2011/0029304 | A1* | 2/2011 | Chen | G10L 19/22 704/E11.001 |
| 2012/0284020 | A1* | 11/2012 | Chathoth | G10L 19/04 704/219 |
| 2013/0144611 | A1* | 6/2013 | Ishikawa | G10L 19/26 704/207 |
| 2013/0166287 | A1* | 6/2013 | Gao | G10L 25/90 704/207 |
| 2016/0005407 | A1* | 1/2016 | Friedrich | H04S 3/008 381/23 |
| 2018/0233154 | A1* | 8/2018 | Vaillancourt | G10L 19/06 |

FOREIGN PATENT DOCUMENTS

| | | | |
|---|---|---|---|
| CN | 105405445 | A | 3/2016 |
| CN | 107592937 | A | 1/2018 |
| CN | 108206021 | A | 6/2018 |
| CN | 108352162 | A | 7/2018 |
| CN | 109300480 | A | 2/2019 |
| CN | 109389985 | A | 2/2019 |
| CN | 112233682 | A | 1/2021 |
| JP | 2002023798 | A | 1/2002 |
| JP | 2011048279 | A | 3/2011 |

* cited by examiner

STEREO ENCODING METHOD AND APPARATUS, AND STEREO DECODING METHOD AND APPARATUS

CROSS-REFERENCE TO RELATED APPLICATIONS

This application is a continuation of International Application No. PCT/CN2020/096307, filed on Jun. 16, 2020, which claims priority to Chinese Patent Application No. 201910581386.2, filed on Jun. 29, 2019. The disclosures of the aforementioned applications are hereby incorporated by reference in their entireties.

TECHNICAL FIELD

This application relates to the field of stereo technologies, and in particular, to a stereo encoding method and apparatus, and a stereo decoding method and apparatus.

BACKGROUND

At present, mono audio cannot meet people's demand for high quality audio. Compared with mono audio, stereo audio has a sense of orientation and a sense of distribution for various acoustic sources, and can improve clarity, intelligibility, and a sense of presence of information, and therefore is popular among people.

To better transmit a stereo signal on a limited bandwidth, the stereo signal usually needs to be encoded first, and then an encoding-processed bitstream is transmitted to a decoder side through a channel. The decoder side performs decoding processing based on the received bitstream, to obtain a decoded stereo signal. The stereo signal may be used for playback.

There are many different methods for implementing the stereo encoding and decoding technology. For example, time-domain signals are downmixed into two mono signals on an encoder side. Generally, left and right channel signals are first downmixed into a primary channel signal and a secondary channel signal. Then, the primary channel signal and the secondary channel signal are encoded by using a mono encoding method. The primary channel signal is usually encoded by using a larger quantity of bits, and the secondary channel signal is usually encoded by using a smaller quantity of bits. During decoding, the primary channel signal and the secondary channel signal are usually separately obtained through decoding based on a received bitstream, and then time-domain upmix processing is performed to obtain a decoded stereo signal.

For stereo signals, an important feature that distinguishes them from mono signals is that the sound has sound image information, which makes the sound have a stronger sense of space. In a stereo signal, accuracy of a secondary channel signal can better reflect a sense of space of the stereo signal, and accuracy of secondary channel encoding also plays an important role in stability of a stereo sound image.

In stereo encoding, a pitch period, as an important feature of human speech production, is an important parameter for encoding of primary and secondary channel signals. Accuracy of a prediction value of the pitch period parameter affects the whole stereo encoding quality. In stereo encoding in time domain or frequency domain, a stereo parameter, a primary channel signal, and a secondary channel signal can be obtained after an input signal is analyzed. When an encoding rate is relatively high (for example, 32 kbps or higher), an encoder separately encodes the primary channel signal and the secondary channel signal by using an independent encoding scheme. In this case, a relatively large quantity of bits need to be used to encode a pitch period of the secondary channel signal. Consequently, a waste of encoding bits is caused, and bit resources allocated to other encoding parameters in stereo encoding are reduced, and overall stereo encoding performance is relatively low. Correspondingly, stereo decoding performance is also low.

SUMMARY

Embodiments of this application provide a stereo encoding method and apparatus, and a stereo decoding method and apparatus, to improve stereo encoding and decoding performance.

To resolve the foregoing technical problem, the embodiments of this application provide the following technical solutions.

According to a first aspect, an embodiment of this application provides a stereo encoding method, including: performing downmix processing on a left channel signal of a current frame and a right channel signal of the current frame, to obtain a primary channel signal of the current frame and a secondary channel signal of the current frame; and when determining that a frame structure similarity value falls within a frame structure similarity interval, performing differential encoding on a pitch period of the secondary channel signal by using an estimated pitch period value of the primary channel signal, to obtain a pitch period index value of the secondary channel signal, where the pitch period index value of the secondary channel signal is used to generate a to-be-sent stereo encoded bitstream. In this embodiment of this application, because differential encoding is performed on the pitch period of the secondary channel signal by using the estimated pitch period value of the primary channel signal, the pitch period of the secondary channel signal does not need to be independently encoded. Therefore, a small quantity of bit resources may be allocated to the pitch period of the secondary channel signal for differential encoding, and differential encoding is performed on the pitch period of the secondary channel signal, so that a sense of space and sound image stability of the stereo signal can be improved. In addition, in this embodiment of this application, a relatively small quantity of bit resources are used to perform differential encoding on the pitch period of the secondary channel signal. Therefore, saved bit resources may be used for other stereo encoding parameters, so that encoding efficiency of the secondary channel is improved, and finally overall stereo encoding quality is improved.

In a possible implementation, the method further includes: obtaining a signal type flag based on the primary channel signal and the secondary channel signal, where the signal type flag is used to identify a signal type of the primary channel signal and a signal type of the secondary channel signal; and when the signal type flag is a preset first flag and the frame structure similarity value falls within the frame structure similarity interval, configuring a secondary channel pitch period reuse flag to a second flag, where the first flag and the second flag are used to generate the stereo encoded bitstream. An encoder side obtains the signal type flag based on the primary channel signal and the secondary channel signal. For example, the primary channel signal and the secondary channel signal carry signal mode information, and a value of the signal type flag is determined based on the signal mode information. The signal type flag is used to identify the signal type of the primary channel signal and the signal type of the secondary channel signal. The signal type flag indicates both the signal type of the primary channel signal and the signal type of the secondary channel signal. A value of the secondary channel pitch period reuse flag may be configured based on whether the frame structure similarity value falls within the frame structure similarity interval, and the secondary channel pitch period reuse flag is used to indicate to use differential encoding or independent encoding for the pitch period of the secondary channel signal.

In a possible implementation, the method further includes: when determining that the frame structure similarity value falls outside the frame structure similarity interval, or when the signal type flag is a preset third flag, configure the secondary channel pitch period reuse flag to a fourth flag, where the fourth flag and the third flag are used to generate the stereo encoded bitstream; and separately encoding the pitch period of the secondary channel signal and a pitch period of the primary channel signal. The secondary channel pitch period reuse flag may be configured in a plurality of manners. For example, the secondary channel pitch period reuse flag may be the preset second flag, or may be configured to the fourth flag. The following describes a method for configuring the secondary channel pitch period reuse flag with an example. First, it is determined whether the signal type flag is the preset first flag; if the signal type flag is the preset first flag, whether the frame structure similarity value falls within the preset frame structure similarity interval is determined; and when it is determined that the frame structure similarity value falls outside the frame structure similarity interval, the secondary channel pitch period reuse flag is configured to the fourth flag. The secondary channel pitch period reuse flag indicates the fourth flag, so that a decoder side can determine to perform independent decoding on the pitch period of the secondary channel signal. In addition, it is determined whether the signal type flag is the preset first flag or the third flag, and if the signal type flag is the preset third flag, the pitch period of the secondary channel signal and the pitch period of the primary channel signal are directly encoded separately. That is, the pitch period of the secondary channel signal is independently encoded.

In a possible implementation, the frame structure similarity value is determined in the following manner: performing open-loop pitch period analysis on the secondary channel signal of the current frame, to obtain an estimated open-loop pitch period value of the secondary channel signal; determining a closed-loop pitch period reference value of the secondary channel signal based on the estimated pitch period value of the primary channel signal and a quantity of subframes into which the secondary channel signal of the current frame is divided; and determining the frame structure similarity value based on the estimated open-loop pitch period value of the secondary channel signal and the closed-loop pitch period reference value of the secondary channel signal. In this embodiment of this application, after the secondary channel signal of the current frame is obtained, open-loop pitch period analysis may be performed on the secondary channel signal, to obtain the estimated open-loop pitch period value of the secondary channel signal. Because the closed-loop pitch period reference value of the secondary channel signal is a reference value determined by using the estimated pitch period value of the primary channel signal, as long as a difference between the estimated open-loop pitch period value of the secondary channel signal and the closed-loop pitch period reference value of the secondary channel signal is determined, the frame structure similarity value between the primary channel signal and the secondary channel signal can be calculated by using the estimated open-loop pitch period value of the secondary channel signal and the closed-loop pitch period reference value of the secondary channel signal.

In a possible implementation, the determining a closed-loop pitch period reference value of the secondary channel signal based on the estimated pitch period value of the primary channel signal and a quantity of subframes into which the secondary channel signal of the current frame is divided includes: determining a closed-loop pitch period integer part loc_T0 of the secondary channel signal and a closed-loop pitch period fractional part loc_frac_prim of the secondary channel signal based on the estimated pitch period value of the primary channel signal; and calculating the closed-loop pitch period reference value f_pitch_prim of the secondary channel signal in the following manner: f_pitch_prim=loc_T0+loc_frac_prim/N; where N represents the quantity of subframes into which the secondary channel signal is divided. In this embodiment of this application, the closed-loop pitch period integer part and the closed-loop pitch period fractional part of the secondary channel signal are first determined based on the estimated pitch period value of the primary channel signal. For example, an integer part of the estimated pitch period value of the primary channel signal is directly used as the closed-loop pitch period integer part of the secondary channel signal, and a fractional part of the estimated pitch period value of the primary channel signal is used as the closed-loop pitch period fractional part of the secondary channel signal. Alternatively, the estimated pitch period value of the primary channel signal may be mapped to the closed-loop pitch period integer part and the closed-loop pitch period fractional part of the secondary channel signal by using an interpolation method. In this embodiment of this application, calculation of the closed-loop pitch period reference value of the secondary channel signal may not be limited to the foregoing formula.

In a possible implementation, the determining the frame structure similarity value based on the estimated open-loop pitch period value of the secondary channel signal and the closed-loop pitch period reference value of the secondary channel signal includes: calculating the frame structure similarity value ol_pitch in the following manner: ol_pitch=T_op−f_pitch_prim; where T_op represents the estimated open-loop pitch period value of the secondary channel signal, and f_pitch_prim represents the closed-loop pitch period reference value of the secondary channel signal. In this embodiment of this application, T_op represents the estimated open-loop pitch period value of the secondary channel signal, f_pitch_prim represents the closed-loop pitch period reference value of the secondary channel signal, and a difference between T_op and f_pitch_prim may be used as the final frame structure similarity value ol_pitch. Because the closed-loop pitch period reference value of the secondary channel signal is a reference value determined by using the estimated pitch period value of the primary channel signal, as long as the difference between the estimated open-loop pitch period value of the secondary channel signal and the closed-loop pitch period reference value of the secondary channel signal is determined, the frame structure similarity value between the primary channel signal and the secondary channel signal can be calculated by using the estimated open-loop pitch period value of the secondary channel signal and the closed-loop pitch period reference value of the secondary channel signal.

In a possible implementation, the performing differential encoding on a pitch period of the secondary channel signal by using an estimated pitch period value of the primary channel signal includes: performing secondary channel closed-loop pitch period search based on the estimated pitch period value of the primary channel signal, to obtain an estimated pitch period value of the secondary channel signal; determining an upper limit of the pitch period index value of the secondary channel signal based on a pitch period search range adjustment factor of the secondary channel signal; and calculating the pitch period index value of the secondary channel signal based on the estimated pitch period value of the primary channel signal, the estimated pitch period value of the secondary channel signal, and the upper limit of the pitch period index value of the secondary channel signal. The encoder side first performs secondary channel closed-loop pitch period search based on the estimated pitch period value of the secondary channel signal, to determine the estimated pitch period value of the secondary channel signal. The pitch period search range adjustment factor of the secondary channel signal may be used to adjust the pitch period index value of the secondary channel signal, to determine the upper limit of the pitch period index value of the secondary channel signal. The upper limit of the pitch period index value of the secondary channel signal indicates an upper limit value that the pitch period index value of the secondary channel signal cannot exceed. The pitch period index value of the secondary channel signal may be used to determine the pitch period index value of the secondary channel signal. After determining the estimated pitch period value of the primary channel signal, the estimated pitch period value of the secondary channel signal, and the upper limit of the pitch period index value of the secondary channel signal, the encoder side performs differential encoding based on the estimated pitch period value of the primary channel signal, the estimated pitch period value of the secondary channel signal, and the upper limit of the pitch period index value of the secondary channel signal, and outputs the pitch period index value of the secondary channel signal.

In a possible implementation, the performing secondary channel closed-loop pitch period search based on the estimated pitch period value of the primary channel signal, to obtain an estimated pitch period value of the secondary channel signal includes: performing closed-loop pitch period search by using integer precision and fractional precision and by using the closed-loop pitch period reference value of the secondary channel signal as a start point of the secondary channel signal closed-loop pitch period search, to obtain the estimated pitch period value of the secondary channel signal, where the closed-loop pitch period reference value of the secondary channel signal is determined based on the estimated pitch period value of the primary channel signal and the quantity of subframes into which the secondary channel signal of the current frame is divided. Closed-loop pitch period search is performed by using integer precision and downsampling fractional precision and by using the closed-loop pitch period reference value of the secondary channel signal as the start point of the secondary channel signal closed-loop pitch period search, and finally an interpolated normalized correlation is computed to obtain the estimated pitch period value of the secondary channel signal.

In a possible implementation, the determining an upper limit of the pitch period index value of the secondary channel signal based on a pitch period search range adjustment factor of the secondary channel signal includes: calculating the upper limit soft_reuse_index_high_limit of the pitch period index value of the secondary channel signal in the following manner: soft_reuse_index_high_limit=0.5+$2^Z$; where Z is the pitch period search range adjustment factor of the secondary channel signal, and a value of Z is 3, 4, or 5. In order to calculate the upper limit of the pitch period index of the secondary channel signal in differential encoding, the pitch period search range adjustment factor Z of the secondary channel signal needs to be first determined. For example, Z may be 3, 4, or 5. A specific value of Z is not limited herein, and a specific value depends on an application scenario.

In a possible implementation, the calculating the pitch period index value of the secondary channel signal based on the estimated pitch period value of the primary channel signal, the estimated pitch period value of the secondary channel signal, and the upper limit of the pitch period index value of the secondary channel signal includes: determining a closed-loop pitch period integer part loc_T0 of the secondary channel signal and a closed-loop pitch period fractional part loc_frac_prim of the secondary channel signal based on the estimated pitch period value of the primary channel signal; and calculating the pitch period index value soft_reuse_index of the secondary channel signal in the following manner: soft_reuse_index=(N*pitch_soft_reuse+pitch_frac_soft_reuse)−(N*loc_T0+loc_frac_prim)+soft_reuse_index_high_limit/M; where pitch_soft_reuse represents an integer part of the estimated pitch period value of the secondary channel signal, pitch_frac_soft_reuse represents a fractional part of the estimated pitch period value of the secondary channel signal, soft_reuse_index_high_limit represents the upper limit of the pitch period index value of the secondary channel signal, N represents a quantity of subframes into which the secondary channel signal is divided, M represents an adjustment factor of the upper limit of the pitch period index value of the secondary channel signal, M is a non-zero real number, * represents a multiplication operator, + represents an addition operator, and − represents a subtraction operator. Specifically, the closed-loop pitch period integer part loc_T0 of the secondary channel signal and the closed-loop pitch period fractional part loc_frac_prim of the secondary channel signal are first determined based on the estimated pitch period value of the primary channel signal. For details, refer to the foregoing calculation process. N represents the quantity of subframes into which the secondary channel signal is divided, for example, a value of N may be 3, 4, or 5. M represents the adjustment factor of the upper limit of the pitch period index value of the secondary channel signal, and M is a non-zero real number, for example, a value of M may be 2 or 3. Values of N and M depend on an application scenario, and are not limited herein.

In a possible implementation, the method is applied to a stereo encoding scenario in which an encoding rate of the current frame exceeds a preset rate threshold, where the rate threshold is at least one of the following values: 32 kilobits per second kbps, 48 kbps, 64 kbps, 96 kbps, 128 kbps, 160 kbps, 192 kbps, and 256 kbps. The rate threshold may be greater than or equal to 32 kbps. For example, the rate threshold may be 48 kbps, 64 kbps, 96 kbps, 128 kbps, 160 kbps, 192 kbps, or 256 kbps. A specific value of the rate threshold may be determined based on an application scenario. For another example, this embodiment of this application may not be limited to the foregoing rates. In addition to the foregoing rates, the rate threshold may be, for example, 80 kbps, 144 kbps, or 320 kbps. When the encoding rate is relatively high (for example, 32 kbps or higher), independent encoding is not performed on a pitch period of the secondary channel, an estimated pitch period value of the primary channel signal is used as a reference value, and bit resources are reallocated to the secondary channel signal, so as to improve stereo encoding quality.

In a possible implementation, a minimum value of the frame structure similarity interval is −4.0, and a maximum value of the frame structure similarity interval is 3.75; or a minimum value of the frame structure similarity interval is −2.0, and a maximum value of the frame structure similarity interval is 1.75; or a minimum value of the frame structure similarity interval is −1.0, and a maximum value of the frame structure similarity interval is 0.75. A maximum value and a minimum value of the frame structure similarity interval each have a plurality of values. For example, in this embodiment of this application, a plurality of frame structure similarity intervals may be set, for example, frame structure similarity intervals of three levels may be set. For example, a minimum value of the lowest-level frame structure similarity interval is −4.0, and a maximum value of the lowest-level frame structure similarity interval is 3.75; a minimum value of the medium-level frame structure similarity interval is −2.0, and a maximum value of the medium-level frame structure similarity interval is 1.75; a minimum value of the highest-level frame structure similarity interval is −1.0, and a maximum value of the highest-level frame structure similarity interval is 0.75.

According to a second aspect, an embodiment of this application further provides a stereo decoding method, including: determining, based on a received stereo encoded bitstream, whether to perform differential decoding on a pitch period of a secondary channel signal; when determining to perform differential decoding on the pitch period of the secondary channel signal, obtaining, from the stereo encoded bitstream, an estimated pitch period value of a primary channel signal of a current frame and a pitch period index value of the secondary channel signal of the current frame; and performing differential decoding on the pitch period of the secondary channel signal based on the estimated pitch period value of the primary channel signal and the pitch period index value of the secondary channel signal, to obtain an estimated pitch period value of the secondary channel signal, where the estimated pitch period value of the secondary channel signal is used for decoding to obtain a stereo decoded bitstream. In this embodiment of this application, when differential decoding can be performed on the pitch period of the secondary channel signal, the estimated pitch period value of the primary channel signal and the pitch period index value of the secondary channel signal may be used to perform differential decoding on the pitch period of the secondary channel signal, to obtain the estimated pitch period value of the secondary channel signal, and the estimated pitch period value of the secondary channel signal may be used for decoding to obtain the stereo decoded bitstream. Therefore, a sense of space and sound image stability of the stereo signal can be improved.

In a possible implementation, the determining, based on a received stereo encoded bitstream, whether to perform differential decoding on a pitch period of a secondary channel signal includes: obtaining a secondary channel signal pitch period reuse flag and a signal type flag from the current frame, where the signal type flag is used to identify a signal type of the primary channel signal and a signal type of the secondary channel signal; and when the signal type flag is a preset first flag and the secondary channel signal pitch period reuse flag is a second flag, determining to perform differential decoding on the pitch period of the secondary channel signal. In this embodiment of this application, the secondary channel pitch period reuse flag may be configured in a plurality of manners. For example, the secondary channel pitch period reuse flag may be the preset second flag or a fourth flag. For example, the value of the secondary channel pitch period reuse flag may be 0 or 1, where the second flag is 1, and the fourth flag is 0. Similarly, the signal type flag may be the preset first flag or a third flag. For example, the value of the signal type flag may be 0 or 1, where the first flag is 1, and the third flag is 0. For example, when the value of the secondary channel pitch period reuse flag is 1, and when the value of the signal type flag is 1, a differential decoding procedure is performed.

In a possible implementation, the method further includes: when the signal type flag is a preset first flag and the secondary channel signal pitch period reuse flag is a fourth flag, or when the signal type flag is a preset third identifier, separately decoding the pitch period of the secondary channel signal and a pitch period of the primary channel signal. When the signal type flag, and the secondary channel signal pitch period reuse flag is the fourth flag, the pitch period of the secondary channel signal and the pitch period of the primary channel signal are directly decoded separately. That is, the pitch period of the secondary channel signal is decoded independently. For another example, when the signal type flag is the preset third flag, the pitch period of the secondary channel signal and the pitch period of the primary channel signal are separately decoded. A decoder side may determine, based on the secondary channel pitch period reuse flag and the signal type flag that are carried in the stereo encoded bitstream, to execute the differential decoding method or the independent decoding method.

In a possible implementation, the performing differential decoding on the pitch period of the secondary channel signal based on the estimated pitch period value of the primary channel signal and the pitch period index value of the secondary channel signal includes: determining a closed-loop pitch period reference value of the secondary channel signal based on the estimated pitch period value of the primary channel signal and a quantity of subframes into which the secondary channel signal of the current frame is divided; determining an upper limit of the pitch period index value of the secondary channel signal based on a pitch period search range adjustment factor of the secondary channel signal; and calculating the estimated pitch period value of the secondary channel signal based on the closed-loop pitch period reference value of the secondary channel signal, the pitch period index value of the secondary channel, and the upper limit of the pitch period index value of the secondary channel signal. For example, the estimated pitch period value of the primary channel signal is used to determine the closed-loop pitch period reference value of the secondary channel signal. The pitch period search range adjustment factor of the secondary channel signal may be used to adjust the pitch period index value of the secondary channel signal, to determine the upper limit of the pitch period index value of the secondary channel signal. The upper limit of the pitch period index value of the secondary channel signal indicates an upper limit value that the pitch period index value of the secondary channel signal cannot exceed. The pitch period index value of the secondary channel signal may be used to determine the pitch period index value of the secondary channel signal. After determining the closed-loop pitch period reference value of the secondary channel signal, the pitch period index value of the secondary channel signal, and the upper limit of the pitch period index value of the secondary channel signal, the decoder side performs differential decoding based on the closed-loop pitch period reference value of the secondary channel signal, the pitch period index value of the secondary channel signal, and the upper limit of the pitch period index value of the secondary channel signal, and outputs the estimated pitch period value of the secondary channel signal.

In a possible implementation, the calculating the estimated pitch period value of the secondary channel signal based on the closed-loop pitch period reference value of the secondary channel signal, the pitch period index value of the secondary channel signal, and the upper limit of the pitch period index value of the secondary channel signal includes: calculating the estimated pitch period value T0_pitch of the secondary channel signal in the following manner: T0_pitch=f_pitch_prim+(soft_reuse_index−soft_reuse_index_high_limit/M)/N; where f_pitch_prim represents the closed-loop pitch period reference value of the secondary channel signal, soft_reuse_index represents the pitch period index value of the secondary channel signal, N represents the quantity of subframes into which the secondary channel signal is divided, M represents an adjustment factor of the upper limit of the pitch period index value of the secondary channel signal, M is a non-zero real number, / represents a division operator, + represents an addition operator, and − represents a subtraction operator. Specifically, a closed-loop pitch period integer part loc_T0 of the secondary channel signal and a closed-loop pitch period fractional part loc_frac_prim of the secondary channel signal are determined based on the estimated pitch period value of the primary channel signal. N represents the quantity of subframes into which the secondary channel signal is divided, for example, a value of N may be 3, 4, or 5. M represents the adjustment factor of the upper limit of the pitch period index value of the secondary channel signal, and M is a non-zero real number, for example, a value of M may be 2 or 3. Values of N and M depend on an application scenario, and are not limited herein. In this embodiment of this application, calculation of the estimated pitch period value of the secondary channel signal may not be limited to the foregoing formula.

According to a third aspect, an embodiment of this application further provides a stereo encoding apparatus, including: a downmix module, configured to perform downmix processing on a left channel signal of a current frame and a right channel signal of the current frame, to obtain a primary channel signal of the current frame and a secondary channel signal of the current frame; and a differential encoding module, configured to: when it is determined that a frame structure similarity value falls within a frame structure similarity interval, perform differential encoding on a pitch period of the secondary channel signal by using an estimated pitch period value of the primary channel signal, to obtain a pitch period index value of the secondary channel signal, where the pitch period index value of the secondary channel signal is used to generate a to-be-sent stereo encoded bitstream.

In a possible implementation, the stereo encoding apparatus further includes: a signal type flag obtaining module, configured to obtain a signal type flag based on the primary channel signal and the secondary channel signal, where the signal type flag is used to identify a signal type of the primary channel signal and a signal type of the secondary channel signal; and a reuse flag configuration module, configured to: when the signal type flag is a preset first flag and the frame structure similarity value falls within the frame structure similarity interval, configure a secondary channel pitch period reuse flag to a second flag, where the first flag and the second flag are used to generate the stereo encoded bitstream.

In a possible implementation, the stereo encoding apparatus further includes: the reuse flag configuration module, further configured to: when it is determined that the frame structure similarity value falls outside the frame structure similarity interval, or when the signal type flag is a preset third flag, configure the secondary channel pitch period reuse flag to a fourth flag, where the fourth flag and the third flag are used to generate the stereo encoded bitstream; and an independent encoding module, configured to separately encode the pitch period of the secondary channel signal and a pitch period of the primary channel signal.

In a possible implementation, the stereo encoding apparatus further includes: an open-loop pitch period analysis module, configured to perform open-loop pitch period analysis on the secondary channel signal of the current frame, to obtain an estimated open-loop pitch period value of the secondary channel signal; a closed-loop pitch period analysis module, configured to determine a closed-loop pitch period reference value of the secondary channel signal based on the estimated pitch period value of the primary channel signal and a quantity of subframes into which the secondary channel signal of the current frame is divided; and a similarity value calculation module, configured to determine the frame structure similarity value based on the estimated open-loop pitch period value of the secondary channel signal and the closed-loop pitch period reference value of the secondary channel signal.

In a possible implementation, the closed-loop pitch period analysis module is configured to: determine a closed-loop pitch period integer part loc_T0 of the secondary channel signal and a closed-loop pitch period fractional part loc_frac_prim of the secondary channel signal based on the estimated pitch period value of the primary channel signal; and calculate the closed-loop pitch period reference value f_pitch_prim of the secondary channel signal in the following manner: f_pitch_prim=loc_T0+loc_frac_prim/N; where N represents the quantity of subframes into which the secondary channel signal is divided.

In a possible implementation, the similarity value calculation module is configured to calculate the frame structure similarity value ol_pitch in the following manner: ol_pitch=T_op−f_pitch_prim; where T_op represents the estimated open-loop pitch period value of the secondary channel signal, and f_pitch_prim represents the closed-loop pitch period reference value of the secondary channel signal.

In a possible implementation, the differential encoding module includes: a closed-loop pitch period search module, configured to perform secondary channel closed-loop pitch period search based on the estimated pitch period value of the primary channel signal, to obtain an estimated pitch period value of the secondary channel signal; an index value upper limit determining module, configured to determine an upper limit of the pitch period index value of the secondary channel signal based on a pitch period search range adjustment factor of the secondary channel signal; and an index value calculation module, configured to calculate the pitch period index value of the secondary channel signal based on the estimated pitch period value of the primary channel signal, the estimated pitch period value of the secondary channel signal, and the upper limit of the pitch period index value of the secondary channel signal.

In a possible implementation, the closed-loop pitch period search module is configured to perform closed-loop pitch period search by using integer precision and fractional precision and by using the closed-loop pitch period reference value of the secondary channel signal as a start point of the secondary channel signal closed-loop pitch period search, to obtain the estimated pitch period value of the secondary channel signal, where the closed-loop pitch period reference value of the secondary channel signal is determined based on the estimated pitch period value of the primary channel signal and the quantity of subframes into which the secondary channel signal of the current frame is divided.

In a possible implementation, the index value upper limit determining module is configured to calculate the upper limit soft_reuse_index_high_limit of the pitch period index value of the secondary channel signal in the following manner: soft_reuse_index_high_limit=0.5+$2^Z$; where Z is the pitch period search range adjustment factor of the secondary channel signal, and a value of Z is 3, 4, or 5.

In a possible implementation, the index value calculation module is configured to: determine a closed-loop pitch period integer part loc_T0 of the secondary channel signal and a closed-loop pitch period fractional part loc_frac_prim of the secondary channel signal based on the estimated pitch period value of the primary channel signal; and calculate the pitch period index value soft_reuse_index of the secondary channel signal in the following manner: soft_reuse_index=(N*pitch_soft_reuse+pitch_frac_soft_reuse)−(N*loc_T0+loc_frac_prim)+soft_reuse_index_high_limit/M; where pitch_soft_reuse represents an integer part of the estimated pitch period value of the secondary channel signal, pitch_frac_soft_reuse represents a fractional part of the estimated pitch period value of the secondary channel signal, soft_reuse_index_high_limit represents the upper limit of the pitch period index value of the secondary channel signal, N represents a quantity of subframes into which the secondary channel signal is divided, M represents an adjustment factor of the upper limit of the pitch period index value of the secondary channel signal, M is a non-zero real number, * represents a multiplication operator, + represents an addition operator, and − represents a subtraction operator.

In a possible implementation, the stereo encoding apparatus is applied to a stereo encoding scenario in which an encoding rate of the current frame exceeds a preset rate threshold, where the rate threshold is at least one of the following values: 32 kilobits per second kbps, 48 kbps, 64 kbps, 96 kbps, 128 kbps, 160 kbps, 192 kbps, and 256 kbps.

In a possible implementation, a minimum value of the frame structure similarity interval is −4.0, and a maximum value of the frame structure similarity interval is 3.75; or a minimum value of the frame structure similarity interval is −2.0, and a maximum value of the frame structure similarity interval is 1.75; or a minimum value of the frame structure similarity interval is −1.0, and a maximum value of the frame structure similarity interval is 0.75.

In the third aspect of this application, the composition modules of the stereo encoding apparatus may further perform steps described in the first aspect and the possible implementations. For details, refer to the foregoing descriptions in the first aspect and the possible implementations.

According to a fourth aspect, an embodiment of this application further provides a stereo decoding apparatus, including: a determining module, configured to determine, based on a received stereo encoded bitstream, whether to perform differential decoding on a pitch period of a secondary channel signal; a value obtaining module, configured to: when it is determined to perform differential decoding on the pitch period of the secondary channel signal, obtain, from the stereo encoded bitstream, an estimated pitch period value of a primary channel signal of a current frame and a pitch period index value of the secondary channel signal of the current frame; and a differential decoding module, configured to perform differential decoding on the pitch period of the secondary channel signal based on the estimated pitch period value of the primary channel signal and the pitch period index value of the secondary channel signal, to obtain an estimated pitch period value of the secondary channel signal, where the estimated pitch period value of the secondary channel signal is used for decoding to obtain a stereo decoded bitstream.

In a possible implementation, the determining module is configured to: obtain a secondary channel signal pitch period reuse flag and a signal type flag from the current frame, where the signal type flag is used to identify a signal type of the primary channel signal and a signal type of the secondary channel signal; and when the signal type flag is a preset first flag and the secondary channel signal pitch period reuse flag is a second flag, determine to perform differential decoding on the pitch period of the secondary channel signal.

In a possible implementation, the stereo decoding apparatus further includes: an independent decoding module, configured to: when the signal type flag is a preset first flag and the secondary channel signal pitch period reuse flag is a fourth flag, or when the signal type flag is a preset third identifier and the secondary channel signal pitch period reuse flag is a fourth flag, separately decode the pitch period of the secondary channel signal and a pitch period of the primary channel signal.

In a possible implementation, the differential decoding module includes: a reference value determining submodule, configured to determine a closed-loop pitch period reference value of the secondary channel signal based on the estimated pitch period value of the primary channel signal and a quantity of subframes into which the secondary channel signal of the current frame is divided; an index value upper limit determining submodule, configured to determine an upper limit of the pitch period index value of the secondary channel signal based on a pitch period search range adjustment factor of the secondary channel signal; and an estimated value calculation submodule, configured to calculate the estimated pitch period value of the secondary channel signal based on the closed-loop pitch period reference value of the secondary channel signal, the pitch period index value of the secondary channel, and the upper limit of the pitch period index value of the secondary channel signal.

In a possible implementation, the estimated value calculation submodule is configured to calculate the estimated pitch period value T0_pitch of the secondary channel signal in the following manner:

$$T0\_pitch=f\_pitch\_prim+(soft\_reuse\_index-soft\_reuse\_index\_high\_limit/M)/N;$$ where f_pitch_prim represents the closed-loop pitch period reference value of the secondary channel signal, soft_reuse_index represents the pitch period index value of the secondary channel signal, N represents the quantity of subframes into which the secondary channel signal is divided, M represents an adjustment factor of the upper limit of the pitch period index value of the secondary channel signal, M is a non-zero real number, / represents a division operator, + represents an addition operator, and − represents a subtraction operator.

In the fourth aspect of this application, the composition modules of the stereo decoding apparatus may further perform steps described in the second aspect and the possible implementations. For details, refer to the foregoing descriptions in the second aspect and the possible implementations.

According to a fifth aspect, an embodiment of this application provides a stereo processing apparatus. The stereo processing apparatus may include an entity such as a stereo encoding apparatus, a stereo decoding apparatus, or a chip, and the stereo processing apparatus includes a processor. Optionally, the stereo processing apparatus may further include a memory. The memory is configured to store instructions; and the processor is configured to execute the instructions in the memory, so that the stereo processing apparatus performs the method according to the first aspect or the second aspect.

According to a sixth aspect, an embodiment of this application provides a computer-readable storage medium. The computer-readable storage medium stores instructions, and when the instructions are run on a computer, the computer is enabled to perform the method according to the first aspect or the second aspect.

According to a seventh aspect, an embodiment of this application provides a computer program product including instructions. When the computer program product runs on a computer, the computer is enabled to perform the method according to the first aspect or the second aspect.

According to an eighth aspect, this application provides a chip system. The chip system includes a processor, configured to support a stereo encoding apparatus or a stereo decoding apparatus in implementing functions in the foregoing aspects, for example, sending or processing data and/or information in the foregoing methods. In a possible design, the chip system further includes a memory, and the memory is configured to store program instructions and data that are necessary for the stereo encoding apparatus or the stereo decoding apparatus. The chip system may include a chip, or may include a chip and another discrete device.

DESCRIPTION OF EMBODIMENTS

The embodiments of this application provide a stereo encoding method and apparatus, and a stereo decoding method and apparatus, to improve stereo encoding and decoding performance.

The following describes the embodiments of this application with reference to accompanying drawings.

In the specification, claims, and the accompanying drawings of this application, the terms "first", "second", and the like are intended to distinguish similar objects but do not necessarily indicate a specific order or sequence. It should be understood that the terms used in such a way are interchangeable in proper circumstances. This is merely a distinguishing manner that is used when objects having a same attribute are described in the embodiments of this application. In addition, the terms "include", "have", and any other variants thereof are intended to cover the non-exclusive inclusion, so that a process, method, system, product, or device that includes a series of units is not necessarily limited to those units, but may include other units not expressly listed or inherent to such a process, method, product, or device.

Figure 1:
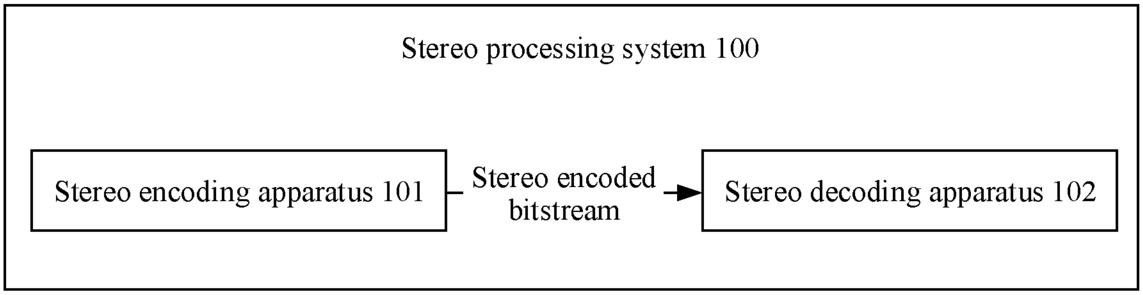
FIG. 1 is a schematic diagram of a composition structure of a stereo processing system according to an embodiment of this application.

The technical solutions in the embodiments of this application may be applied to various stereo processing systems. FIG. 1 is a schematic diagram of a composition structure of a stereo processing system according to an embodiment of this application. The stereo processing system 100 may include a stereo encoding apparatus 101 and a stereo decoding apparatus 102. The stereo encoding apparatus 101 may be configured to generate a stereo encoded bitstream, and then the stereo encoded bitstream may be transmitted to the stereo decoding apparatus 102 through an audio transmission channel. The stereo decoding apparatus 102 may receive the stereo encoded bitstream, and then execute a stereo decoding function of the stereo decoding apparatus 102, to finally obtain a stereo decoded bitstream.

In this embodiment of this application, the stereo encoding apparatus may be applied to various terminal devices that have an audio communication requirement, and a wireless device and a core network device that have a transcoding requirement. For example, the stereo encoding apparatus may be a stereo encoder of the foregoing terminal device, wireless device, or core network device. Similarly, the stereo decoding apparatus may be applied to various terminal devices that have an audio communication requirement, and a wireless device and a core network device that have a transcoding requirement. For example, the stereo decoding apparatus may be a stereo decoder of the foregoing terminal device, wireless device, or core network device.

Figure 2A:
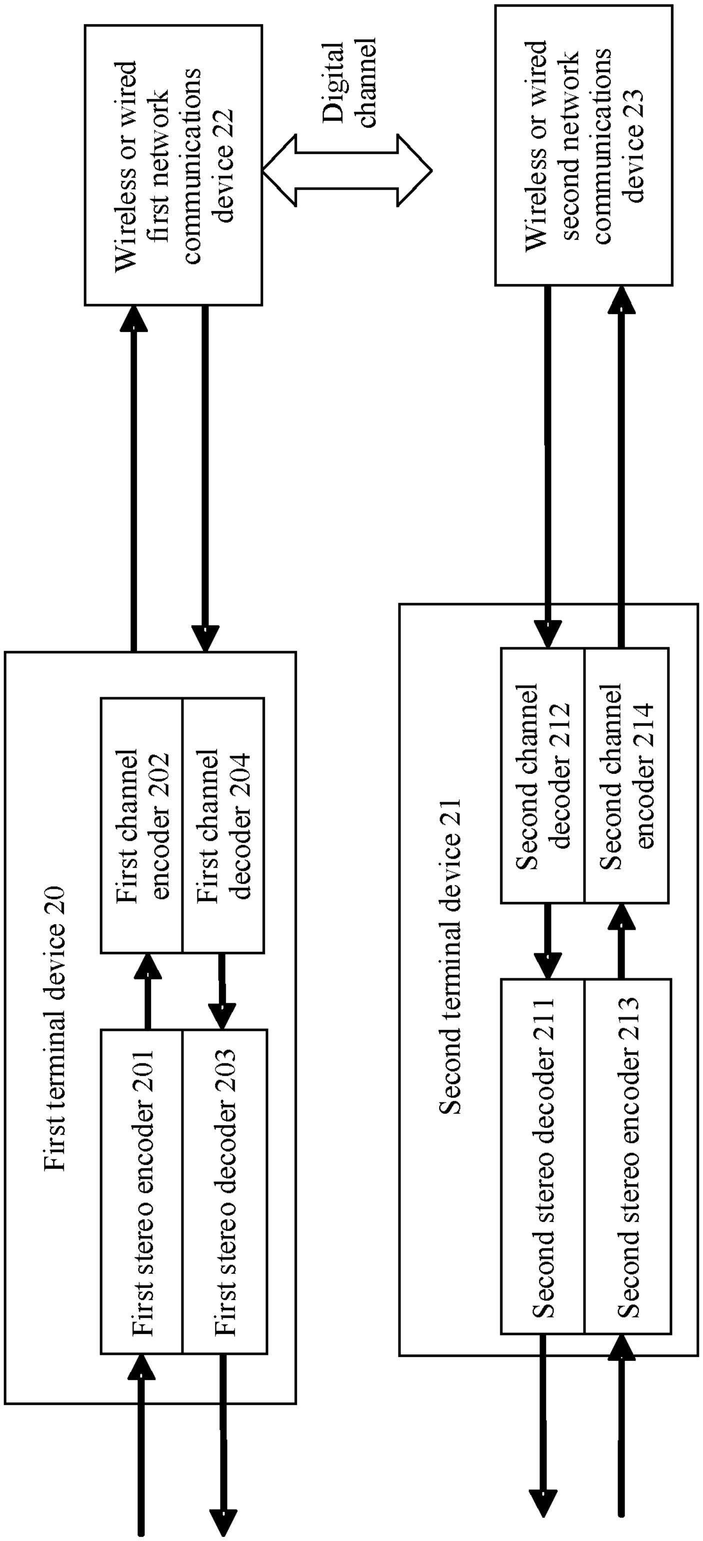
FIG. 2*a* is a schematic diagram of application of a stereo encoder and a stereo decoder to a terminal device according to an embodiment of this application.

FIG. 2*a* is a schematic diagram of application of a stereo encoder and a stereo decoder to a terminal device according to an embodiment of this application. Each terminal device may include a stereo encoder, a channel encoder, a stereo decoder, and a channel decoder. Specifically, the channel encoder is used to perform channel encoding on a stereo signal, and the channel decoder is used to perform channel decoding on a stereo signal. For example, a first terminal device 20 may include a first stereo encoder 201, a first channel encoder 202, a first stereo decoder 203, and a first channel decoder 204. A second terminal device 21 may include a second stereo decoder 211, a second channel decoder 212, a second stereo encoder 213, and a second channel encoder 214. The first terminal device 20 is connected to a wireless or wired first network communications device 22, the first network communications device 22 is connected to a wireless or wired second network communications device 23 through a digital channel, and the second terminal device 21 is connected to the wireless or wired second network communications device 23. The foregoing wireless or wired network communications device may generally refer to a signal transmission device, for example, a communications base station or a data exchange device.

In audio communication, a terminal device serving as a transmit end performs stereo encoding on a collected stereo signal, then performs channel encoding, and transmits the stereo signal on a digital channel by using a wireless network or a core network. A terminal device serving as a receive end performs channel decoding based on a received signal to obtain a stereo signal encoded bitstream, and then restores a stereo signal through stereo decoding, and the terminal device serving as the receive end performs playback.

Figure 2B:
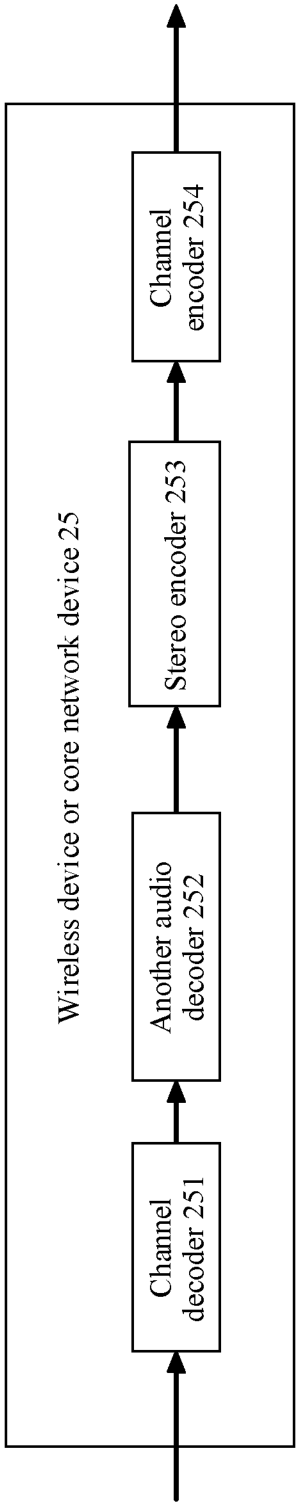
FIG. 2*b* is a schematic diagram of application of a stereo encoder to a wireless device or a core network device according to an embodiment of this application.

FIG. 2*b* is a schematic diagram of application of a stereo encoder to a wireless device or a core network device according to an embodiment of this application. The wireless device or core network device 25 includes: a channel decoder 251, another audio decoder 252, a stereo encoder 253, and a channel encoder 254. The another audio decoder 252 is an audio decoder other than a stereo decoder. In the wireless device or core network device 25, a signal entering the device is first channel-decoded by the channel decoder 251, then audio decoding (other than stereo decoding) is performed by the another audio decoder 252, and then stereo encoding is performed by using the stereo encoder 253. Finally, the stereo signal is channel-encoded by using the channel encoder 254, and then transmitted after the channel encoding is completed.

Figure 2C:
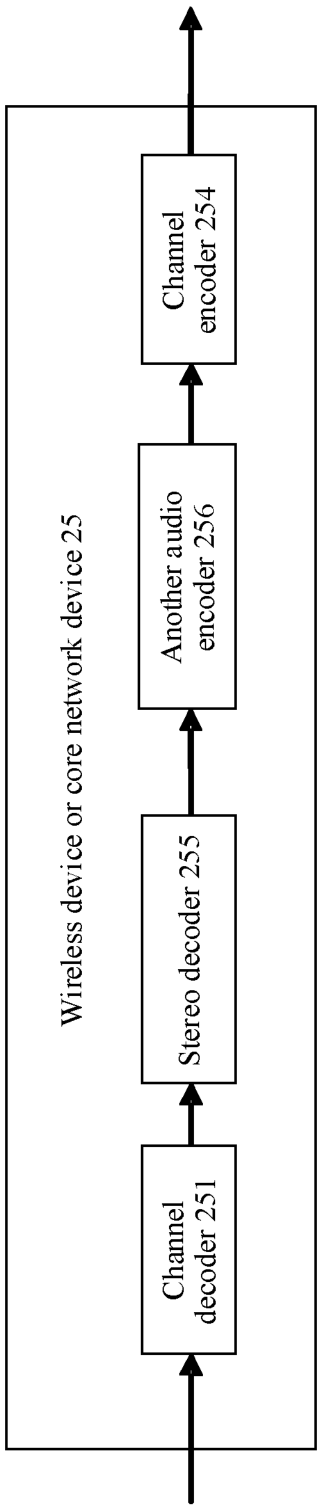
FIG. 2*c* is a schematic diagram of application of a stereo decoder to a wireless device or a core network device according to an embodiment of this application.

FIG. 2*c* is a schematic diagram of application of a stereo decoder to a wireless device or a core network device according to an embodiment of this application. The wireless device or core network device 25 includes: a channel decoder 251, a stereo decoder 255, another audio encoder 256, and a channel encoder 254. The another audio encoder 256 is an audio encoder other than a stereo encoder. In the wireless device or core network device 25, a signal entering the device is first channel-decoded by the channel decoder 251, then a received stereo encoded bitstream is decoded by using the stereo decoder 255, and then audio encoding (other than stereo encoding) is performed by using the another audio encoder 256. Finally, the stereo signal is channel-encoded by using the channel encoder 254, and then transmitted after the channel encoding is completed. In a wireless device or a core network device, if transcoding needs to be implemented, corresponding stereo encoding and decoding processing needs to be performed. The wireless device is a radio frequency-related device in communication, and the core network device is a core network-related device in communication.

In some embodiments of this application, the stereo encoding apparatus may be applied to various terminal devices that have an audio communication requirement, and a wireless device and a core network device that have a transcoding requirement. For example, the stereo encoding apparatus may be a multi-channel encoder of the foregoing terminal device, wireless device, or core network device. Similarly, the stereo decoding apparatus may be applied to various terminal devices that have an audio communication requirement, and a wireless device and a core network device that have a transcoding requirement. For example, the stereo decoding apparatus may be a multi-channel decoder of the foregoing terminal device, wireless device, or core network device.

Figure 3A:
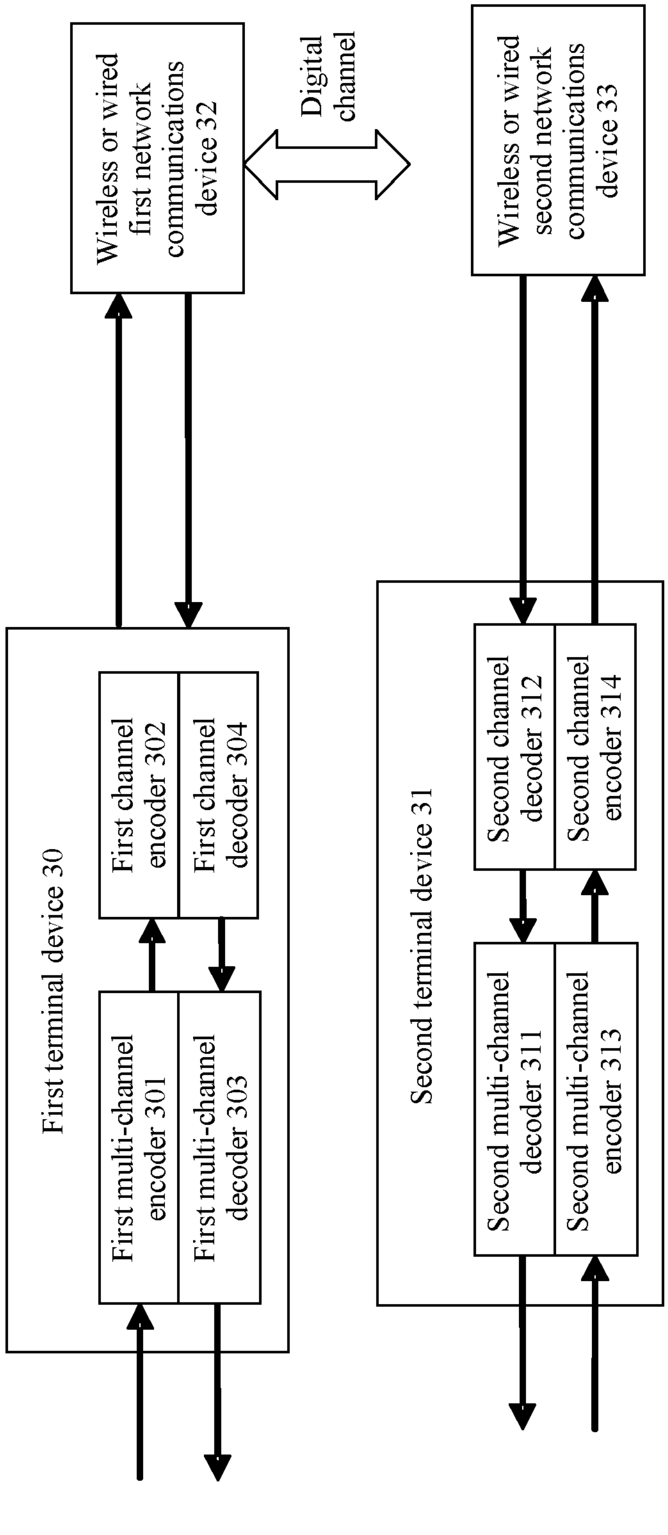
FIG. 3*a* is a schematic diagram of application of a multi-channel encoder and a multi-channel decoder to a terminal device according to an embodiment of this application.

FIG. 3*a* is a schematic diagram of application of a multi-channel encoder and a multi-channel decoder to a terminal device according to an embodiment of this application. Each terminal device may include a multi-channel encoder, a channel encoder, a multi-channel decoder, and a channel decoder. Specifically, the channel encoder is used to perform channel encoding on a multi-channel signal, and the channel decoder is used to perform channel decoding on a multi-channel signal. For example, a first terminal device 30 may include a first multi-channel encoder 301, a first channel encoder 302, a first multi-channel decoder 303, and a first channel decoder 304. A second terminal device 31 may include a second multi-channel decoder 311, a second channel decoder 312, a second multi-channel encoder 313, and a second channel encoder 314. The first terminal device 30 is connected to a wireless or wired first network communications device 32, the first network communications device 32 is connected to a wireless or wired second network communications device 33 through a digital channel, and the second terminal device 31 is connected to the wireless or wired second network communications device 33. The foregoing wireless or wired network communications device may generally refer to a signal transmission device, for example, a communications base station or a data exchange device. In audio communication, a terminal device serving as a transmit end performs multi-channel encoding on a collected multi-channel signal, then performs channel encoding, and transmits the multi-channel signal on a digital channel by using a wireless network or a core network. A terminal device serving as a receive end performs channel decoding based on a received signal to obtain a multi-channel signal encoded bitstream, and then restores a multi-channel signal through multi-channel decoding, and the terminal device serving as the receive end performs playback.

Figure 3B:
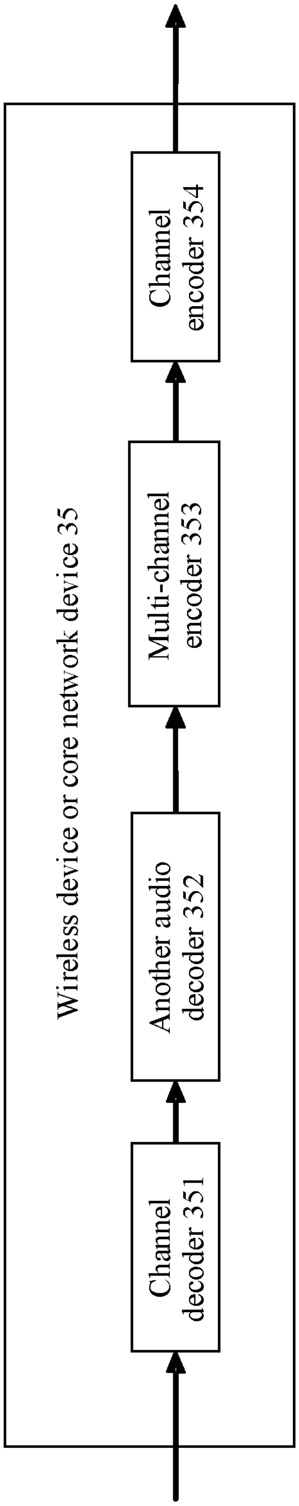
FIG. 3*b* is a schematic diagram of application of a multi-channel encoder to a wireless device or a core network device according to an embodiment of this application.

FIG. 3*b* is a schematic diagram of application of a multi-channel encoder to a wireless device or a core network device according to an embodiment of this application. The wireless device or core network device 35 includes: a channel decoder 351, another audio decoder 352, a multi-channel encoder 353, and a channel encoder 354. FIG. 3*b* is similar to FIG. 2*b*, and details are not described herein again.

Figure 3C:
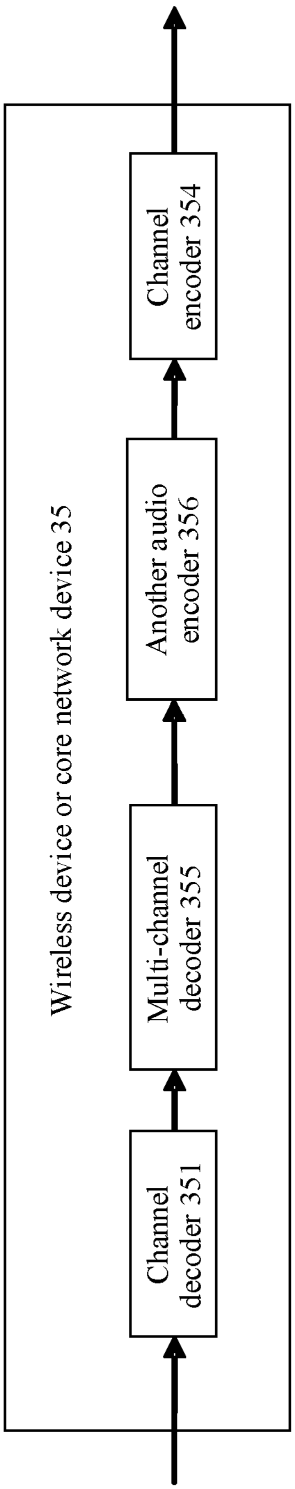
FIG. 3*c* is a schematic diagram of application of a multi-channel decoder to a wireless device or a core network device according to an embodiment of this application.

FIG. 3*c* is a schematic diagram of application of a multi-channel decoder to a wireless device or a core network device according to an embodiment of this application. The wireless device or core network device 35 includes: a channel decoder 351, a multi-channel decoder 355, another audio encoder 356, and a channel encoder 354. FIG. 3*c* is similar to FIG. 2*c*, and details are not described herein again.

Stereo encoding processing may be a part of a multi-channel encoder, and stereo decoding processing may be a part of a multi-channel decoder. For example, performing multi-channel encoding on a collected multi-channel signal may be performing dimension reduction processing on the collected multi-channel signal to obtain a stereo signal, and encoding the obtained stereo signal. A decoder side performs decoding based on a multi-channel signal encoded bit-stream, to obtain a stereo signal, and restores a multi-channel signal after upmix processing. Therefore, the embodiments of this application may also be applied to a multi-channel encoder and a multi-channel decoder in a terminal device, a wireless device, or a core network device. In a wireless device or a core network device, if transcoding needs to be implemented, corresponding multi-channel encoding and decoding processing needs to be performed.

In the embodiments of this application, pitch period encoding is an important step in the stereo encoding method. Because voiced sound is generated through quasi-periodic impulse excitation, a time-domain waveform of the voiced sound shows obvious periodicity, which is called pitch period. A pitch period plays an important role in producing high-quality voiced speech because voiced speech is characterized as a quasi-periodic signal composed of sampling points separated by a pitch period. In speech processing, a pitch period may also be represented by a quantity of samples included in a period. In this case, the pitch period is called pitch delay. A pitch delay is an important parameter of an adaptive codebook.

Pitch period estimation mainly refers to a process of estimating a pitch period. Therefore, accuracy of pitch period estimation directly determines correctness of an excitation signal, and accordingly determines synthesized speech signal quality. Pitch periods of a primary channel signal and a secondary channel signal have a strong similarity. In the embodiments of this application, the similarity of the pitch periods can be properly used to improve encoding efficiency.

In the embodiments of this application, for parametric stereo encoding performed in frequency domain or in a time-frequency combination case, there is a correlation between a pitch period of a primary channel signal and a pitch period of a secondary channel signal. For encoding of the pitch period of the secondary channel signal, a frame structure similarity determining manner is used to measure an encoding frame structure similarity between the primary channel signal and the secondary channel signal, and when a frame structure similarity value falls within a frame structure similarity interval, the pitch period parameter of the secondary channel signal is reasonably predicted and differential-encoded by using a differential encoding method. In this way, a small quantity of bit resources are allocated for differential encoding of the pitch period of the secondary channel signal. The embodiments of this application can improve a sense of space and sound image stability of stereo signals. In addition, in the embodiments of this application, a relatively small quantity of bit resources are used, so that accuracy of pitch period prediction for the secondary channel signal is ensured. The remaining bit resources are used for other stereo encoding parameters, for example, a fixed codebook. Therefore, encoding efficiency of the secondary channel is improved, and overall stereo encoding quality is finally improved.

Figure 4:
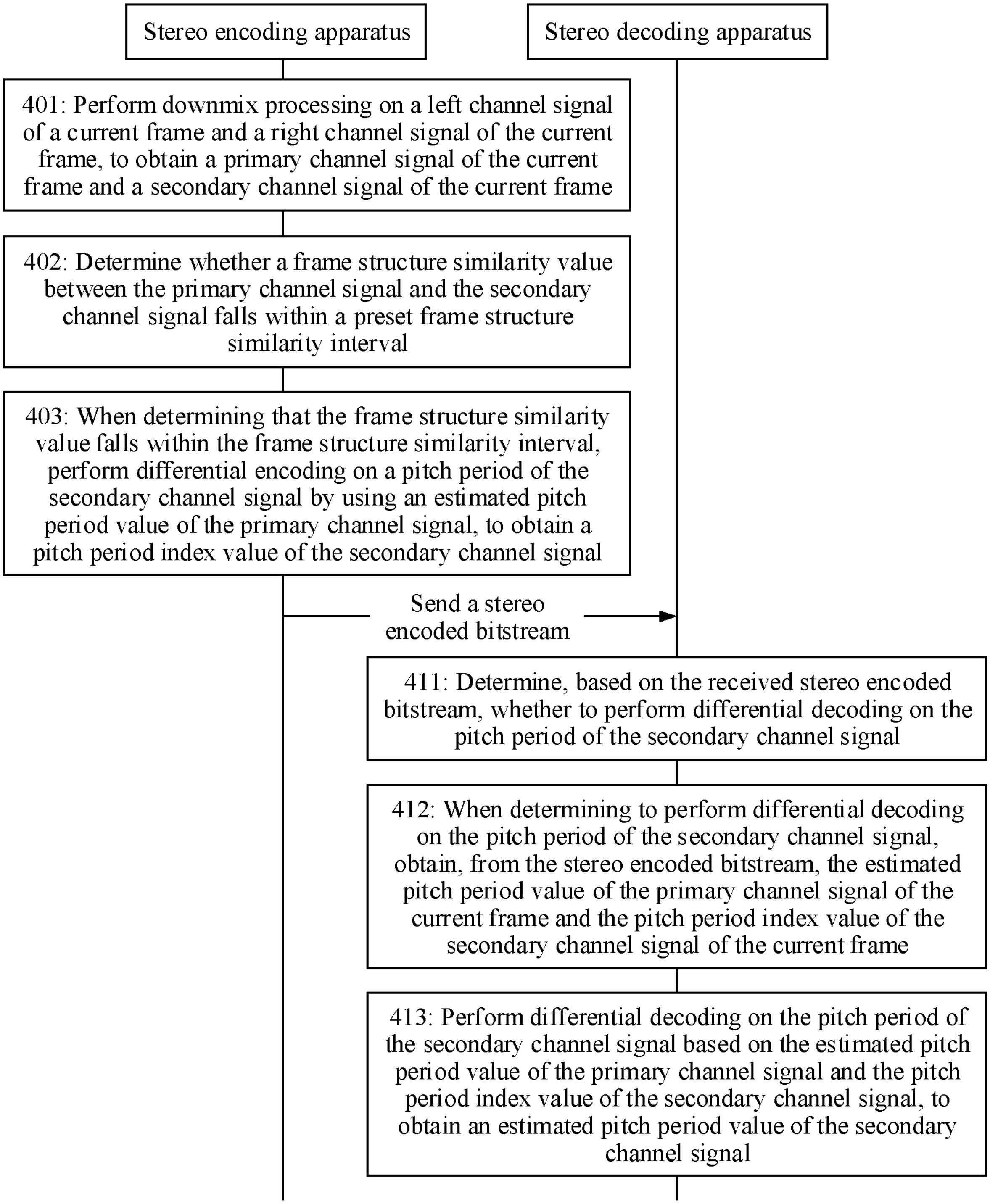
FIG. 4 is a schematic flowchart of interaction between a stereo encoding apparatus and a stereo decoding apparatus according to an embodiment of this application.

In the embodiments of this application, a pitch period differential encoding method for the secondary channel signal is used for encoding the pitch period of the secondary channel signal, the pitch period of the primary channel signal is used as a reference value, and bit resources are reallocated to the secondary channel, so as to improve stereo encoding quality. The following describes the stereo encoding method and the stereo decoding method provided in the embodiments of this application based on the foregoing system architecture, the stereo encoding apparatus, and the stereo decoding apparatus. FIG. 4 is a schematic flowchart of interaction between a stereo encoding apparatus and a stereo decoding apparatus according to an embodiment of this application. The following step 401 to step 403 may be performed by the stereo encoding apparatus (briefly referred to as an encoder side below). The following step 411 to step 413 may be performed by the stereo decoding apparatus (briefly referred to as a decoder side below). The interaction mainly includes the following process.

401: Perform downmix processing on a left channel signal of a current frame and a right channel signal of the current frame, to obtain a primary channel signal of the current frame and a secondary channel signal of the current frame.

In this embodiment of this application, the current frame is a stereo signal frame on which encoding processing is currently performed on the encoder side. The left channel signal of the current frame and the right channel signal of the current frame are first obtained, and downmix processing is performed on the left channel signal and the right channel signal, to obtain the primary channel signal of the current frame and the secondary channel signal of the current frame. For example, there are many different implementations of the stereo encoding and decoding technology. For example, the encoder side downmixes time-domain signals into two mono signals. Left and right channel signals are first downmixed into a primary channel signal and a secondary channel signal, where L represents the left channel signal, and R represents the right channel signal.

In this case, the primary channel signal may be $0.5*(L+R)$, which indicates information about a correlation between the two channels, and the secondary channel signal may be $0.5*(L-R)$, which indicates information about a difference between the two channels.

It should be noted that a downmix process in frequency-domain stereo encoding and a downmix process in time-domain stereo encoding are described in detail in subsequent embodiments.

In some embodiments of this application, the stereo encoding method executed by the encoder side may be applied to a stereo encoding scenario in which an encoding rate of a current frame exceeds a preset rate threshold. The stereo decoding method executed by the decoder side may be applied to a stereo decoding scenario in which a decoding rate of a current frame exceeds a preset rate threshold. The encoding rate of the current frame is an encoding rate used by a stereo signal of the current frame, and the rate threshold is a maximum rate value specified for the stereo signal. When the encoding rate of the current frame exceeds the preset rate threshold, the stereo encoding method provided in this embodiment of this application may be performed.

When the decoding rate of the current frame exceeds the preset rate threshold, the stereo decoding method provided in this embodiment of this application may be performed.

Further, in some embodiments of this application, the rate threshold is at least one of the following values: 32 kilobits per second (kbps), 48 kbps, 64 kbps, 96 kbps, 128 kbps, 160 kbps, 192 kbps, and 256 kbps.

The rate threshold may be greater than or equal to 32 kbps. For example, the rate threshold may be 48 kbps, 64 kbps, 96 kbps, 128 kbps, 160 kbps, 192 kbps, or 256 kbps. A specific value of the rate threshold may be determined based on an application scenario. For another example, this embodiment of this application may not be limited to the foregoing rates. In addition to the foregoing rates, the rate threshold may be, for example, 80 kbps, 144 kbps, or 320 kbps. When the encoding rate is relatively high (for example, 32 kbps or higher), independent encoding is not performed on a pitch period of the secondary channel, an estimated pitch period value of the primary channel signal is used as a reference value, and bit resources are reallocated to the secondary channel signal, so as to improve stereo encoding quality.

402: Determine whether a frame structure similarity value between the primary channel signal and the secondary channel signal falls within a preset frame structure similarity interval.

In this embodiment of this application, after the primary channel signal of the current frame and the secondary channel signal of the current frame are obtained, the frame structure similarity value between the primary channel signal and the secondary channel signal is calculated. The frame structure similarity value is a value of a frame structure similarity parameter, and may be used to measure whether the primary channel signal and the secondary channel signal have a frame structure similarity. The frame structure similarity value is determined based on signal characteristics of the primary channel signal and the secondary channel signal. A manner of calculating the frame structure similarity value is described in a subsequent embodiment.

In this embodiment of this application, after the frame structure similarity value between the primary channel signal and the secondary channel signal is calculated, the preset frame structure similarity interval is obtained. The frame structure similarity interval is an interval range, and the frame structure similarity interval may include left and right endpoints of the interval range, or may not include the left and right endpoints of the interval range. The range of the frame structure similarity interval may be flexibly determined based on an encoding rate of the current frame, a differential encoding trigger condition, and the like. The range of the frame structure similarity interval is not limited herein.

In some embodiments of this application, a maximum value and a minimum value of the frame structure similarity interval each have a plurality of values. For example, in this embodiment of this application, a plurality of frame structure similarity intervals may be set, for example, frame structure similarity intervals of three levels may be set. For example, a minimum value of the lowest-level frame structure similarity interval is −4.0, and a maximum value of the lowest-level frame structure similarity interval is 3.75; a minimum value of the medium-level frame structure similarity interval is −2.0, and a maximum value of the medium-level frame structure similarity interval is 1.75; a minimum value of the highest-level frame structure similarity interval is −1.0, and a maximum value of the highest-level frame structure similarity interval is 0.75. For example, the frame structure similarity interval may be used to determine whether the frame structure similarity value falls within the interval. For example, it is determined whether a frame structure similarity value ol_pitch meets the following preset condition: down_limit<ol_pitch<up_limit, where down_limit and up_limit are a minimum value (that is, a lower limit threshold) and a maximum value (that is, an upper limit threshold) of a user-defined frame structure similarity interval, respectively. For example, a value of down_limit may be −4.0, and a value of up_limit may be 3.75. Specific values of the two endpoints of the frame structure similarity interval may be determined based on an application scenario.

For example, in this embodiment of this application, the calculated frame structure similarity value may be compared with the maximum value and the minimum value of the frame structure similarity interval, to determine whether the frame structure similarity value between the primary channel signal and the secondary channel signal falls within the preset frame structure similarity interval. When the frame structure similarity value falls within the frame structure similarity interval, it may be determined that there is frame structure similarity between the primary channel signal and the secondary channel signal. When the frame structure similarity value falls outside the frame structure similarity interval, it may be determined that there is no frame structure similarity between the primary channel signal and the secondary channel signal.

In this embodiment of this application, after it is determined whether the frame structure similarity value between the primary channel signal and the secondary channel signal falls within the preset frame structure similarity interval, it is determined, based on a result of the determining, whether to perform step 403. When the frame structure similarity value falls within the frame structure similarity interval, the subsequent step 403 is triggered to be executed.

In some embodiments of this application, after step 402 of determining whether the frame structure similarity value between the primary channel signal and the secondary channel signal falls within the preset frame structure similarity interval, the method provided in this embodiment of this application further includes:

obtaining a signal type flag based on the primary channel signal and the secondary channel signal, where the signal type flag is used to identify a signal type of the primary channel signal and a signal type of the secondary channel signal; and when the signal type flag is a preset first flag and the frame structure similarity value falls within the frame structure similarity interval, configuring a secondary channel pitch period reuse flag to a second flag, where the first flag and the second flag are used to generate a stereo encoded bitstream.

The encoder side obtains the signal type flag based on the primary channel signal and the secondary channel signal. For example, the primary channel signal and the secondary channel signal carry signal mode information, and a value of the signal type flag is determined based on the signal mode information. The signal type flag is used to identify the signal type of the primary channel signal and the signal type of the secondary channel signal. The signal type flag indicates both the signal type of the primary channel signal and the signal type of the secondary channel signal. A value of the secondary channel pitch period reuse flag may be configured based on whether the frame structure similarity value falls within the frame structure similarity interval, and the secondary channel pitch period reuse flag is used to indicate to use differential encoding or independent encoding for the pitch period of the secondary channel signal.

In this embodiment of this application, the secondary channel pitch period reuse flag may be configured in a plurality of manners. For example, the secondary channel pitch period reuse flag may be the preset second flag, or may be configured to a fourth flag. The following describes a method for configuring the secondary channel pitch period reuse flag with an example. First, it is determined whether the signal type flag is the preset first flag; if the signal type flag is the preset first flag, step 402 is performed to determine whether the frame structure similarity value falls within the preset frame structure similarity interval; and when it is determined that the frame structure similarity value falls within the frame structure similarity interval, the secondary channel pitch period reuse flag is configured to the second flag. The first flag and the second flag are used to generate the stereo encoded bitstream. The secondary channel pitch period reuse flag indicates the second flag, so that the decoder side can determine to perform differential decoding on the pitch period of the secondary channel signal. For example, the value of the secondary channel pitch period reuse flag may be 0 or 1, where the second flag is 1, and the fourth flag is 0. Similarly, the signal type flag may be the preset first flag or a preset third flag. For example, the value of the signal type flag may be 0 or 1, where the first flag is 1, and the third flag is 0.

For example, the secondary channel pitch period reuse flag is soft_pitch_reuse_flag, and the signal type flag of the primary and secondary channels is both_chan_generic. For example, in secondary channel encoding, soft_pitch_reuse_flag and both_chan_generic each are defined as 0 or 1, and are used to indicate whether the primary channel signal and the secondary channel signal have a frame structure similarity. First, it is determined that the signal type flag of the primary and secondary channels is both_chan_generic. When both_chan_generic is 1, both the primary and secondary channels of the current frame are in generic (GENERIC) mode. The secondary channel pitch period reuse flag soft_pitch_reuse_flag is set based on whether the frame structure similarity value falls within the frame structure similarity interval. When the frame structure similarity value falls within the frame structure similarity interval, soft_pitch_reuse_flag is 1, and the differential encoding method in this embodiment of this application is performed. When the frame structure similarity value falls outside the frame structure similarity interval, soft_pitch_reuse_flag is 0, and the independent encoding method is performed.

In some embodiments of this application, after step 402 of determining whether the frame structure similarity value between the primary channel signal and the secondary channel signal falls within the preset frame structure similarity interval, the method provided in this embodiment of this application further includes:

when determining that the frame structure similarity value falls outside the frame structure similarity interval, or when the signal type flag is the preset third flag, configure the secondary channel pitch period reuse flag to the fourth flag, where the fourth flag and the third flag are used to generate the stereo encoded bitstream; and separately encoding the pitch period of the secondary channel signal and a pitch period of the primary channel signal.

The secondary channel pitch period reuse flag may be configured in a plurality of manners. For example, the secondary channel pitch period reuse flag may be the preset second flag, or may be configured to the fourth flag. The following describes a method for configuring the secondary channel pitch period reuse flag with an example. First, it is determined whether the signal type flag is the preset first flag; if the signal type flag is the preset first flag, step 402 is performed to determine whether the frame structure similarity value falls within the preset frame structure similarity interval; and when it is determined that the frame structure similarity value falls outside the frame structure similarity interval, the secondary channel pitch period reuse flag is configured to the fourth flag. The secondary channel pitch period reuse flag indicates the fourth flag, so that the decoder side can determine to perform independent decoding on the pitch period of the secondary channel signal. In addition, it is determined whether the signal type flag is the preset first flag or the third flag, and if the signal type flag is the preset third flag, step 402 is not performed, and the pitch period of the secondary channel signal and the pitch period of the primary channel signal are directly encoded separately. That is, the pitch period of the secondary channel signal is independently encoded.

In some embodiments of this application, in the stereo encoding method performed by the encoder side, the frame structure similarity value is determined in the following manner:

performing open-loop pitch period analysis on the secondary channel signal of the current frame, to obtain an estimated open-loop pitch period value of the secondary channel signal;

determining a closed-loop pitch period reference value of the secondary channel signal based on the estimated pitch period value of the primary channel signal and a quantity of subframes into which the secondary channel signal of the current frame is divided; and determining the frame structure similarity value based on the estimated open-loop pitch period value of the secondary channel signal and the closed-loop pitch period reference value of the secondary channel signal.

After the secondary channel signal of the current frame is obtained, open-loop pitch period analysis may be performed on the secondary channel signal, to obtain the estimated open-loop pitch period value of the secondary channel signal. A specific process of the open-loop pitch period analysis is not described in detail. The quantity of subframes into which the secondary channel signal of the current frame is divided may be determined based on a subframe configuration of the secondary channel signal. For example, the secondary channel signal may be divided into four subframes or three subframes, which is specifically determined with reference to an application scenario. After the estimated pitch period value of the primary channel signal is obtained, the estimated pitch period value of the primary channel signal and the quantity of subframes into which the secondary channel signal is divided may be used to calculate the closed-loop pitch period reference value of the secondary channel signal. The closed-loop pitch period reference value of the secondary channel signal is a reference value determined based on the estimated pitch period value of the primary channel signal. The closed-loop pitch period reference value of the secondary channel signal represents a closed-loop pitch period of the secondary channel signal that is determined by using the estimated pitch period value of the primary channel signal as a reference. For example, one method is to directly use the pitch period of the primary channel signal as the closed-loop pitch period reference value of the secondary channel signal. That is, four values are selected from pitch periods of five subframes of the primary channel signal as closed-loop pitch period reference values of four subframes of the secondary channel signal. In another method, the pitch periods of the five subframes of the primary channel signal are mapped to closed-loop pitch period reference values of the four subframes of the secondary channel signal by using an interpolation method.

After the estimated open-loop pitch period value of the secondary channel signal and the closed-loop pitch period reference value of the secondary channel signal are obtained, because the closed-loop pitch period reference value of the secondary channel signal is a reference value determined by using the estimated pitch period value of the primary channel signal, as long as a difference between the estimated open-loop pitch period value of the secondary channel signal and the closed-loop pitch period reference value of the secondary channel signal is determined, the frame structure similarity value between the primary channel signal and the secondary channel signal can be calculated by using the estimated open-loop pitch period value of the secondary channel signal and the closed-loop pitch period reference value of the secondary channel signal.

Further, in some embodiments of this application, the determining a closed-loop pitch period reference value of the secondary channel signal based on the estimated pitch period value of the primary channel signal and a quantity of subframes into which the secondary channel signal of the current frame is divided includes:

determining a closed-loop pitch period integer part loc_T0 of the secondary channel signal and a closed-loop pitch period fractional part loc_frac_prim of the secondary channel signal based on the estimated pitch period value of the primary channel signal; and calculating the closed-loop pitch period reference value f_pitch_prim of the secondary channel signal in the following manner:

$$f\_pitch\_prim=loc\_T0+loc\_frac\_prim/N;$$ where

N represents the quantity of subframes into which the secondary channel signal is divided.

Specifically, the closed-loop pitch period integer part and the closed-loop pitch period fractional part of the secondary channel signal are first determined based on the estimated pitch period value of the primary channel signal. For example, an integer part of the estimated pitch period value of the primary channel signal is directly used as the closed-loop pitch period integer part of the secondary channel signal, and a fractional part of the estimated pitch period value of the primary channel signal is used as the closed-loop pitch period fractional part of the secondary channel signal. Alternatively, the estimated pitch period value of the primary channel signal may be mapped to the closed-loop pitch period integer part and the closed-loop pitch period fractional part of the secondary channel signal by using an interpolation method. For example, according to either of the foregoing methods, the closed-loop pitch period integer part loc_T0 and the closed-loop pitch period fractional part loc_frac_prim of the secondary channel may be obtained.

N represents the quantity of subframes into which the secondary channel signal is divided. For example, a value of N may be 3, 4, 5, or the like. A specific value depends on an application scenario. The closed-loop pitch period reference value of the secondary channel signal may be calculated by using the foregoing formula. In this embodiment of this application, the calculation of the closed-loop pitch period reference value of the secondary channel signal may not be limited to the foregoing formula. For example, after a result of loc_T0+loc_frac_prim/N is obtained, a correction factor may further be set. A result of multiplying the correction factor by loc_T0+loc_frac_prim/N may be used as the final output f_pitch_prim. For another example, N on the right side of the equation f_pitch_prim=loc_T0+loc_frac_prim/N may be replaced with N−1, and the final f_pitch_prim may also be calculated.

Further, in some embodiments of this application, the determining the frame structure similarity value based on the estimated open-loop pitch period value of the secondary channel signal and the closed-loop pitch period reference value of the secondary channel signal includes:

calculating the frame structure similarity value ol_pitch in the following manner:

$$ol\_pitch=T\_op-f\_pitch\_prim;$$ where

T_op represents the estimated open-loop pitch period value of the secondary channel signal, and f_pitch_prim represents the closed-loop pitch period reference value of the secondary channel signal.

Specifically, T_op represents the estimated open-loop pitch period value of the secondary channel signal, f_pitch_prim represents the closed-loop pitch period reference value of the secondary channel signal, and a difference between T_op and f_pitch_prim may be used as the final frame structure similarity value ol_pitch. Because the closed-loop pitch period reference value of the secondary channel signal is a reference value determined by using the estimated pitch period value of the primary channel signal, as long as the difference between the estimated open-loop pitch period value of the secondary channel signal and the closed-loop pitch period reference value of the secondary channel signal is determined, the frame structure similarity value between the primary channel signal and the secondary channel signal can be calculated by using the estimated open-loop pitch period value of the secondary channel signal and the closed-loop pitch period reference value of the secondary channel signal. In this embodiment of this application, calculation of the frame structure similarity value may not be limited to the foregoing formula. For example, after a result of T_op−f_pitch_prim is calculated, a correction factor may further be set, and a result of multiplying the correction factor by T_op−f_pitch_prim may be used as the final output ol_pitch. This is not limited. For another example, a correction factor may further be added to the right part of the equation ol_pitch=T_op−f_pitch_prim. A specific value of the correction factor is not limited, and the final ol_pitch may also be calculated.

403: When determining that the frame structure similarity value falls within the frame structure similarity interval, perform differential encoding on the pitch period of the secondary channel signal by using the estimated pitch period value of the primary channel signal, to obtain a pitch period index value of the secondary channel signal, where the pitch period index value of the secondary channel signal is used to generate the to-be-sent stereo encoded bitstream.

In this embodiment of this application, when the frame structure similarity value falls within the frame structure similarity interval, it may be determined that there is a frame structure similarity between the primary channel signal and the secondary channel signal. Because the primary channel signal and the secondary channel signal have the frame structure similarity, differential encoding may be performed on the pitch period of the secondary channel signal by using the estimated pitch period value of the primary channel signal. Because the foregoing differential encoding uses the estimated pitch period value of the primary channel signal, the pitch period similarity between the primary channel signal and the secondary channel signal is considered. Compared with independent encoding of the pitch period of the secondary channel signal, differential encoding in this embodiment of this application can reduce bit resource overheads required for encoding the pitch period of the secondary channel signal. In addition, saved bits are allocated to other stereo encoding parameters, to implement accurate encoding of the pitch period of the secondary channel, and improve overall stereo encoding quality.

In this embodiment of this application, after the primary channel signal of the current frame is obtained in step 401, encoding may be performed based on the primary channel signal, to obtain the estimated pitch period value of the primary channel signal. Specifically, in primary channel encoding, pitch period estimation is performed through a combination of open-loop pitch analysis and closed-loop pitch search, so as to improve accuracy of pitch period estimation. A pitch period of a speech signal may be estimated by using a plurality of methods, for example, using an autocorrelation function, or using a short-term average amplitude difference. A pitch period estimation algorithm is based on the autocorrelation function. The autocorrelation function has a peak at an integer multiple of a pitch period, and this feature can be used to estimate the pitch period. In order to improve accuracy of pitch prediction and approximate an actual pitch period of speech better, a fractional delay with a sampling resolution of ⅓ is used for pitch period detection. In order to reduce a computation amount of pitch period estimation, pitch period estimation includes two steps: open-loop pitch analysis and closed-loop pitch search. Open-loop pitch analysis is used to roughly estimate an integer delay of a frame of speech to obtain a candidate integer delay. Closed-loop pitch search is used to finely estimate a pitch delay in the vicinity of the integer delay, and closed-loop pitch search is performed once per subframe. Open-loop pitch analysis is performed once per frame, to compute autocorrelation, normalization, and an optimum open-loop integer delay. The estimated pitch period value of the primary channel signal may be obtained by using the foregoing process.

It should be noted that, in this embodiment of this application, when the frame structure similarity value falls outside the frame structure similarity interval, differential encoding cannot be performed on the pitch period of the secondary channel signal. For example, if frame structures of the primary channel signal and the secondary channel signal are not similar, the pitch period independent encoding method for the secondary channel is used to encode the pitch period of the secondary channel signal.

The following describes a specific process of differential encoding in this embodiment of this application. Specifically, step 403 of performing differential encoding on the pitch period of the secondary channel signal by using the estimated pitch period value of the primary channel signal includes:

- performing secondary channel closed-loop pitch period search based on the estimated pitch period value of the primary channel signal, to obtain an estimated pitch period value of the secondary channel signal;
- determining an upper limit of the pitch period index value of the secondary channel signal based on a pitch period search range adjustment factor of the secondary channel signal; and
- calculating the pitch period index value of the secondary channel signal based on the estimated pitch period value of the primary channel signal, the estimated pitch period value of the secondary channel signal, and the upper limit of the pitch period index value of the secondary channel signal.

The encoder side first performs secondary channel closed-loop pitch period search based on the estimated pitch period value of the secondary channel signal, to determine the estimated pitch period value of the secondary channel signal. The following describes a specific process of closed-loop pitch period search in detail. In some embodiments of this application, the performing secondary channel closed-loop pitch period search based on the estimated pitch period value of the primary channel signal, to obtain the estimated pitch period value of the secondary channel signal includes:

- performing closed-loop pitch period search by using integer precision and fractional precision and by using the closed-loop pitch period reference value of the secondary channel signal as a start point of the secondary channel signal closed-loop pitch period search, to obtain the estimated pitch period value of the secondary channel signal, where the closed-loop pitch period reference value of the secondary channel signal is determined based on the estimated pitch period value of the primary channel signal and the quantity of subframes into which the secondary channel signal of the current frame is divided.

For example, the closed-loop pitch period reference value of the secondary channel signal is determined by using the estimated pitch period value of the primary channel signal. For details, refer to the foregoing calculation process. Specifically, closed-loop pitch period search is performed by using integer precision and downsampling fractional precision and by using the closed-loop pitch period reference value of the secondary channel signal as the start point of the secondary channel signal closed-loop pitch period search, and finally an interpolated normalized correlation is computed to obtain the estimated pitch period value of the secondary channel signal. For a process of calculating the estimated pitch period value of the secondary channel signal, refer to an example in a subsequent embodiment.

The pitch period search range adjustment factor of the secondary channel signal may be used to adjust the pitch period index value of the secondary channel signal, to determine the upper limit of the pitch period index value of the secondary channel signal. The upper limit of the pitch period index value of the secondary channel signal indicates an upper limit value that the pitch period index value of the secondary channel signal cannot exceed.

In some embodiments of this application, the determining an upper limit of the pitch period index value of the secondary channel signal based on a pitch period search range adjustment factor of the secondary channel signal includes:

- calculating the upper limit soft_reuse_index_high_limit of the pitch period index value of the secondary channel signal in the following manner:

$$\text{soft\_reuse\_index\_high\_limit}=0.5+2^{Z};\ \text{where}$$

Z is the pitch period search range adjustment factor of the secondary channel signal, and a value of Z is 3, 4, or 5.

To calculate the pitch period index upper limit of the secondary channel signal in differential encoding, the pitch period search range adjustment factor Z of the secondary channel signal needs to be first determined. Then, soft_reuse_index_high_limit is obtained by using the following formula: $\text{soft\_reuse\_index\_high\_limit}=0.5+2^{Z}$. For example, Z may be 3, 4, or 5, and a specific value of Z is not limited herein, depending on an application scenario.

After determining the estimated pitch period value of the primary channel signal, the estimated pitch period value of the secondary channel signal, and the upper limit of the pitch period index value of the secondary channel signal, the encoder side performs differential encoding based on the estimated pitch period value of the primary channel signal, the estimated pitch period value of the secondary channel signal, and the upper limit of the pitch period index value of the secondary channel signal, and outputs the pitch period index value of the secondary channel signal.

Further, in some embodiments of this application, the calculating the pitch period index value of the secondary channel signal based on the estimated pitch period value of the primary channel signal, the estimated pitch period value of the secondary channel signal, and the upper limit of the pitch period index value of the secondary channel signal includes:

determining a closed-loop pitch period integer part loc_T0 of the secondary channel signal and a closed-loop pitch period fractional part loc_frac_prim of the secondary channel signal based on the estimated pitch period value of the primary channel signal; and calculating the pitch period index value soft_reuse_index of the secondary channel signal in the following manner:

$$\text{soft\_reuse\_index}=(N^*\text{pitch\_soft\_reuse}+\text{pitch\_frac\_soft\_reuse})-(N^*\text{loc\_}T0+\text{loc\_frac\_prim})+\text{soft\_reuse\_index\_high\_limit}/M;$$

where pitch_soft_reuse represents an integer part of the estimated pitch period value of the secondary channel signal, pitch_frac_soft_reuse represents a fractional part of the estimated pitch period value of the secondary channel signal, soft_reuse_index_high_limit represents the upper limit of the pitch period index value of the secondary channel signal, N represents a quantity of subframes into which the secondary channel signal is divided, M represents an adjustment factor of the upper limit of the pitch period index value of the secondary channel signal, M is a non-zero real number, * represents a multiplication operator, + represents an addition operator, and − represents a subtraction operator.

Specifically, the closed-loop pitch period integer part loc_T0 of the secondary channel signal and the closed-loop pitch period fractional part loc_frac_prim of the secondary channel signal are first determined based on the estimated pitch period value of the primary channel signal. For details, refer to the foregoing calculation process. N represents the quantity of subframes into which the secondary channel signal is divided, for example, a value of N may be 3, 4, or 5. M represents the adjustment factor of the upper limit of the pitch period index value of the secondary channel signal, and M is a non-zero real number, for example, a value of M may be 2 or 3. Values of N and M depend on an application scenario, and are not limited herein.

In this embodiment of this application, calculation of the pitch period index value of the secondary channel signal may not be limited to the foregoing formula. For example, after a result of (N*pitch_soft_reuse+pitch_frac_soft_reuse)−(N*loc_T0+loc_frac_prim)+soft_reuse_index-_high_ limit/M is calculated, a correction factor may be further set, and a result obtained by multiplying the correction factor by (N*pitch_soft_reuse+pitch_frac_soft_reuse)−(N*loc_T0+loc_frac_prim)+soft_reuse_index_high_ limit/M may be used as a final output soft_reuse_index.

For another example, a correction factor may further be added to the right of the equation: soft_reuse_index=(N*pitch_soft_reuse+pitch_frac_soft_reuse)−(N*loc_T0+loc_frac_prim)+soft_reuse_index_high_limit/M. A specific value of the correction factor is not limited, and a final soft_reuse_index may also be calculated.

In this embodiment of this application, the stereo encoded bitstream generated by the encoder side may be stored in a computer-readable storage medium.

In this embodiment of this application, differential encoding is performed on the pitch period of the secondary channel signal by using the estimated pitch period value of the primary channel signal, to obtain the pitch period index value of the secondary channel signal. The pitch period index value of the secondary channel signal is used to indicate the pitch period of the secondary channel signal. After the pitch period index value of the secondary channel signal is obtained, the pitch period index value of the secondary channel signal may be further used to generate the to-be-sent stereo encoded bitstream. After generating the stereo encoded bitstream, the encoder side may output the stereo encoded bitstream, and send the stereo encoded bitstream to the decoder side through an audio transmission channel.

411: Determine, based on the received stereo encoded bitstream, whether to perform differential decoding on the pitch period of the secondary channel signal.

In this embodiment of this application, it is determined, based on the received stereo encoded bitstream, whether to perform differential decoding on the pitch period of the secondary channel signal. For example, the decoder side may determine, based on indication information carried in the stereo encoded bitstream, whether to perform differential decoding on the pitch period of the secondary channel signal. For another example, after a transmission environment of the stereo signal is preconfigured, whether to perform differential decoding may be preconfigured. In this case, the decoder side may further determine, based on a result of the preconfiguration, whether to perform differential decoding on the pitch period of the secondary channel signal.

In some embodiments of this application, step 411 of determining, based on the received stereo encoded bitstream, whether to perform differential decoding on the pitch period of the secondary channel signal includes:

obtaining the secondary channel signal pitch period reuse flag and the signal type flag from the current frame, where the signal type flag is used to identify a signal type of the primary channel signal and a signal type of the secondary channel signal; and when the signal type flag is the preset first flag and the secondary channel signal pitch period reuse flag is the second flag, determining to perform differential decoding on the pitch period of the secondary channel signal.

In this embodiment of this application, the secondary channel pitch period reuse flag may be configured in a plurality of manners. For example, the secondary channel pitch period reuse flag may be the preset second flag, or may be configured to the fourth flag. For example, the value of the secondary channel pitch period reuse flag may be 0 or 1, where the second flag is 1, and the fourth flag is 0. Similarly, the signal type flag may be the preset first flag or the third flag. For example, the value of the signal type flag may be 0 or 1, where the first flag is 1, and the third flag is 0. For example, when the value of the secondary channel pitch period reuse flag is 1, and when the value of the signal type flag is 1, step 412 is triggered.

For example, the secondary channel pitch period reuse flag is soft_pitch_reuse_flag, and the signal type flag of the primary and secondary channels is both_chan_generic. For example, during secondary channel decoding, the signal type flag both_chan_generic of the primary channel and the secondary channel is read from the bitstream. When both_chan_generic is 1, the secondary channel pitch period reuse flag soft_pitch_reuse_flag is read from the bitstream. When the frame structure similarity value falls within the frame structure similarity interval, soft_pitch_reuse_flag is 1, the differential decoding method in this embodiment of this application is performed; or when the frame structure similarity value falls outside the frame structure similarity interval, soft_pitch_reuse_flag is 0, and the independent decoding method is performed. For example, in this embodiment of this application, the differential decoding process in step 412 and step 413 is performed only when both soft_pitch_reuse_flag and both_chan_generic are 1.

In some other embodiments of this application, the stereo decoding method performed by the decoder side may further include the following step based on values of the secondary channel pitch period reuse flag and the signal type flag:

when the signal type flag is the preset first flag and the secondary channel signal pitch period reuse flag is the fourth flag, or when the signal type flag is the preset third identifier, separately decoding the pitch period of the secondary channel signal and the pitch period of the primary channel signal.

When the signal type flag is the first flag, and the secondary channel signal pitch period reuse flag is the fourth flag, it is determined not to perform the differential decoding process in step 412 and step 413. Instead, the pitch period of the secondary channel signal and the pitch period of the primary channel signal are decoded separately, that is, the pitch period of the secondary channel signal is decoded independently. For another example, when the signal type flag is the preset third flag, it is determined that the differential decoding process in step 412 and step 413 is not performed, and the pitch period of the secondary channel signal and the pitch period of the primary channel signal are separately decoded. The decoder side may determine, based on the secondary channel pitch period reuse flag and the signal type flag that are carried in the stereo encoded bitstream, to execute the differential decoding method or the independent decoding method.

412: When determining to perform differential decoding on the pitch period of the secondary channel signal, obtain, from the stereo encoded bitstream, the estimated pitch period value of the primary channel signal of the current frame and the pitch period index value of the secondary channel signal of the current frame.

In this embodiment of this application, after the encoder side sends the stereo encoded bitstream, the decoder side first receives the stereo encoded bitstream through the audio transmission channel, and then performs channel decoding based on the stereo encoded bitstream. If differential decoding needs to be performed on the pitch period of the secondary channel signal, the pitch period index value of the secondary channel signal of the current frame may be obtained from the stereo encoded bitstream, and the estimated pitch period value of the primary channel signal of the current frame may be obtained from the stereo encoded bitstream.

413: Perform differential decoding on the pitch period of the secondary channel signal based on the estimated pitch period value of the primary channel signal and the pitch period index value of the secondary channel signal, to obtain the estimated pitch period value of the secondary channel signal, where the estimated pitch period value of the secondary channel signal is used for decoding to obtain a stereo decoded bitstream.

In this embodiment of this application, when it is determined in step 411, that differential decoding needs to be performed on the pitch period of the secondary channel signal, it may be determined that there is a frame structure similarity between the primary channel signal and the secondary channel signal. Because the frame structure similarity exists between the primary channel signal and the secondary channel signal, differential decoding may be performed on the pitch period of the secondary channel signal by using the estimated pitch period value of the primary channel signal and the pitch period index value of the secondary channel signal, to implement accurate decoding of the pitch period of the secondary channel and improve overall stereo decoding quality.

The following describes a specific differential decoding process in this embodiment of this application. Specifically, step 413 of performing differential decoding on the pitch period of the secondary channel signal based on the estimated pitch period value of the primary channel signal and the pitch period index value of the secondary channel signal includes:

determining the closed-loop pitch period reference value of the secondary channel signal based on the estimated pitch period value of the primary channel signal and the quantity of subframes into which the secondary channel signal of the current frame is divided; and determining the upper limit of the pitch period index value of the secondary channel signal based on the pitch period search range adjustment factor of the secondary channel signal; and calculating the estimated pitch period value of the secondary channel signal based on the closed-loop pitch period reference value of the secondary channel signal, the pitch period index value of the secondary channel signal, and the upper limit of the pitch period index value of the secondary channel signal.

For example, the closed-loop pitch period reference value of the secondary channel signal is determined by using the estimated pitch period value of the primary channel signal. For details, refer to the foregoing calculation process. The pitch period search range adjustment factor of the secondary channel signal may be used to adjust the pitch period index value of the secondary channel signal, to determine the upper limit of the pitch period index value of the secondary channel signal. The upper limit of the pitch period index value of the secondary channel signal indicates an upper limit value that the pitch period index value of the secondary channel signal cannot exceed. The pitch period index value of the secondary channel signal may be used to determine the pitch period index value of the secondary channel signal.

After determining the closed-loop pitch period reference value of the secondary channel signal, the pitch period index value of the secondary channel signal, and the upper limit of the pitch period index value of the secondary channel signal, the decoder side performs differential decoding based on the closed-loop pitch period reference value of the secondary channel signal, the pitch period index value of the secondary channel signal, and the upper limit of the pitch period index value of the secondary channel signal, and outputs the estimated pitch period value of the secondary channel signal.

Further, in some embodiments of this application, the calculating the estimated pitch period value of the secondary channel signal based on the closed-loop pitch period reference value of the secondary channel signal, the pitch period index value of the secondary channel signal, and the upper limit of the pitch period index value of the secondary channel signal includes:

calculating the estimated pitch period value T0_pitch of the secondary channel signal in the following manner:

$$T0\_pitch=f\_pitch\_prim+(soft\_reuse\_index-soft\_reuse\_index\_high\_limit/M)/N;$$ where f_pitch_prim represents the closed-loop pitch period reference value of the secondary channel signal, soft_reuse_index represents the pitch period index value of the secondary channel signal, N represents the quantity of subframes into which the secondary channel signal is divided, M represents an adjustment factor of the upper limit of the pitch period index value of the secondary channel signal, M is a non-zero real number, / represents a division operator, + represents an addition operator, and − represents a subtraction operator.

Specifically, the closed-loop pitch period integer part loc_T0 of the secondary channel signal and the closed-loop pitch period fractional part loc_frac_prim of the secondary channel signal are first determined based on the estimated pitch period value of the primary channel signal. For details, refer to the foregoing calculation process. N represents the quantity of subframes into which the secondary channel signal is divided, for example, a value of N may be 3, 4, or 5. M represents the adjustment factor of the upper limit of the pitch period index value of the secondary channel signal, and M is a non-zero real number, for example, a value of M may be 2 or 3. Values of N and M depend on an application scenario, and are not limited herein.

In this embodiment of this application, calculation of the estimated pitch period value of the secondary channel signal may not be limited to the foregoing formula. For example, after a result of f_pitch_prim+(soft_reuse_index−soft_reuse_index_high_limit/M)/N is calculated, a correction factor may be further set, and a result obtained by multiplying the correction factor by f_pitch_prim+(soft_reuse_index−soft_reuse_index_high_limit/M)/N may be used as the final output T0_pitch. For another example, a correction factor may further be added to the right of the equation: T0_pitch=f_pitch_prim+(soft_reuse_index−softreuse_index_high_limit/M)/N, a specific value of the correction factor is not limited, and the final T0_pitch may also be calculated.

It should be noted that after the estimated pitch period value T0_pitch of the secondary channel signal is calculated, an integer part T0 of the estimated pitch period value and a fractional part T0_frac of the estimated pitch period value of the secondary channel signal may be further calculated based on the estimated pitch period value T0_pitch of the secondary channel signal. For example, T0=INT(T0 pitch), and T0_frac=(T0_pitch−T0)*N. INT(T0_pitch) indicates to round down T0_pitch to the nearest integer, T0 indicates to decode the integer part of the pitch period of the secondary channel, and T0_frac indicates to decode the fractional part of the pitch period of the secondary channel.

According to the description of the examples of the foregoing embodiment, in this embodiment of this application, because differential encoding is performed on the pitch period of the secondary channel signal by using the estimated pitch period value of the primary channel signal, the pitch period of the secondary channel signal does not need to be independently encoded. Therefore, a small quantity of bit resources may be allocated to the pitch period of the secondary channel signal for differential encoding, and differential encoding is performed on the pitch period of the secondary channel signal, so that a sense of space and sound image stability of the stereo signal can be improved. In addition, in this embodiment of this application, a relatively small quantity of bit resources are used to perform differential encoding on the pitch period of the secondary channel signal. Therefore, saved bit resources may be used for other stereo encoding parameters, so that encoding efficiency of the secondary channel is improved, and finally overall stereo encoding quality is improved. In this embodiment of this application, when differential decoding may be performed on the pitch period of the secondary channel signal, differential decoding may be performed on the pitch period of the secondary channel signal by using the estimated pitch period value of the primary channel signal. Differential decoding is performed on the pitch period of the secondary channel signal, so that a sense of space and sound image stability of the stereo signal can be improved. In addition, in this embodiment of this application, differential decoding of the pitch period of the secondary channel signal is used, so that decoding efficiency of the secondary channel is improved, and finally overall stereo decoding quality is improved.

To better understand and implement the foregoing solutions in the embodiments of this application, the following provides detailed descriptions by using an example of a corresponding application scenario.

In the pitch period encoding solution for the secondary channel signal proposed in this embodiment of this application, a frame structure similarity calculation criterion is set in an encoding process of the pitch period of the secondary channel signal, and may be used to calculate a frame structure similarity value. Whether the frame structure similarity value falls within the preset frame structure similarity interval is determined, and if the frame structure similarity value falls within the preset frame structure similarity interval, the pitch period of the secondary channel signal is encoded by using a differential encoding method oriented to the pitch period of the secondary channel signal. In this way, a small quantity of bits are used to perform differential encoding, and saved bits are allocated to other stereo encoding parameters, to achieve accurate encoding of the pitch period of the secondary channel signal and improve the overall stereo encoding quality.

In this embodiment of this application, the stereo signal may be an original stereo signal, or a stereo signal formed by two channels of signals included in a multi-channel signal, or a stereo signal formed by two channels of signals that are jointly generated by a plurality of channels of signals included in a multi-channel signal. The stereo encoding apparatus may constitute an independent stereo encoder, or may be used in a core encoding part in a multi-channel encoder, to encode a stereo signal including two channels of signals jointly generated by a plurality of channels of signals included in a multi-channel signal.

Figure 5A:
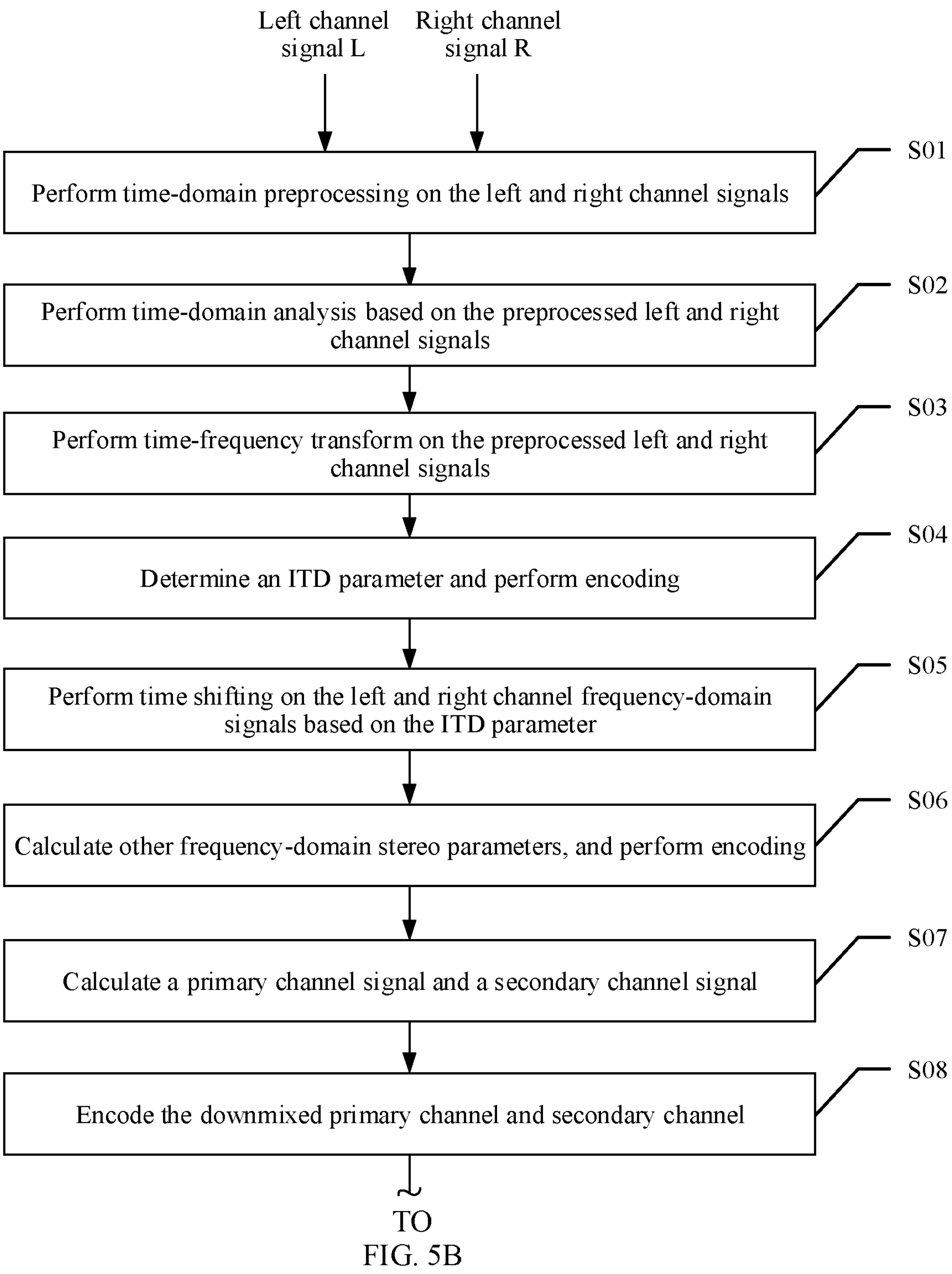
FIG. 5A and FIG. 5B are a schematic flowchart of stereo signal encoding according to an embodiment of this application.
Figure 5B:
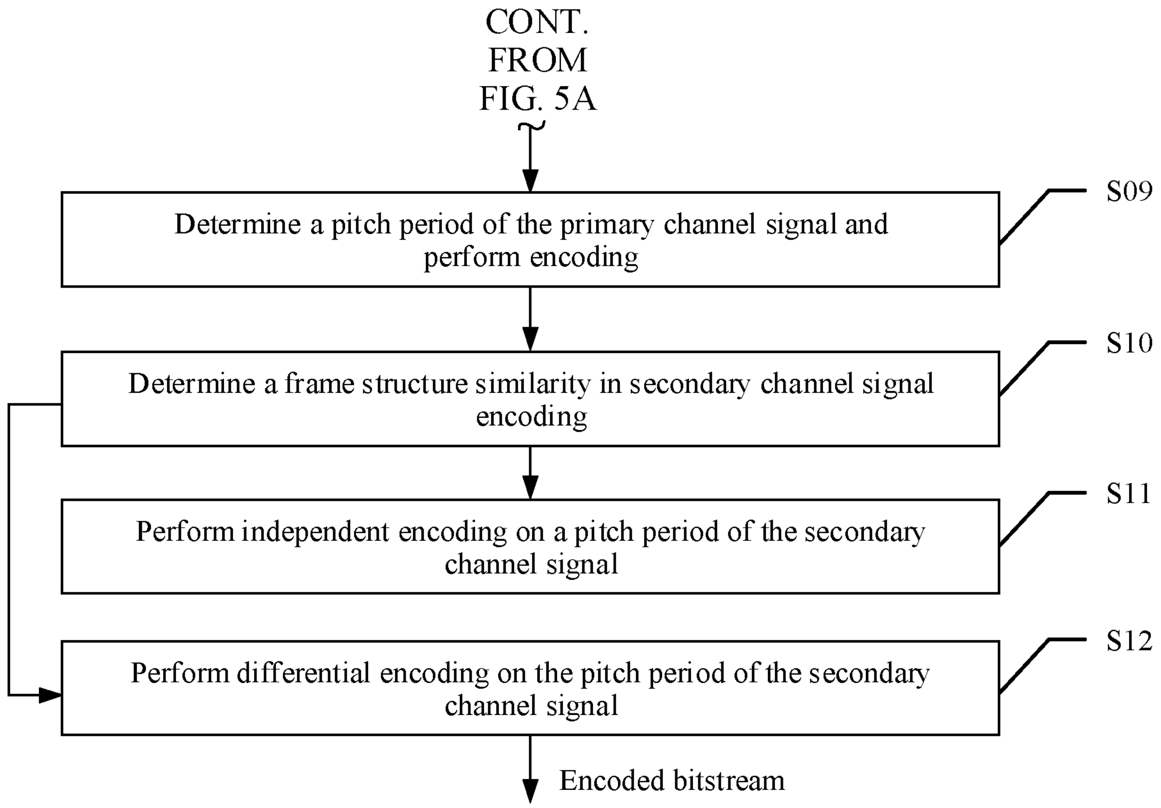

In this embodiment of this application, an example in which the encoding rate of the stereo signal is 32 kbps is used for description. It may be understood that this embodiment of this application is not limited to implementation at a 32 kbps encoding rate, and may further be applied to stereo encoding at a higher rate. FIG. 5A and FIG. 5B are a schematic flowchart of stereo signal encoding according to an embodiment of this application. This embodiment of this application provides a pitch period encoding determining method in stereo coding. The stereo coding may be time-domain stereo coding, or may be frequency-domain stereo coding, or may be time-frequency combined stereo coding. This is not limited in this embodiment of this application.

Using frequency-domain stereo coding as an example, the following describes an encoding/decoding process of stereo coding, and focuses on an encoding process of a pitch period in secondary channel signal coding in subsequent steps. Specifically, First, an encoder side of frequency-domain stereo coding is described. Specific implementation steps of the encoder side are as follows:

S01: Perform time-domain preprocessing on left and right channel time-domain signals.

Stereo signal encoding is generally performed through frame division. If a sampling rate of a stereo audio signal is 16 KHz, each frame of signal is 20 ms, and a frame length is denoted as N, N=320, that is, the frame length is equal to 320 sampling points. A stereo signal of a current frame includes a left channel time-domain signal of the current frame and a right channel time-domain signal of the current frame. The left channel time-domain signal of the current frame is denoted as $x_L(n)$, and the right channel time-domain signal of the current frame is denoted as $x_R(n)$, where n is a sampling point number, and n=0, 1, . . . , N−1. The left and right channel time-domain signals of the current frame are short for the left channel time-domain signal of the current frame and the right channel time-domain signal of the current frame.

Specifically, the performing time-domain preprocessing on left and right channel time-domain signals of the current frame may include: performing high-pass filtering on the left and right channel time-domain signals of the current frame to obtain preprocessed left and right channel time-domain signals of the current frame. The preprocessed left channel time-domain signal of the current frame is denoted as $x_{L\_HP}(n)$, and the preprocessed right channel time-domain signal of the current frame is denoted as $x_{R\_HP}(n)$. Herein, n is a sampling point number, and n=0, 1, . . . , N−1. The preprocessed left and right channel time-domain signals of the current frame are short for the preprocessed left channel time-domain signal of the current frame and the preprocessed right channel time-domain signal of the current frame. High-pass filtering may be performed by an infinite impulse response (IIR) filter whose cut-off frequency is 20 Hz, or may be performed by a filter of another type. For example, a transfer function of a high-pass filter whose sampling rate is 16 KHz and that corresponds to a cut-off frequency of 20 Hz is:

$$H_{20\ Hz}(z) = \frac{b_0 + b_1 z^{-1} + b_2 z^{-2}}{1 + a_1 z^{-1} + a_2 z^{-2}};$$

where $b_0$=0.994461788958195, $b_1$=−1.988923577916390, $b_2$=0.994461788958195, $a_1$=1.988892905899653, $a_2$=−0.988954249933127, and z is a transform factor of Z transform.

A corresponding time-domain filter is as follows:

$$x_{L\_HP}(n)=b_0*x_L(n)+b_1*x_L(n-1)+b_2*x_L(n-2)-a_1*x_{L\_HP}(n-1)-a_2*x_{L\_HP}(n-2).$$

It may be understood that performing time-domain preprocessing on the left and right channel time-domain signals of the current frame is not a necessary step. If there is no time-domain preprocessing step, left and right channel signals used for delay estimation are left and right channel signals in the original stereo signal. Herein, the left and right channel signals in the original stereo signal refer to a pulse code modulation (PCM) signal obtained after analog-to-digital conversion. A sampling rate of the signal may include 8 KHz, 16 KHz, 32 KHz, 44.1 KHz, and 48 KHz. In addition, in addition to the high-pass filtering described in this embodiment, the preprocessing may further include other processing, for example, pre-emphasis processing. This is not limited in this embodiment of this application.

S02: Perform time-domain analysis based on the preprocessed left and right channel signals.

Specifically, the time-domain analysis may include transient detection and the like. The transient detection may be separately performing energy detection on the preprocessed left and right channel time-domain signals of the current frame, for example, detecting whether a sudden energy change occurs in the current frame. For example, energy $E_{cur\_L}$ of the preprocessed left channel time-domain signal of the current frame is calculated, and transient detection is performed based on an absolute value of a difference between energy $E_{pre\_L}$ of a preprocessed left channel time-domain signal of a previous frame and the energy $E_{cur\_L}$ of the preprocessed left channel time-domain signal of the current frame, to obtain a transient detection result of the preprocessed left channel time-domain signal of the current frame. Similarly, the same method may be used to perform transient detection on the preprocessed right channel time-domain signal of the current frame. The time-domain analysis may include other time-domain analysis in addition to transient detection, for example, may include determining a time-domain inter-channel time difference (ITD) parameter, delay alignment processing in time domain, and frequency band extension preprocessing.

S03: Perform time-frequency transform on the preprocessed left and right channel signals, to obtain left and right channel frequency-domain signals.

Specifically, discrete Fourier transform may be performed on the preprocessed left channel signal to obtain the left channel frequency-domain signal, and discrete Fourier transform may be performed on the preprocessed right channel signal to obtain the right channel frequency-domain signal. To overcome a problem of spectral aliasing, an overlap-add method may be used for processing between two consecutive times of discrete Fourier transform, and sometimes, zero may be added to an input signal of discrete Fourier transform.

Discrete Fourier transform may be performed once per frame. Alternatively, each frame of signal may be divided into P subframes, and discrete Fourier transform is performed once per subframe. If discrete Fourier transform is performed once per frame, the transformed left channel frequency-domain signal may be denoted as L(k), where k=0, 1, . . . , L/2−1, and L represents a sampling point; and the transformed right channel frequency-domain signal may be denoted as R(k), where k=0, 1 . . . , L/2−1, and k is a frequency bin index value. If discrete Fourier transform is performed once per subframe, a transformed left channel frequency-domain signal of the subframe may be denoted as $L_i(k)$, where k=0, 1, . . . , L/2−1; and a transformed right channel frequency-domain signal of the $i^{th}$ subframe may be denoted as $R_i(k)$, where k=0, 1, . . . , L/2−1, k is a frequency bin index value, i is a subframe index value, and i=0, 1, . . . , P−1. For example, in this embodiment, wideband is used as an example. The wideband means that an encoding bandwidth may be 8 KHz or greater, each frame of left channel signal or each frame of right channel signal is 20 ms, and a frame length is denoted as N. In this case, N=320, that is, the frame length is 320 sampling points. Each frame of signal is divided into two subframes, that is, P=2. Each subframe of signal is 10 ms, and a subframe length is 160 sampling points. Discrete Fourier transform is performed once per subframe. A length of the discrete Fourier transform is denoted as L, and L=400, that is, the length of the discrete Fourier transform is 400 sampling points. In this case, a transformed left channel frequency-domain signal of the $i^{th}$ subframe may be denoted as $L_i(k)$, where k=0, 1, . . . , L/2−1; and a transformed right channel frequency-domain signal of the $i^{th}$ subframe may be denoted as $R_i(k)$, where k=0, 1, . . . , L/2−1, k is a frequency bin index value, i is a subframe index value, and i=0, 1, . . . , P−1.

S04: Determine an ITD parameter, and encode the ITD parameter.

There are a plurality of methods for determining the ITD parameter. The ITD parameter may be determined only in frequency domain, may be determined only in time domain, or may be determined in time-frequency domain. This is not limited in this embodiment of this application.

For example, the ITD parameter may be extracted in time domain by using a cross-correlation coefficient between the left and right channels. For example, in a range of 0≤i≤Tmax, $$c_n(i) = \sum_{j=0}^{N-1-i} x_{R\_HP}(j)\cdot x_{L\_HP}(j+1)$$

and $$c_p(i) = \sum_{j=0}^{N-1-i} x_{L\_HP}(j)\cdot x_{R\_HP}(j+1)$$

are calculated. If $$\max_{0\le i\le Tmax}(c_n(i)) > \max_{0\le i\le Tmax}(c_p(i)),$$

the ITD parameter value is an inverse number of an index value corresponding to max(Cn(i)), where an index table corresponding to the max(Cn(i)) value is specified in the codec by default; otherwise, the ITD parameter value is an index value corresponding to max(Cp(i)).

Herein, i is an index value for calculating the cross-correlation coefficient, j is an index value of a sampling point, Tmax corresponds to a maximum value of ITD values at different sampling rates, and N is a frame length. The ITD parameter may alternatively be determined in frequency domain based on the left and right channel frequency-domain signals. For example, time-frequency transform technologies such as discrete Fourier transform (DFT), fast Fourier transform (FFT), and modified discrete cosine transform (MDCT) may be used to transform a time-domain signal into a frequency-domain signal. In this embodiment, a DFT-transformed left channel frequency-domain signal of the $i^{th}$ subframe is $L_i(k)$, where k=0, 1, . . . , L/2−1, and a transformed right channel frequency-domain signal of the $i^{th}$ subframe is $R_i(k)$, where k=0, 1, . . . , L/2−1, and i=0, 1, . . . , P−1. A frequency-domain correlation coefficient of the $i^{th}$ subframe is calculated: $XCORR_i(k)=L_i(k)*R^*_i(k)$. $R^*_i(k)$ is a conjugate of the time-frequency transformed right channel frequency-domain signal of the $i^{th}$ subframe. The frequency-domain cross-correlation coefficient is transformed to time domain $xcorr_i(n)$, where n=0, 1, . . . , L−1, and a maximum value of $xcorr_i(n)$ is searched for in a range of $L/2-T_{max}\le n\le L/2+T_{max}$, to obtain an ITD parameter value $$T_i = \arg\max_{L/2-T_{max}\le n\le L/2+T_{max}}(xcorr_i(n)) - \frac{L}{2}$$

of the $i^{th}$ subframe.

For another example, a magnitude value:

$$mag(j) = \sum_{i=0}^{1}\sum_{k=0}^{L/2-1} L_i(k)*R_i(k)*\exp\left(\frac{2\pi*k*j}{L}\right)$$

may be calculated within a search range of $-T_{max}\le j\le T_{max}$ based on the DFT-transformed left channel frequency-domain signal of the $i^{th}$ subframe and the DFT-transformed right channel frequency-domain signal of the $i^{th}$ subframe, and the ITD parameter value is $$T = \arg\max_{-T_{max}\le j\le T_{max}}(mag(j)),$$

that is, an index value corresponding to a maximum magnitude value.

After the ITD parameter is determined, residual encoding and entropy encoding need to be performed on the ITD parameter in the encoder, and then the ITD parameter is written into a stereo encoded bitstream.

S05: Perform time shifting adjustment on the left and right channel frequency-domain signals based on the ITD parameter.

In this embodiment of this application, time shifting adjustment is performed on the left and right channel frequency-domain signals in a plurality of manners, which are described in the following with examples.

In this embodiment, an example in which each frame of signal is divided into P subframes, and P=2 is used. A left channel frequency-domain signal of the $i^{th}$ subframe after time shifting adjustment may be denoted as $L_i'(k)$, where k=0, 1, . . . , L/2−1. Aright channel frequency-domain signal of the $i^{th}$ subframe after time shifting adjustment may be denoted as $R_i'(k)$, where k=0, 1, . . . , L/2−1, k is a frequency bin index value, and i=0, 1, . . . , P−1.

$$L_i'(k) = L_i(k)*e^{-j2\pi\frac{\tau_i}{L}}$$
$$R_i'(k) = R_i(k)*e^{-j2\pi\frac{\tau_i}{L}};$$

where $\tau_i$ is an ITD parameter value of the $i^{th}$ subframe, L is a length of the discrete Fourier transform, $L_i(k)$ is a time-frequency transformed left channel frequency-domain signal of the $i^{th}$ subframe, $R_i(k)$ is a transformed right channel frequency-domain signal of the $i^{th}$ subframe, i is a subframe index value, and i=0, 1, . . . , P−1.

It may be understood that, if DFT is not performed through frame division, the time shifting adjustment may be performed once for an entire frame. After frame division, time shifting adjustment is performed based on each subframe. If frame division is not performed, time shifting adjustment is performed based on each frame.

S06: Calculate other frequency-domain stereo parameters, and perform encoding.

The other frequency-domain stereo parameters may include but are not limited to: an inter-channel phase difference (IPD) parameter, an inter-channel level difference (also referred to as an inter-channel amplitude difference) (ILD) parameter, a subband side gain, and the like. This is not limited in this embodiment of this application. After the other frequency-domain stereo parameters are obtained through calculation, residual encoding and entropy encoding need to be performed on the other frequency-domain stereo parameters, and then the other frequency-domain stereo parameters are written into the stereo encoded bitstream.

S07: Calculate a primary channel signal and a secondary channel signal.

The primary channel signal and the secondary channel signal are calculated. Specifically, any time-domain downmix processing or frequency-domain downmix processing method in the embodiments of this application may be used. For example, the primary channel signal and the secondary channel signal of the current frame may be calculated based on the left channel frequency-domain signal of the current frame and the right channel frequency-domain signal of the current frame. A primary channel signal and a secondary channel signal of each subband corresponding to a preset low frequency band of the current frame may be calculated based on a left channel frequency-domain signal of each subband corresponding to the preset low frequency band of the current frame and a right channel frequency-domain signal of each subband corresponding to the preset low frequency band of the current frame. Alternatively, a primary channel signal and a secondary channel signal of each subframe of the current frame may be calculated based on a left channel frequency-domain signal of each subframe of the current frame and a right channel frequency-domain signal of each subframe of the current frame. Alternatively, a primary channel signal and a secondary channel signal of each subband corresponding to a preset low frequency band in each subframe of the current frame may be calculated based on a left channel frequency-domain signal of each subband corresponding to the preset low frequency band in each subframe of the current frame and a right channel frequency-domain signal of each subband corresponding to the preset low frequency band in each subframe of the current frame. The primary channel signal may be obtained by adding the left channel time-domain signal of the current frame and the right channel time-domain signal of the current frame, and the secondary channel signal may be obtained by calculating a difference between the left channel time-domain signal and the right channel time-domain signal.

In this embodiment, because frame division processing is performed on each frame of signal, a primary channel signal and a secondary channel signal of each subframe are transformed to time domain through inverse transform of discrete Fourier transform, and overlap-add processing is performed, to obtain a time-domain primary channel signal and secondary channel signal of the current frame.

It should be noted that a process of obtaining the primary channel signal and the secondary channel signal in step S07 is referred to as downmix processing, and starting from step S08, the primary channel signal and the secondary channel signal are processed.

S08: Encode the downmixed primary channel signal and secondary channel signal.

Specifically, bit allocation may be first performed for encoding of the primary channel signal and encoding of the secondary channel signal based on parameter information obtained in encoding of a primary channel signal and a secondary channel signal in the previous frame and a total quantity of bits for encoding the primary channel signal and the secondary channel signal. Then, the primary channel signal and the secondary channel signal are separately encoded based on a result of bit allocation. Primary channel signal encoding and secondary channel signal encoding may be implemented by using any mono audio encoding technology. For example, an ACELP encoding method is used to encode the primary channel signal and the secondary channel signal that are obtained through downmix processing. The ACELP encoding method generally includes: determining a linear prediction coefficient (LPC) and transforming the linear prediction coefficient into a line spectral frequency (LSF) for quantization and encoding; searching for an adaptive code excitation to determine a pitch period and an adaptive codebook gain, and performing quantization and encoding on the pitch period and the adaptive codebook gain separately; and searching for an algebraic code excitation to determine a pulse index and a gain of the algebraic code excitation, and performing quantization and encoding on the pulse index and the gain of the algebraic code excitation separately.

Figure 6:
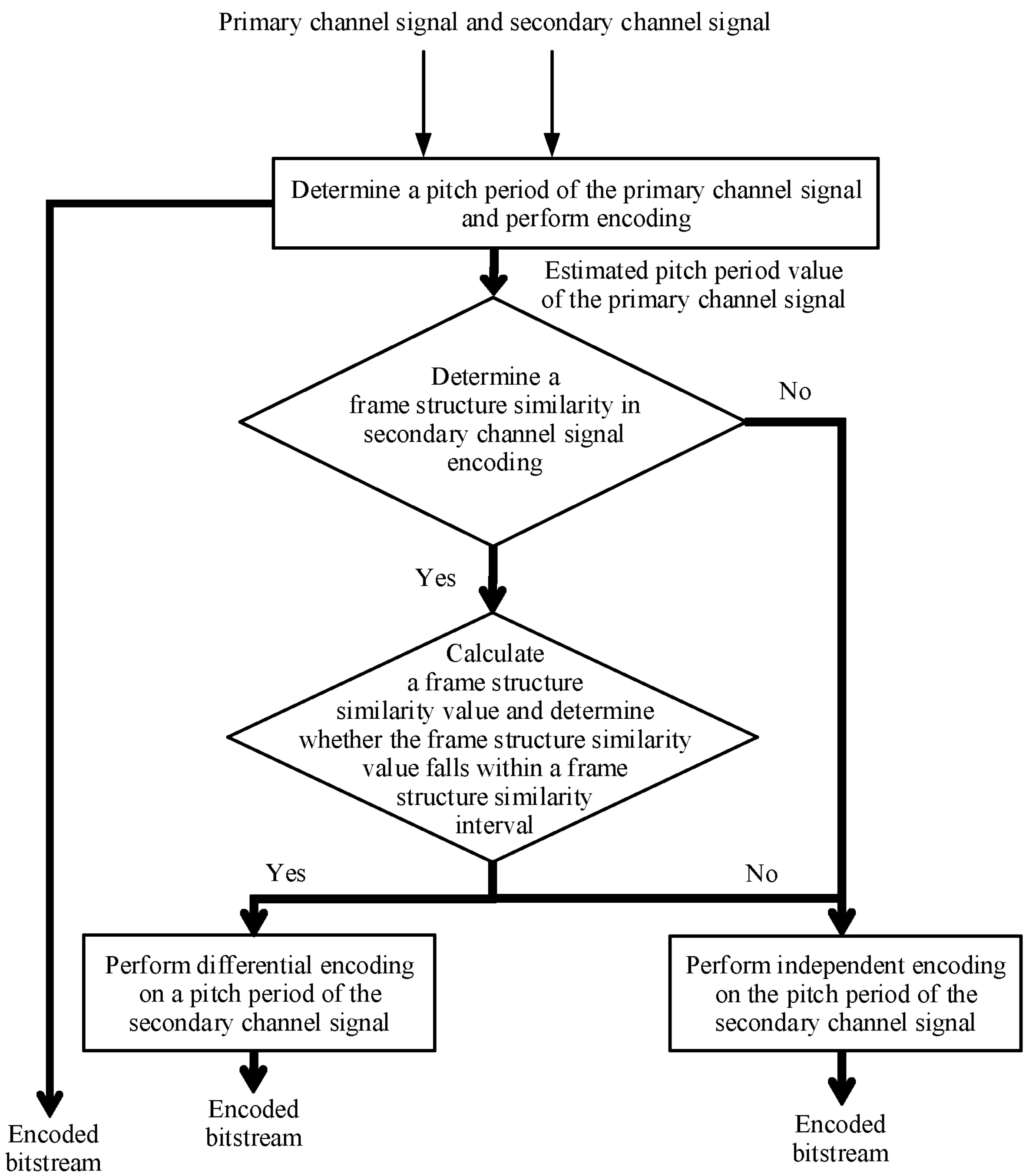
FIG. 6 is a flowchart of encoding a pitch period parameter of a primary channel signal and a pitch period parameter of a secondary channel signal according to an embodiment of this application.

FIG. 6 is a flowchart of encoding a pitch period parameter of a primary channel signal and a pitch period parameter of a secondary channel signal according to an embodiment of this application. The process shown in FIG. 6 includes the following steps S09 to S12. A process of encoding the pitch period parameter of the primary channel signal and the pitch period parameter of the secondary channel signal is as follows:

S09: Determine a pitch period of the primary channel signal and perform encoding.

Specifically, during encoding of the primary channel signal, pitch period estimation is performed through a combination of open-loop pitch analysis and closed-loop pitch search, so as to improve accuracy of pitch period estimation. A pitch period of a speech may be estimated by using a plurality of methods, for example, using an autocorrelation function, or using a short-term average amplitude difference. A pitch period estimation algorithm is based on the autocorrelation function. The autocorrelation function has a peak at an integer multiple of a pitch period, and this feature can be used to estimate the pitch period. In order to improve accuracy of pitch prediction and approximate an actual pitch period of speech better, a fractional delay with a sampling resolution of ⅓ is used for pitch period detection. In order to reduce a computation amount of pitch period estimation, pitch period estimation includes two steps: open-loop pitch analysis and closed-loop pitch search. Open-loop pitch analysis is used to roughly estimate an integer delay of a frame of speech to obtain a candidate integer delay. Closed-loop pitch search is used to finely estimate a pitch delay in the vicinity of the integer delay, and closed-loop pitch search is performed once per subframe. Open-loop pitch analysis is performed once per frame, to compute autocorrelation, normalization, and an optimum open-loop integer delay.

An estimated pitch period value of the primary channel signal that is obtained through the foregoing steps is used as a pitch period encoding parameter of the primary channel signal and is further used as a pitch period reference value of the secondary channel signal.

S10: Determine a frame structure similarity in secondary channel signal encoding.

In secondary channel signal encoding, a pitch period reuse decision of the secondary channel signal is made according to a frame structure similarity determining criterion.

S101: Determine the frame structure similarity.

Specifically, whether to calculate a frame structure similarity value may be determined based on a signal type flag both_chan_generic of the primary channel signal and the secondary channel signal, and then a value of a secondary channel signal pitch period reuse flag soft_pitch_reuse_flag is determined based on whether the frame structure similarity value falls within a preset frame structure similarity interval. For example, in secondary channel encoding, soft_pitch_reuse_flag and both_chan_generic each are defined as 0 or 1, and are used to indicate whether the primary channel signal and the secondary channel signal have a frame structure similarity. First, it is determined that the signal type flag of the primary and secondary channels is both_chan_generic. When both_chan_generic is 1, both the primary and secondary channels of the current frame are in generic mode. The secondary channel pitch period reuse flag soft_pitch_reuse_flag is set based on whether the frame structure similarity value falls within the frame structure similarity interval. When the frame structure similarity value falls within the frame structure similarity interval, soft_pitch_reuse_flag is 1, and the differential encoding method in this embodiment of this application is performed. When the frame structure similarity value falls outside the frame structure similarity interval, soft_pitch_reuse_flag is 0, and the independent encoding method is performed.

S102: If there is no frame structure similarity, encode the pitch period of the secondary channel signal by using a pitch period independent encoding method for the secondary channel signal.

S103: Calculate a frame structure similarity value.

Specific steps of calculating the frame structure similarity value include:

S10301: Perform pitch period mapping.

In this embodiment, an encoding rate of 32 kbps is used as an example. Pitch period encoding is performed based on subframes, the primary channel signal is divided into five subframes, and the secondary channel signal is divided into four subframes. The pitch period reference value of the secondary channel signal is determined based on the pitch period of the primary channel signal. One method is to directly use the pitch period of the primary channel signal as the pitch period reference value of the secondary channel signal. That is, four values are selected from pitch periods of the five subframes of the primary channel signal as pitch period reference values of the four subframes of the secondary channel signal. In another method, the pitch periods of the five subframes of the primary channel signal are mapped to pitch period reference values of the four subframes of the secondary channel signal by using an interpolation method. According to either of the foregoing methods, the closed-loop pitch period reference value of the secondary channel signal can be obtained, where an integer part is loc_T0, and a fractional part is loc_frac_prim.

S10302: Calculate the pitch period reference value of the secondary channel signal.

The pitch period reference value f_pitch_prim of the secondary channel signal is calculated by using the following formula:

$$f\_pitch\_prim = loc\_T0 + loc\_frac\_prim/4.0.$$

S10303: Calculate the frame structure similarity value.

The frame structure similarity value ol_pitch is calculated by using the following formula:

$$ol\_pitch = T\_op - f\_pitch\_prim;$$ where

T_op is an open-loop pitch period obtained through open-loop pitch analysis of the secondary channel signal.

S10304: Determine whether the frame structure similarity value falls within the frame structure similarity interval, and select a corresponding method to encode the pitch period of the secondary channel signal based on a result of the determining.

If the frame structure similarity falls within the frame structure similarity interval, the pitch period differential encoding method for the secondary channel signal is used to encode the pitch period of the secondary channel signal. If the frame structure similarity falls outside the frame structure similarity interval, the pitch period independent encoding method for the secondary channel signal is used to encode the pitch period of the secondary channel signal.

Specifically, it may be determined whether the frame structure similarity value falls within the frame structure similarity interval. For example, it is determined whether ol_pitch meets down_limit<ol_pitch<up_limit, where down_limit and up_limit are respectively a lower limit threshold and an upper limit threshold of a user-defined frame structure similarity interval. For example, in this embodiment of this application, a plurality of frame structure similarity intervals may be set, for example, frame structure similarity intervals of three levels may be set. For example, a minimum value of the lowest-level frame structure similarity interval is −4.0, and a maximum value of the lowest-level frame structure similarity interval is 3.75; a minimum value of the medium-level frame structure similarity interval is −2.0, and a maximum value of the medium-level frame structure similarity interval is 1.75; a minimum value of the highest-level frame structure similarity interval is −1.0, and a maximum value of the highest-level frame structure similarity interval is 0.75. Based on the foregoing frame structure similarity intervals of different levels, the following determining may be separately performed: −4.0<ol_pitch<3.75, −2.0<ol_pitch<1.75, or −1.0<ol_pitch<0.75.

When down_limit<ol_pitch<up_limit is satisfied, it indicates that the frame structure similarity value falls within the frame structure similarity interval, and step S11 of performing independent encoding on the pitch period of the secondary channel signal is executed. Otherwise, step S12 of performing differential encoding on the pitch period of the secondary channel signal is executed.

S11: Perform independent encoding on the pitch period of the secondary channel signal.

The secondary channel signal uses an independent encoding scheme, a correlation between the primary channel signal and the secondary channel signal is not considered, and the estimated pitch period value is independently searched for and encoded. The encoding scheme is the same as that of primary channel signal encoding and pitch period detection in the foregoing step S08.

S12: Perform differential encoding on the pitch period of the secondary channel signal.

In this embodiment, pitch period encoding is performed based on subframes, the primary channel signal is divided into five subframes, and the secondary channel signal is divided into four subframes. In this embodiment, pitch periods of the five subframes of the primary channel signal are mapped to pitch period reference values of the four subframes of the secondary channel signal by using an interpolation method. That is, an integer part of a closed-loop pitch period mapping value of the primary channel signal is loc_T0, and a fractional part is loc_frac_prim. In this embodiment, a process of performing encoding on the pitch period of the secondary channel signal is as follows:

S121: Perform secondary channel signal closed-loop pitch period search based on the pitch period of the primary channel signal, to obtain an estimated pitch period value of the secondary channel signal.

S12101: Determine the pitch period reference value of the secondary channel signal based on the pitch period of the primary channel signal. One method is to directly use the pitch period of the primary channel signal as the pitch period reference value of the secondary channel signal. That is, four values are selected from the pitch periods of the five subframes of the primary channel signal as the pitch period reference values of the four subframes of the secondary channel signal. In another method, the pitch periods of the five subframes of the primary channel signal are mapped to pitch period reference values of the four subframes of the secondary channel signal by using an interpolation method. According to either of the foregoing methods, the closed-loop pitch period reference value of the secondary channel signal can be obtained, where an integer part is loc_T0, and a fractional part is loc_frac_prim.

S12102: Perform secondary channel signal closed-loop pitch period search based on the pitch period reference value of the secondary channel signal, to determine the pitch period of the secondary channel signal. Specifically, closed-loop pitch period search is performed by using integer precision and downsampling fractional precision and by using the closed-loop pitch period reference value of the secondary channel signal as a start point of the secondary channel signal closed-loop pitch period search, and an interpolated normalized correlation is computed to obtain the estimated pitch period value of the secondary channel signal.

For example, one method is to use 2 bits (bits) for encoding of the pitch period of the secondary channel signal.

Specifically, integer precision search is performed, by using loc_T0 as a search start point, for the pitch period of the secondary channel signal within a range of [loc_T0−1, loc_T0+1], and then fractional precision search is performed, by using loc_frac_prim as an initial value for each search point, for the pitch period of the secondary channel signal within a range of [loc_frac_prim+2, loc_frac_prim+3], [loc_frac_prim, loc_frac_prim−3], or [loc_frac_prim−2, loc_frac_prim+1]. An interpolated normalized correlation corresponding to each search point is computed, and a similarity of a plurality of search points in one frame is computed. When a maximum value of an interpolated normalized correlation is obtained, the search point corresponding to the interpolated normalized correlation is an optimum estimated pitch period value of the secondary channel signal, where an integer part is pitch_soft_reuse, and a fractional part is pitch_frac_soft_reuse.

For another example, another method is to use 3 bits to 5 bits to encode the pitch period of the secondary channel signal.

Specifically, when 3 bits to 5 bits are used to encode the pitch period of the secondary channel signal, search radiuses half range are 1, 2, and 4 respectively. Integer precision search is performed, by using loc_T0 as a search start point, for the pitch period of the secondary channel signal within a range of [loc_T0−half range, loc_T0+half range], and then an interpolated normalized correlation corresponding to each search point is computed, by using loc_frac_prim as an initial value for each search point, within a range of [loc_frac_prim, loc_frac_prim−1], or [loc_frac_prim, loc_frac_prim+3]. When a maximum value of an interpolated normalized correlation is obtained, the search point corresponding to the interpolated normalized correlation is an optimum estimated pitch period value of the secondary channel signal, where an integer part is pitch_soft_reuse, and a fractional part is pitch_frac_soft_reuse.

S122: Perform differential encoding by using the pitch period of the primary channel signal and the pitch period of the secondary channel signal. Specifically, the following process may be included.

S12201: Calculate an upper limit of a pitch period index of the secondary channel signal in differential encoding.

The upper limit of the pitch period index of the secondary channel signal is calculated by using the following formula:

$$soft\_reuse\_index\_high\_limit=2^{Z};\text{ where}$$

Z is a pitch period search range adjustment factor of the secondary channel. In this embodiment, Z=3, 4, or 5.

S12202: Calculate the pitch period index value of the secondary channel signal in differential encoding.

The pitch period index of the secondary channel signal represents a result of performing differential encoding on a difference between the pitch period reference value of the secondary channel signal obtained in the foregoing step and the optimum estimated pitch period value of the secondary channel signal.

The pitch period index value soft_reuse_index of the secondary channel signal is calculated by using the following formula:

$$soft\_reuse\_index=(4*pitch\_soft\_reuse+pitch\_frac\_soft\_reuse)-(4*loc\_T0+loc\_frac\_prim)+soft\_reuse\_index\_high\_limit/2.$$

S12203: Perform differential encoding on the pitch period index of the secondary channel signal.

For example, residual encoding is performed on the pitch period index soft_reuse_index of the secondary channel signal.

In this embodiment of this application, a pitch period encoding method for the secondary channel signal is used. Each coded frame is divided into four subframes (subframe), and differential encoding is performed on a pitch period of each subframe. The method can save 22 bits or 18 bits compared with pitch period independent encoding for the secondary channel signal, and the saved bits may be allocated to other encoding parameters for quantization and encoding. For example, the saved bit overheads may be allocated to a fixed codebook (fixed codebook).

Encoding of other parameters of the primary channel signal and the secondary channel signal is completed by using this embodiment of this application, to obtain encoded bitstreams of the primary channel signal and the secondary channel signal, and the encoded data is written into a stereo encoded bitstream based on a specific bitstream format requirement.

The following describes an effect of reducing encoding overheads of the secondary channel signal in this embodiment of this application by using an example. For a pitch period independent encoding scheme for the secondary channel signal, quantities of pitch period encoding bits allocated to four subframes are respectively 10, 6, 9, and 6. That is, 31 bits are required for encoding each frame. However, according to the pitch period differential encoding method for the secondary channel signal provided in this embodiment of this application, only three bits are required for differential encoding in each subframe, and one additional bit is required for encoding a frame structure similarity determining result parameter (a value of 0 or 1).

Therefore, according to the method in this embodiment of this application, only 31−4×3=13 bits are required for each frame to encode the pitch period of the secondary channel signal. That is, 18 bits may be saved and allocated to other encoding parameters, such as fixed codebook parameters.

It is assumed that the secondary channel pitch period obtained through independent encoding is an accurate value. Accuracy of the secondary channel pitch period obtained by using the method in this embodiment of this application is evaluated. When the secondary channel pitch period search range adjustment factor Z is 3, 4, or 5, secondary channel pitch period accuracy corresponding to the frame structure similarity intervals of the high, medium, and low levels is shown in the following Table 1.

| | High level | Medium level | Low level |
|---|---|---|---|
| Proportion of frames that meet the condition | 17% | 39% | 55% |
| Z = 3 | 91% | 84% | 73% |
| Z = 4 | 97% | 93% | 86% |
| Z = 5 | 99% | 98% | 95% |

Figure 7:
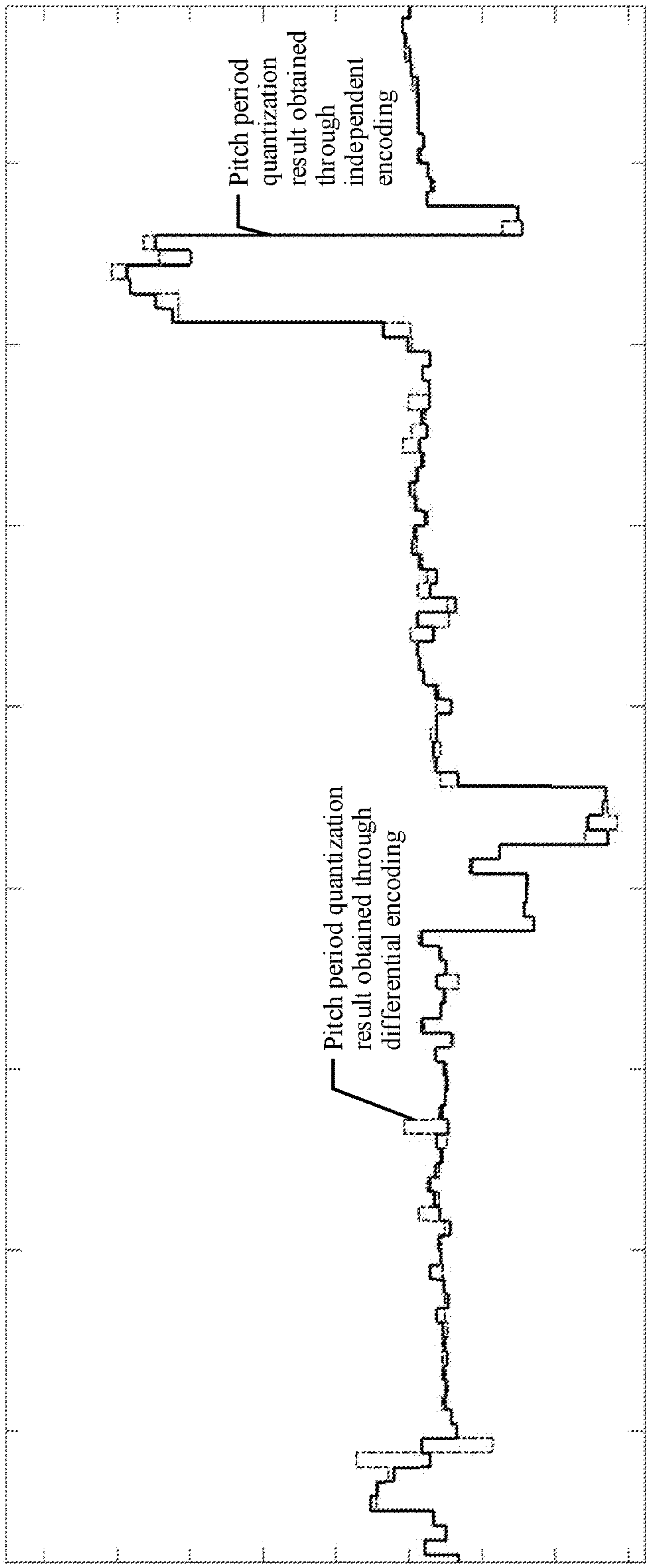
FIG. 7 is a diagram of comparison between a pitch period quantization result obtained by using an independent encoding scheme and a pitch period quantization result obtained by using a differential encoding scheme.

FIG. 7 is a diagram of comparison between a pitch period quantization result obtained by using an independent encoding scheme and a pitch period quantization result obtained by using a differential encoding scheme. The solid line is a quantized pitch period value obtained after independent encoding, and the dashed line is a quantized pitch period value obtained after differential encoding. In FIG. 7, when Z=3 and the low-level frame structure similarity interval is used, it can be learned that the independent encoding result can be accurately represented by using the pitch period differential encoding method for the secondary channel signal. As a value of Z increases, when the high-level frame structure similarity interval is used, the independent encoding result can be more accurately represented by using the pitch period differential encoding method for the secondary channel signal.

It can be learned that when the secondary channel pitch period is encoded by using three bits, about 17% of encoded frames meet the high-level frame structure similarity interval, and in this case, the accuracy of the secondary channel pitch period encoding can reach 91%. Compared with secondary channel independent encoding, differential encoding saves 18 bits. When the secondary channel pitch period is encoded by using five bits, about 55% of encoded frames meet the low-level frame structure similarity interval, and in this case, the accuracy of the secondary channel pitch period encoding can reach 95%. Compared with secondary channel independent encoding, differential encoding saves 10 bits. Therefore, a user may select a secondary channel pitch period search range adjustment factor and frame structure similarity intervals of different levels based on an actual transmission bandwidth limit and an encoding precision requirement. In different configurations, bits for encoding the secondary channel pitch period can be saved.

Figure 8:
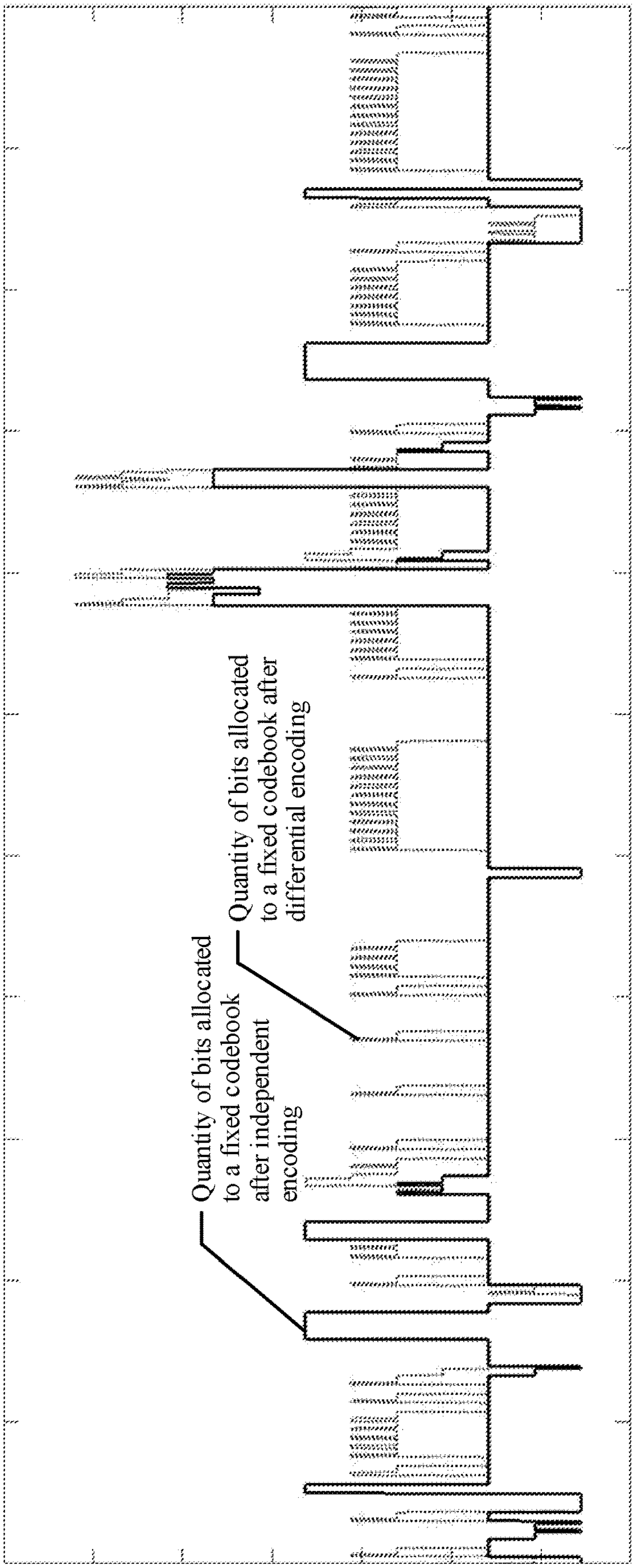
FIG. 8 is a diagram of comparison between a quantity of bits allocated to a fixed codebook after an independent encoding scheme is used and a quantity of bits allocated to a fixed codebook after a differential encoding scheme is used.

FIG. 8 is a diagram of comparison between a quantity of bits allocated to a fixed codebook after an independent encoding scheme is used and a quantity of bits allocated to a fixed codebook after a differential encoding scheme is used. The solid line indicates a quantity of bits allocated to the fixed codebook after independent encoding, and the dashed line indicates a quantity of bits allocated to the fixed codebook after differential encoding. It can be learned from FIG. 8 that a large quantity of bit resources saved by using the differential encoding oriented to the pitch period of the secondary channel signal are allocated for quantization and encoding of the fixed codebook, so that encoding quality of the secondary channel signal is improved.

The following describes a stereo decoding algorithm executed by the decoder side by using an example, and the following procedure is mainly performed.

S13: Read soft_pitch_reuse_flag from a bitstream.

S14: Perform differential decoding on a pitch period of a secondary channel when the following conditions are met: the secondary channel is encoded and an encoding rate is relatively high, both a primary channel and the secondary channel are in generic coding mode, and soft_pitch_reuse_flag=1; otherwise, perform independent decoding on the pitch period of the secondary channel.

For example, a secondary channel pitch period reuse flag is soft_pitch_reuse_flag, and a signal type flag of the primary and secondary channels is both_chan_generic. For example, during secondary channel decoding, the signal type flag both_chan_generic of the primary channel and the secondary channel is read from the bitstream. When both_chan_generic is 1, the secondary channel pitch period reuse flag soft_pitch_reuse_flag is read from the bitstream. When a frame structure similarity value falls within a frame structure similarity interval, soft_pitch_reuse_flag is 1, the differential decoding method in this embodiment of this application is performed; or when the frame structure similarity value falls outside the frame structure similarity interval, soft_pitch_reuse_flag is 0, and the independent decoding method is performed. For example, in this embodiment of this application, the differential decoding process is performed only when both soft_pitch_reuse_flag and both_chan_generic are 1.

S1401: Perform pitch period mapping.

In this embodiment, pitch period encoding is performed based on subframes, the primary channel is divided into five subframes, and the secondary channel is divided into four subframes. A pitch period reference value of the secondary channel is determined based on an estimated pitch period value of the primary channel signal. One method is to directly use a pitch period of the primary channel as the pitch period reference value of the secondary channel. That is, four values are selected from pitch periods of the five subframes of the primary channel as pitch period reference values of the four subframes of the secondary channel. In another method, the pitch periods of the five subframes of the primary channel are mapped to pitch period reference values of the four subframes of the secondary channel by using an interpolation method. According to either of the foregoing methods, an integer part loc_T0 and a fractional part loc_frac_prim of a closed-loop pitch period of the secondary channel signal can be obtained.

S1402: Calculate a closed-loop pitch period reference value of the secondary channel.

The closed-loop pitch period reference value f_pitch_prim of the secondary channel is calculated by using the following formula:

$$f\_pitch\_prim = loc\_T0 + loc\_frac\_prim/4.0.$$

S1403: Calculate an upper limit of a pitch period index of the secondary channel in differential encoding.

The upper limit of the pitch period index of the secondary channel is calculated by using the following formula:

$$soft\_reuse\_index\_high\_limit = 0.5 + 2^{Z}$$

Z is a pitch period search range adjustment factor of the secondary channel. In this embodiment, Z may be 3, 4, or 5.

S1404: Read the pitch period index value soft_reuse_index of the secondary channel from the bitstream.

S1405: Calculate an estimated pitch period value of the secondary channel signal.

$$T0\_pitch=f\_pitch\_prim+(soft\_reuse\_index-soft\_reuse\_index\_high\_limit/2.0)/4.0;$$

where

T0=INT(T0_pitch), and

T0_frac=(T0_pitch−T0)*4.0.

INT(T0_pitch) indicates to round down T0_pitch to the nearest integer, T0 indicates to decode the integer part of the pitch period of the secondary channel, and T0_frac indicates to decode the fractional part of the pitch period of the secondary channel.

Figure 9:
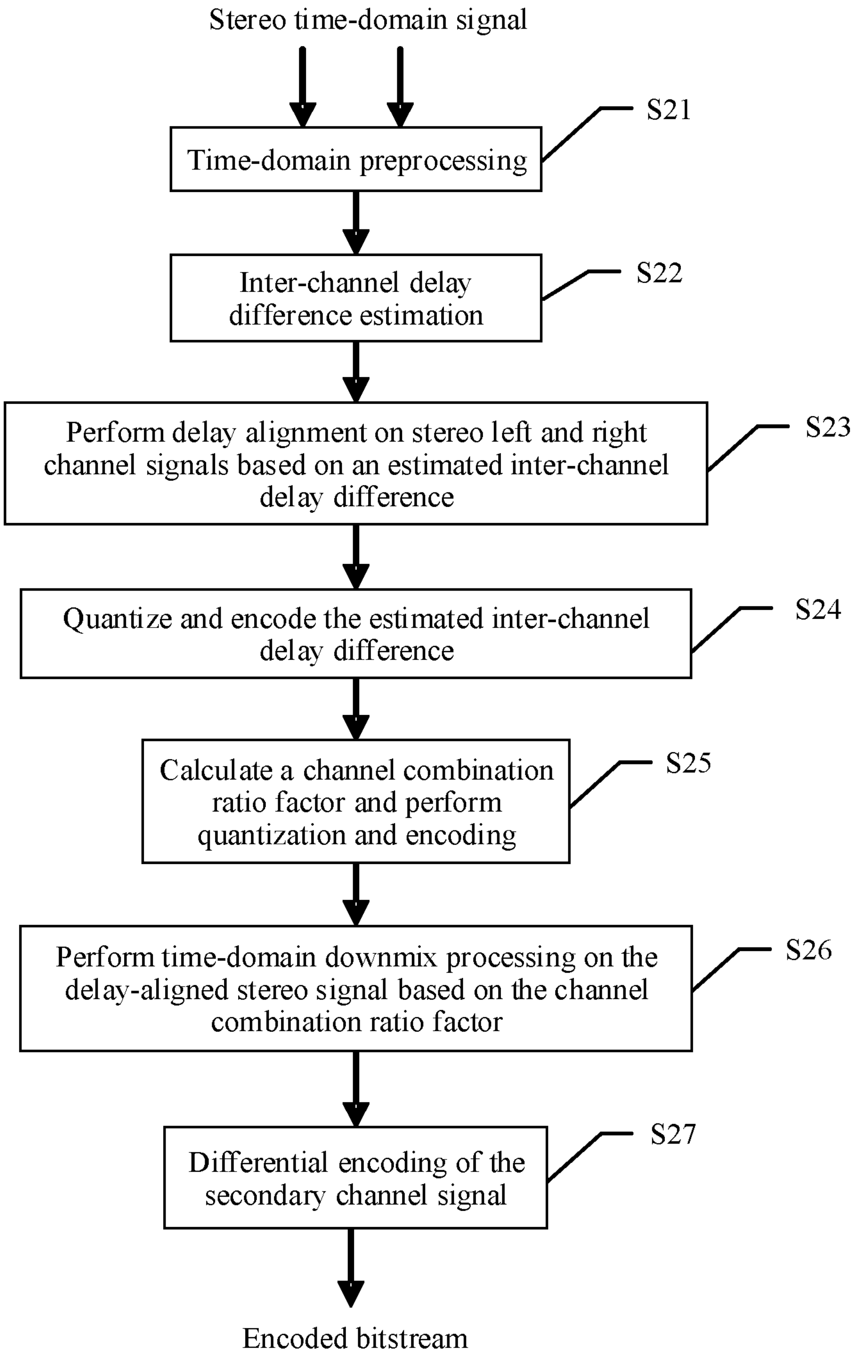
FIG. 9 is a schematic diagram of a time-domain stereo encoding method according to an embodiment of this application.

The stereo encoding and decoding processes in frequency domain are described in the foregoing embodiments. When the embodiments of this application are applied to time-domain stereo encoding, steps S01 to S07 in the foregoing embodiment are replaced by the following steps S21 to S26. FIG. 9 is a schematic diagram of a time-domain stereo encoding method according to an embodiment of this application.

S21: Perform time-domain preprocessing on a stereo time-domain signal to obtain preprocessed stereo left and right channel signals.

If a sampling rate of a stereo audio signal is 16 KHz, one frame of signal is 20 ms, and a frame length is denoted as N, N=320, that is, the frame length is equal to 320 sampling points. A stereo signal of a current frame includes a left channel time-domain signal of the current frame and a right channel time-domain signal of the current frame. The left channel time-domain signal of the current frame is denoted as $x_L(n)$, and the right channel time-domain signal of the current frame is denoted as $x_R(n)$, where n is a sampling point number, and n=0, 1, . . . , N−1.

Performing time-domain preprocessing on the left and right channel time-domain signals of the current frame may specifically include: performing high-pass filtering on the left and right channel time-domain signals of the current frame, to obtain preprocessed left and right channel time-domain signals of the current frame. The preprocessed left channel time-domain signal of the current frame is denoted as $\tilde{x}_L(n)$, and the preprocessed right channel time-domain signal of the current frame is denoted as $\tilde{x}_R(n)$, where n is a sampling point number, and n=0, 1, . . . , N−1.

It may be understood that performing time-domain preprocessing on the left and right channel time-domain signals of the current frame is not a necessary step. If there is no time-domain preprocessing step, left and right channel signals used for delay estimation are left and right channel signals in the original stereo signal. The left and right channel signals in the original stereo signal refer to a collected PCM signal obtained after A/D conversion. A sampling rate of the signal may include 8 KHz, 16 KHz, 32 KHz, 44.1 KHz, and 48 KHz.

In addition, in addition to the high-pass filtering described in this embodiment, the preprocessing may further include other processing, for example, pre-emphasis processing. This is not limited in this embodiment of this application.

S22: Perform delay estimation based on the preprocessed left and right channel time-domain signals of the current frame, to obtain an estimated inter-channel delay difference of the current frame.

Specifically, a cross-correlation function between the left and right channels may be calculated based on the preprocessed left and right channel time-domain signals of the current frame. Then, a maximum value of the cross-correlation function is searched for as the estimated inter-channel delay difference of the current frame.

It is assumed that $T_{max}$ corresponds to a maximum value of the inter-channel delay difference at a current sampling rate, and $T_{min}$ corresponds to a minimum value of the inter-channel delay difference at the current sampling rate. $T_{max}$ and $T_{min}$ are preset real numbers, and $T_{max}>T_{min}$. In this embodiment, $T_{max}$ is equal to 40, $T_{min}$ is equal to −40, a maximum value of a cross-correlation coefficient c(i) between the left and right channels is searched for within a range of $T_{min}\le i\le T_{max}$, to obtain an index value corresponding to the maximum value, and the index value is used as the estimated inter-channel delay difference of the current frame, and is denoted as cur_itd.

There are many other specific delay estimation methods in this embodiment of this application. This is not limited. For example, the cross-correlation function between the left and right channels may be calculated based on the preprocessed left and right channel time-domain signals of the current frame or based on the left and right channel time-domain signals of the current frame. Then, long-time smoothing is performed based on a cross-correlation function between left and right channels of the previous L frames (L is an integer greater than or equal to 1) and the calculated cross-correlation function between the left and right channels of the current frame, to obtain a smoothed cross-correlation function between the left and right channels. Then, a maximum value of a smoothed cross-correlation coefficient between the left and right channels is searched for within a range of $T_{min}\le i\le T_{max}$, to obtain an index value corresponding to the maximum value, and the index value is used as the estimated inter-channel delay difference of the current frame. The methods may further include: performing inter-frame smoothing on an inter-channel delay difference of the previous M frames (M is an integer greater than or equal to 1) and an estimated inter-channel delay difference of the current frame, and using a smoothed inter-channel delay difference as the final estimated inter-channel delay difference of the current frame. This embodiment of this application is not limited to the foregoing delay estimation methods.

For the estimated inter-channel delay difference of the current frame, a maximum value of the cross-correlation coefficient c(i) between the left and right channels is searched for within the range of $T_{min}\le i\le T_{max}$, to obtain an index value corresponding to the maximum value.

S23: Perform delay alignment on the stereo left and right channel signals based on the estimated inter-channel delay difference of the current frame, to obtain a delay-aligned stereo signal.

In this embodiment of this application, there are many methods for performing delay alignment on the stereo left and right channel signals. For example, one or two channels of the stereo left and right channel signals are compressed or stretched based on the estimated inter-channel delay difference of the current frame and an inter-channel delay difference of a previous frame, so that no inter-channel delay difference exists in the two signals of the delay-aligned stereo signal. This embodiment of this application is not limited to the foregoing delay alignment method.

A delay-aligned left channel time-domain signal of the current frame is denoted as $x_L'(n)$, and a delay-aligned right channel time-domain signal of the current frame is denoted as $x_R'(n)$, where n is a sampling point number, and n=0, 1, . . . , N−1.

S24: Quantize and encode the estimated inter-channel delay difference of the current frame.

There may be a plurality of methods for quantizing the inter-channel delay difference. For example, quantization processing is performed on the estimated inter-channel delay difference of the current frame, to obtain a quantized index, and then the quantized index is encoded. The quantized index is written into a bitstream after being quantized.

S25: Calculate a channel combination ratio factor based on the delay-aligned stereo signal, perform quantization and encoding on the channel combination ratio factor, and write a quantized and encoded result into the bitstream.

There are many methods for calculating the channel combination ratio factor. For example, in a method for calculating the channel combination ratio factor in this embodiment of this application, frame energy of the left and right channels is first calculated based on the delay-aligned left and right channel time-domain signals of the current frame.

The frame energy rms_L of the left channel of the current frame meets:

$$\text{rms\_}L=\frac{1}{N}\sum_{i=0}^{N-1}x_L'(i)*x_L'(i);$$

the frame energy rms_R of the right channel of the current frame meets:

$$\text{rms\_}R=\frac{1}{N}\sum_{i=0}^{N-1}x_R'(i)*x_R'(i);$$

where $x_L'(n)$ is the delay-aligned left channel time-domain signal of the current frame, and $x_R'(n)$ is the delay-aligned right channel time-domain signal of the current frame.

Then, the channel combination ratio factor of the current frame is calculated based on the frame energy of the left and right channels.

The calculated channel combination ratio factor ratio of the current frame meets:

$$\text{ratio}=\frac{\text{rms\_}R}{\text{rms\_}L+\text{rms\_}R}.$$

Finally, the calculated channel combination ratio factor of the current frame is quantized, to obtain a quantized index ratio_idx corresponding to the ratio factor and a quantized channel combination ratio factor $\text{ratio}_{qua}$ of the current frame:

$\text{ratio}_{qua}$=ratio_tabl[ratio_idx]; where ratio_tabl is a scalar quantization codebook. Quantization and encoding may be performed by using any scalar quantization method in the embodiments of this application, for example, uniform scalar quantization or non-uniform scalar quantization. A quantity of bits used for encoding may be 5 bits. A specific method is not described herein.

This embodiment of this application is not limited to the foregoing channel combination ratio factor calculation, quantization, and encoding method.

S26: Perform time-domain downmix processing on the delay-aligned stereo signal based on the channel combination ratio factor, to obtain a primary channel signal and a secondary channel signal.

Specifically, any time-domain downmix processing method in the embodiments of this application may be used. However, it should be noted that a corresponding time-domain downmix processing manner needs to be selected based on a method for calculating the channel combination ratio factor, to perform time-domain downmix processing on the delay-aligned stereo signal, to obtain the primary channel signal and the secondary channel signal.

For example, the foregoing method for calculating the channel combination ratio factor in step 25 is used, and corresponding time-domain downmix processing may be: performing time-domain downmix processing based on the channel combination ratio factor ratio. A primary channel signal Y(n) and a secondary channel signal X(n) that are obtained after time-domain downmix processing corresponding to a first channel combination solution meet:

$$\begin{bmatrix}Y(n)\\X(n)\end{bmatrix}=\begin{bmatrix}\text{ratio} & 1-\text{ratio}\\1-\text{ratio} & -\text{ratio}\end{bmatrix}*\begin{bmatrix}x_L'(n)\\x_R'(n)\end{bmatrix}.$$

This embodiment of this application is not limited to the foregoing time-domain downmix processing method.

S27: Perform differential encoding on the secondary channel signal.

For content included in step S27, refer to descriptions of step S10 to step S12 in the foregoing embodiment. Details are not described herein again.

It can be learned from the foregoing examples that, in this embodiment of this application, a frame structure similarity value is calculated based on parameters such as the primary channel signal type and the secondary channel signal type, and then whether to use pitch period differential encoding for the secondary channel signal is determined based on the frame structure similarity value and the frame structure similarity interval. In the differential encoding manner, encoding overheads of the pitch period of the secondary channel signal can be reduced.

It should be noted that, for brief description, the foregoing method embodiments are represented as a combination of a series of actions. However, a person skilled in the art should appreciate that this application is not limited to the described order of the actions, because according to this application, some steps may be performed in other orders or simultaneously.

To better implement the foregoing solutions in the embodiments of this application, the following further provides related apparatuses configured to implement the foregoing solutions.

Figure 10:
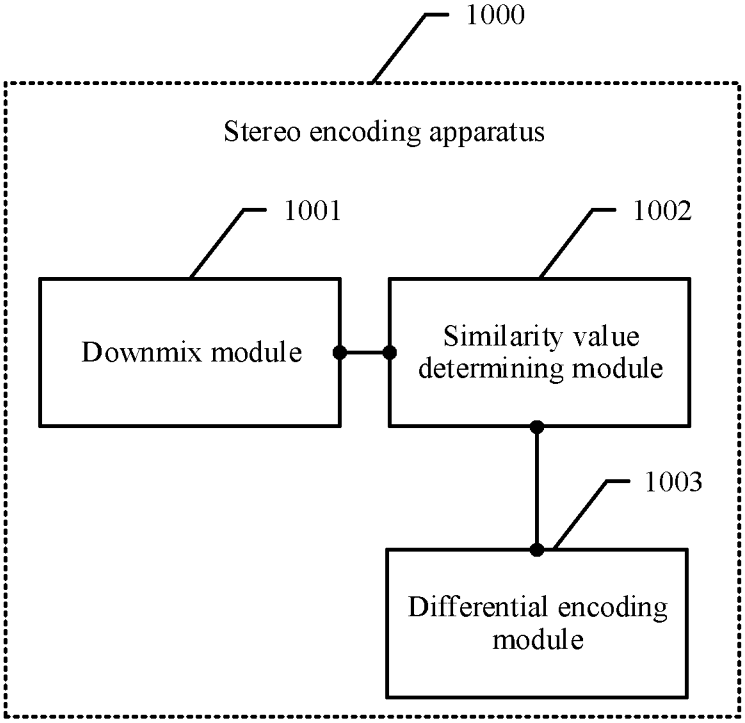
FIG. 10 is a schematic diagram of a composition structure of a stereo encoding apparatus according to an embodiment of this application.

As shown in FIG. 10, a stereo encoding apparatus 1000 provided in an embodiment of this application may include a downmix module 1001, a similarity value determining module 1002, and a differential encoding module 1003.

The downmix module 1001 is configured to perform downmix processing on a left channel signal of a current frame and a right channel signal of the current frame, to obtain a primary channel signal of the current frame and a secondary channel signal of the current frame.

The similarity value determining module 1002 is configured to determine whether a frame structure similarity value between the primary channel signal and the secondary channel signal falls within a preset frame structure similarity interval.

The differential encoding module 1003 is configured to: when it is determined that the frame structure similarity value falls within the frame structure similarity interval, perform differential encoding on a pitch period of the secondary channel signal by using an estimated pitch period value of the primary channel signal, to obtain a pitch period index value of the secondary channel signal, where the pitch period index value of the secondary channel signal is used to generate a to-be-sent stereo encoded bitstream.

In some embodiments of this application, the stereo encoding apparatus further includes:

a signal type flag obtaining module, configured to: after the similarity value determining module determines whether the frame structure similarity value between the primary channel signal and the secondary channel signal falls within the preset frame structure similarity interval, obtain a signal type flag based on the primary channel signal and the secondary channel signal, where the signal type flag is used to identify a signal type of the primary channel signal and a signal type of the secondary channel signal; and a reuse flag configuration module, configured to: when the signal type flag is a preset first flag and the frame structure similarity value falls within the frame structure similarity interval, configure a secondary channel pitch period reuse flag to a second flag, where the first flag and the second flag are used to generate the stereo encoded bitstream.

In some embodiments of this application, the stereo encoding apparatus further includes:

the reuse flag configuration module, further configured to: when it is determined that the frame structure similarity value falls outside the frame structure similarity interval, or when the signal type flag is a preset third flag, configure the secondary channel pitch period reuse flag to a fourth flag, where the fourth flag and the third flag are used to generate the stereo encoded bitstream; and an independent encoding module, configured to separately encode the pitch period of the secondary channel signal and a pitch period of the primary channel signal.

In some embodiments of this application, the stereo encoding apparatus further includes:

an open-loop pitch period analysis module, configured to perform open-loop pitch period analysis on the secondary channel signal of the current frame, to obtain an estimated open-loop pitch period value of the secondary channel signal;

a closed-loop pitch period analysis module, configured to determine a closed-loop pitch period reference value of the secondary channel signal based on the estimated pitch period value of the primary channel signal and a quantity of subframes into which the secondary channel signal of the current frame is divided; and a similarity value calculation module, configured to determine the frame structure similarity value based on the estimated open-loop pitch period value of the secondary channel signal and the closed-loop pitch period reference value of the secondary channel signal.

In some embodiments of this application, the closed-loop pitch period analysis module is configured to: determine a closed-loop pitch period integer part loc_T0 of the secondary channel signal and a closed-loop pitch period fractional part loc_frac_prim of the secondary channel signal based on the estimated pitch period value of the primary channel signal; and calculate the closed-loop pitch period reference value f_pitch_prim of the secondary channel signal in the following manner:

$$f\_pitch\_prim = loc\_T0 + loc\_frac\_prim/N;$$ where

N represents the quantity of subframes into which the secondary channel signal is divided.

In some embodiments of this application, the similarity value calculation module is configured to calculate the frame structure similarity value ol_pitch in the following manner:

$$ol\_pitch = T\_op - f\_pitch\_prim;$$ where

T_op represents the estimated open-loop pitch period value of the secondary channel signal, and f_pitch_prim represents the closed-loop pitch period reference value of the secondary channel signal.

In some embodiments of this application, the differential encoding module includes:

a closed-loop pitch period search module, configured to perform secondary channel closed-loop pitch period search based on the estimated pitch period value of the primary channel signal, to obtain an estimated pitch period value of the secondary channel signal;

an index value upper limit determining module, configured to determine an upper limit of the pitch period index value of the secondary channel signal based on a pitch period search range adjustment factor of the secondary channel signal; and an index value calculation module, configured to calculate the pitch period index value of the secondary channel signal based on the estimated pitch period value of the primary channel signal, the estimated pitch period value of the secondary channel signal, and the upper limit of the pitch period index value of the secondary channel signal.

In some embodiments of this application, the closed-loop pitch period search module is configured to perform closed-loop pitch period search by using integer precision and fractional precision and by using the closed-loop pitch period reference value of the secondary channel signal as a start point of the secondary channel signal closed-loop pitch period search, to obtain the estimated pitch period value of the secondary channel signal, where the closed-loop pitch period reference value of the secondary channel signal is determined based on the estimated pitch period value of the primary channel signal and the quantity of subframes into which the secondary channel signal of the current frame is divided.

In some embodiments of this application, the index value upper limit determining module is configured to calculate the upper limit soft_reuse_index_high_limit of the pitch period index value of the secondary channel signal in the following manner:

$$soft\_reuse\_index\_high\_limit = 0.5 + 2^Z;$$ where

Z is the pitch period search range adjustment factor of the secondary channel signal, and a value of Z is 3, 4, or 5.

In some embodiments of this application, the index value calculation module is configured to: determine a closed-loop pitch period integer part loc_T0 of the secondary channel signal and a closed-loop pitch period fractional part loc_frac_prim of the secondary channel signal based on the estimated pitch period value of the primary channel signal; and calculate the pitch period index value soft_reuse_index of the secondary channel signal in the following manner:

$$soft\_reuse\_index=(N*pitch\_soft\_reuse+pitch\_frac\_soft\_reuse)-(N*loc\_T0+loc\_frac\_prim)+soft\_reuse\_index\_high\_limit/M;$$

where pitch_soft_reuse represents an integer part of the estimated pitch period value of the secondary channel signal, pitch_frac_soft_reuse represents a fractional part of the estimated pitch period value of the secondary channel signal, soft_reuse_index_high_limit represents the upper limit of the pitch period index value of the secondary channel signal, N represents a quantity of subframes into which the secondary channel signal is divided, M represents an adjustment factor of the upper limit of the pitch period index value of the secondary channel signal, M is a non-zero real number, * represents a multiplication operator, + represents an addition operator, and − represents a subtraction operator.

In some embodiments of this application, the stereo encoding apparatus is applied to a stereo encoding scenario in which an encoding rate of the current frame exceeds a preset rate threshold.

The rate threshold is at least one of the following values: 32 kilobits per second kbps, 48 kbps, 64 kbps, 96 kbps, 128 kbps, 160 kbps, 192 kbps, and 256 kbps.

In some embodiments of this application, a minimum value of the frame structure similarity interval is −4.0, and a maximum value of the frame structure similarity interval is 3.75; or a minimum value of the frame structure similarity interval is −2.0, and a maximum value of the frame structure similarity interval is 1.75; or a minimum value of the frame structure similarity interval is −1.0, and a maximum value of the frame structure similarity interval is 0.75.

Figure 11:
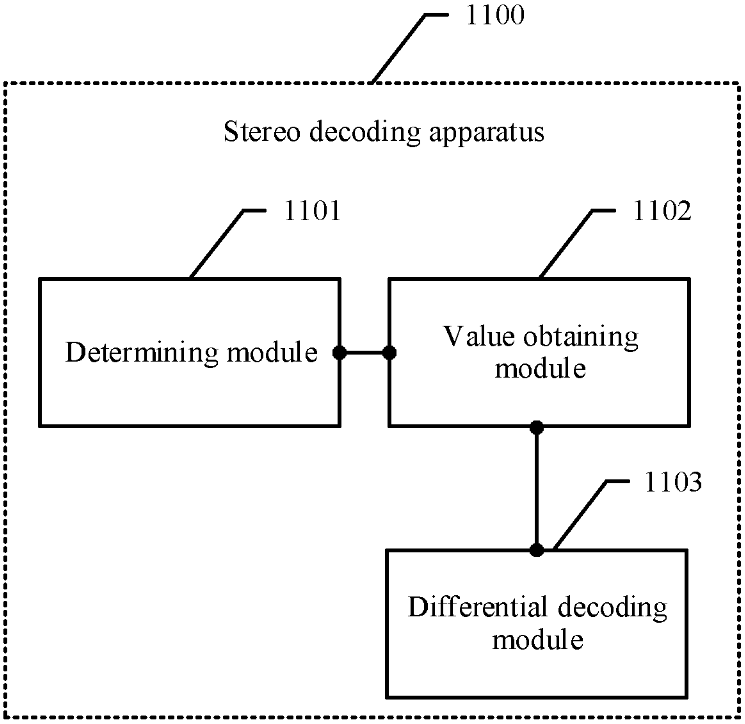
FIG. 11 is a schematic diagram of a composition structure of a stereo decoding apparatus according to an embodiment of this application.

As shown in FIG. 11, a stereo decoding apparatus 1100 provided in an embodiment of this application may include a determining module 1101, a value obtaining module 1102, and a differential decoding module 1103.

The determining module 1101 is configured to determine, based on a received stereo encoded bitstream, whether to perform differential decoding on a pitch period of a secondary channel signal.

The value obtaining module 1102 is configured to: when it is determined to perform differential decoding on the pitch period of the secondary channel signal, obtain, from the stereo encoded bitstream, an estimated pitch period value of a primary channel signal of a current frame and a pitch period index value of the secondary channel signal of the current frame.

The differential decoding module 1103 is configured to perform differential decoding on the pitch period of the secondary channel signal based on the estimated pitch period value of the primary channel signal and the pitch period index value of the secondary channel signal, to obtain an estimated pitch period value of the secondary channel signal, where the estimated pitch period value of the secondary channel signal is used for decoding to obtain a stereo decoded bitstream.

In some embodiments of this application, the determining module is configured to: obtain a secondary channel signal pitch period reuse flag and a signal type flag from the current frame, where the signal type flag is used to identify a signal type of the primary channel signal and a signal type of the secondary channel signal; and when the signal type flag is a preset first flag and the secondary channel signal pitch period reuse flag is a second flag, determine to perform differential decoding on the pitch period of the secondary channel signal.

In some embodiments of this application, the stereo decoding apparatus further includes:

an independent decoding module, configured to: when the signal type flag is a preset first flag and the secondary channel signal pitch period reuse flag is a fourth flag, or when the signal type flag is a preset third identifier and the secondary channel signal pitch period reuse flag is a fourth flag, separately decode the pitch period of the secondary channel signal and a pitch period of the primary channel signal.

In some embodiments of this application, the differential decoding module includes:

a reference value determining submodule, configured to determine a closed-loop pitch period reference value of the secondary channel signal based on the estimated pitch period value of the primary channel signal and a quantity of subframes into which the secondary channel signal of the current frame is divided;

an index value upper limit determining submodule, configured to determine an upper limit of the pitch period index value of the secondary channel signal based on a pitch period search range adjustment factor of the secondary channel signal; and an estimated value calculation submodule, configured to calculate the estimated pitch period value of the secondary channel signal based on the closed-loop pitch period reference value of the secondary channel signal, the pitch period index value of the secondary channel signal, and the upper limit of the pitch period index value of the secondary channel signal.

In some embodiments of this application, the estimated value calculation submodule is configured to calculate the estimated pitch period value T0_pitch of the secondary channel signal in the following manner:

$$T0\_pitch=f\_pitch\_prim+(soft\_reuse\_index-soft\_reuse\_index\_high\_limit/M)/N;$$ where f_pitch_prim represents the closed-loop pitch period reference value of the secondary channel signal, soft_reuse_index represents the pitch period index value of the secondary channel signal, N represents the quantity of subframes into which the secondary channel signal is divided, M represents an adjustment factor of the upper limit of the pitch period index value of the secondary channel signal, M is a non-zero real number, / represents a division operator, + represents an addition operator, and − represents a subtraction operator.

According to the description of the examples of the foregoing embodiment, in this embodiment of this application, because differential encoding is performed on the pitch period of the secondary channel signal by using the estimated pitch period value of the primary channel signal, the pitch period of the secondary channel signal does not need to be independently encoded. Therefore, a small quantity of bit resources may be allocated to the pitch period of the secondary channel signal for differential encoding, and differential encoding is performed on the pitch period of the secondary channel signal, so that a sense of space and sound image stability of the stereo signal can be improved. In addition, in this embodiment of this application, a relatively small quantity of bit resources are used to perform differential encoding on the pitch period of the secondary channel signal. Therefore, saved bit resources may be used for other stereo encoding parameters, so that encoding efficiency of the secondary channel is improved, and finally overall stereo encoding quality is improved. In this embodiment of this application, when differential decoding may be performed on the pitch period of the secondary channel signal, differential decoding may be performed on the pitch period of the secondary channel signal by using the estimated pitch period value of the primary channel signal. Differential decoding is performed on the pitch period of the secondary channel signal, so that a sense of space and sound image stability of the stereo signal can be improved. In addition, decoding efficiency of the secondary channel is further improved, and finally overall stereo decoding quality is improved.

It should be noted that content such as information exchange between the modules/units of the apparatus and the execution processes thereof is based on the same idea as the method embodiments of this application, and therefore brings the same technical effects as the method embodiments of this application. For the specific content, refer to the foregoing descriptions in the method embodiments of this application. The details are not described herein again.

An embodiment of this application further provides a computer storage medium. The computer storage medium stores a program. The program is executed to perform some or all of the steps set forth in the foregoing method embodiments.

Figure 12:
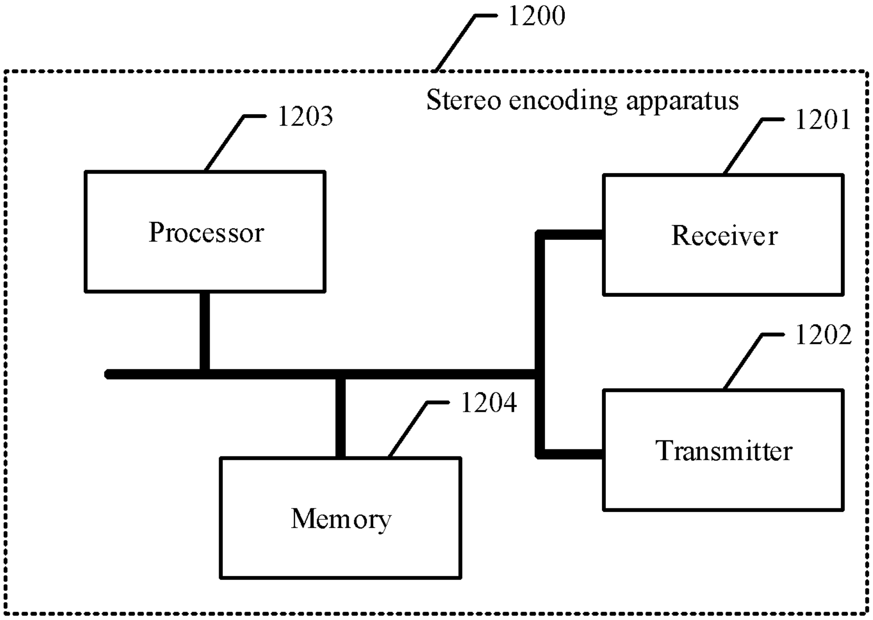
FIG. 12 is a schematic diagram of a composition structure of another stereo encoding apparatus according to an embodiment of this application.

The following describes another stereo encoding apparatus provided in an embodiment of this application. As shown in FIG. 12, the stereo encoding apparatus 1200 includes:

a receiver 1201, a transmitter 1202, a processor 1203, and a memory 1204 (there may be one or more processors 1203 in the stereo encoding apparatus 1200, and one processor is used as an example in FIG. 12). In some embodiments of this application, the receiver 1201, the transmitter 1202, the processor 1203, and the memory 1204 may be connected through a bus or in another manner. In FIG. 12, connection through a bus is used as an example.

The memory 1204 may include a read-only memory and a random access memory, and provide an instruction and data for the processor 1203. A part of the memory 1204 may further include a non-volatile random access memory (NVRAM). The memory 1204 stores an operating system and an operation instruction, an executable module or a data structure, a subset thereof, or an extended set thereof. The operation instruction may include various operation instructions to implement various operations. The operating system may include various system programs for implementing various basic services and processing hardware-based tasks.

The processor 1203 controls operations of the stereo encoding apparatus, and the processor 1203 may also be referred to as a central processing unit (CPU). In a specific application, components of the stereo encoding apparatus are coupled together by using a bus system. In addition to a data bus, the bus system includes a power bus, a control bus, a status signal bus, and the like. However, for clear description, various buses in the figure are referred to as the bus system.

The methods disclosed in the embodiments of this application may be applied to the processor 1203 or implemented by the processor 1203. The processor 1203 may be an integrated circuit chip and has a signal processing capability. In an implementation process, the steps in the foregoing methods may be completed by using a hardware integrated logic circuit in the processor 1203 or instructions in a form of software. The processor 1203 may be a general-purpose processor, a digital signal processor (DSP), an application-specific integrated circuit (ASIC), a field-programmable gate array (FPGA) or another programmable logic device, a discrete gate or a transistor logic device, or a discrete hardware component. The processor may implement or perform the methods, the steps, and logical block diagrams that are disclosed in the embodiments of this application. The general-purpose processor may be a microprocessor, or the processor may be any conventional processor, or the like. Steps of the methods disclosed with reference to the embodiments of this application may be directly performed and completed by a hardware decoding processor, or may be performed and completed by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory 1204, and the processor 1203 reads information in the memory 1204 and completes the steps in the foregoing methods in combination with hardware of the processor.

The receiver 1201 may be configured to: receive input digital or character information, and generate a signal input related to a related setting and function control of the stereo encoding apparatus. The transmitter 1202 may include a display device such as a display screen, and the transmitter 1202 may be configured to output digital or character information by using an external interface.

In this embodiment of this application, the processor 1203 is configured to perform the stereo encoding method performed by the stereo encoding apparatus shown in FIG. 4 in the foregoing embodiment.

Figure 13:
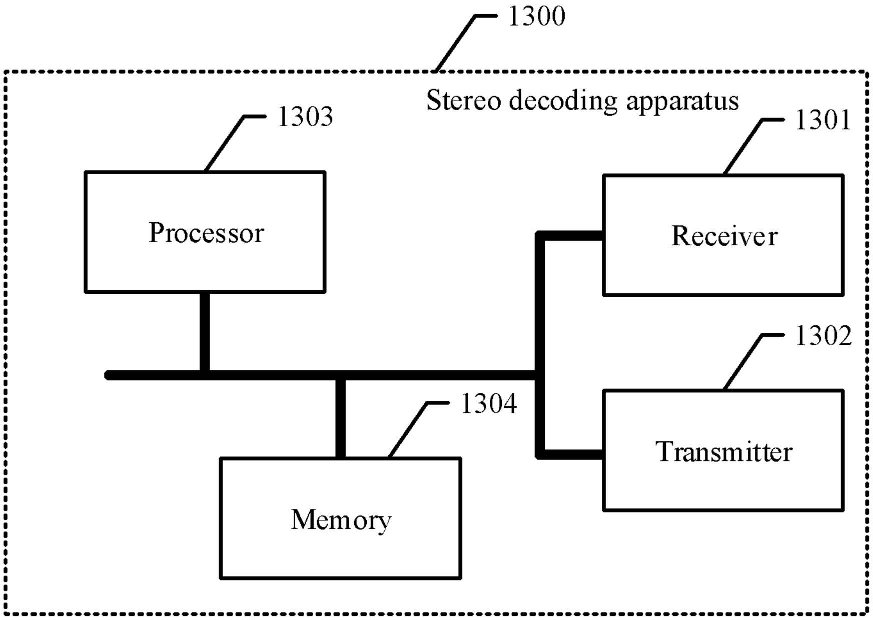
FIG. 13 is a schematic diagram of a composition structure of another stereo decoding apparatus according to an embodiment of this application.

The following describes another stereo decoding apparatus provided in an embodiment of this application. As shown in FIG. 13, the stereo decoding apparatus 1300 includes:

a receiver 1301, a transmitter 1302, a processor 1303, and a memory 1304 (there may be one or more processors 1303 in the stereo decoding apparatus 1300, and one processor is used as an example in FIG. 13). In some embodiments of this application, the receiver 1301, the transmitter 1302, the processor 1303, and the memory 1304 may be connected through a bus or in another manner. In FIG. 13, connection through a bus is used as an example.

The memory 1304 may include a read-only memory and a random access memory, and provide an instruction and data to the processor 1303. A part of the memory 1304 may further include an NVRAM. The memory 1304 stores an operating system and an operation instruction, an executable module or a data structure, a subset thereof, or an extended set thereof. The operation instruction may include various operation instructions to implement various operations. The operating system may include various system programs for implementing various basic services and processing hardware-based tasks.

The processor 1303 controls operations of the stereo decoding apparatus, and the processor 1303 may also be referred to as a CPU. In a specific application, components of the stereo decoding apparatus are coupled together by using a bus system. In addition to a data bus, the bus system includes a power bus, a control bus, a status signal bus, and the like. However, for clear description, various buses in the figure are referred to as the bus system.

The method disclosed in the foregoing embodiments of this application may be applied to the processor 1303, or may be implemented by the processor 1303. The processor 1303 may be an integrated circuit chip and has a signal processing capability. In an implementation process, steps in the foregoing methods can be implemented by using a hardware integrated logical circuit in the processor 1303, or by using instructions in a form of software. The foregoing processor 1303 may be a general-purpose processor, a DSP, an ASIC, an FPGA or another programmable logical device, a discrete gate or transistor logic device, or a discrete hardware component. The processor may implement or perform the methods, the steps, and logical block diagrams that are disclosed in the embodiments of this application. The general-purpose processor may be a microprocessor, or the processor may be any conventional processor, or the like. Steps of the methods disclosed with reference to the embodiments of this application may be directly performed and completed by a hardware decoding processor, or may be performed and completed by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory 1304, and the processor 1303 reads information in the memory 1304 and completes the steps in the foregoing methods in combination with hardware of the processor.

In this embodiment of this application, the processor 1303 is configured to perform the stereo decoding method performed by the stereo decoding apparatus shown in FIG. 4 in the foregoing embodiment.

In another possible design, when the stereo encoding apparatus or the stereo decoding apparatus is a chip in a terminal, the chip includes a processing unit and a communications unit. The processing unit may be, for example, a processor. The communications unit may be, for example, an input/output interface, a pin, or a circuit. The processing unit may execute a computer-executable instruction stored in a storage unit, to enable the chip in the terminal to execute the stereo encoding method according to any implementation of the foregoing first aspect. Optionally, the storage unit is a storage unit in the chip, for example, a register or a buffer; or the storage unit may be alternatively a storage unit outside the chip and in the terminal, for example, a read-only memory (ROM), another type of static storage device that can store static information and an instruction, or a random access memory (RAM).

The processor mentioned above may be a general-purpose central processing unit, a microprocessor, an ASIC, or one or more integrated circuits for controlling program execution of the method according to the first aspect or the second aspect.

In addition, it should be noted that the described apparatus embodiment is merely an example. The units described as separate parts may or may not be physically separate, and parts displayed as units may or may not be physical units, that is, may be located in one place, or may be distributed on a plurality of network units. Some or all the modules may be selected according to an actual need to achieve the objectives of the solutions of the embodiments. In addition, in the accompanying drawings of the apparatus embodiments provided by this application, connection relationships between modules indicate that the modules have communication connections with each other, which may be specifically implemented as one or more communications buses or signal cables.

Based on the description of the foregoing implementations, a person skilled in the art may clearly understand that this application may be implemented by using software in combination with necessary universal hardware, or certainly, may be implemented by using dedicated hardware, including a dedicated integrated circuit, a dedicated CPU, a dedicated memory, a dedicated component, or the like. Generally, any function that can be completed by using a computer program can be very easily implemented by using corresponding hardware. Moreover, a specific hardware structure used to implement a same function may be in various forms, for example, in a form of an analog circuit, a digital circuit, a dedicated circuit, or the like. However, as for this application, software program implementation is a better implementation in most cases. Based on such an understanding, the technical solutions of this application essentially or the part contributing to the conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a server, a network device, or the like) to perform the methods described in the embodiments of this application.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

What is claimed is:

1. A stereo encoding method, comprising:

performing downmix processing on a first left channel signal of a first frame and a first right channel signal of the first frame, to obtain a first primary channel signal of the first frame and a first secondary channel signal of the first frame;

determining that a first frame structure similarity value between the first primary channel signal and the first secondary channel signal falls within a preset frame structure similarity interval;

in response to determining that the first frame structure similarity value falls within the frame structure similarity interval, performing differential encoding on a first pitch period of the first secondary channel signal using an estimated pitch period value of the first primary channel signal, to obtain a first pitch period index value of the first secondary channel signal; and generating a to-be-sent stereo encoded bitstream according to the first pitch period index value of the first secondary channel signal.

2. The method according to claim 1, further comprises:

obtaining a first signal type flag based on the first primary channel signal and the first secondary channel signal, wherein the first signal type flag identifies a signal type of the first primary channel signal and a signal type of the first secondary channel signal; and in response to the signal type flag being a preset first flag and the first frame structure similarity value falling within the frame structure similarity interval, configuring a first secondary channel pitch period reuse flag to a second flag, wherein the first flag and the second flag are used to generate the stereo encoded bitstream.

3. The method according to claim 2, further comprises:

performing downmix processing on a second left channel signal of a second frame and a second right channel signal of the second frame, to obtain a second primary channel signal of the second frame and a second secondary channel signal of the second frame;

determining that a second frame structure similarity value between the second primary channel signal and the second secondary channel signal falls outside the preset frame structure similarity interval, or that a second signal type flag corresponding to the second frame is a preset third flag;

in response to determining that the second frame structure similarity value falls outside the frame structure similarity interval or that the second signal type flag corresponding to the second frame is the preset third flag, configuring a second secondary channel pitch period reuse flag corresponding to the second frame to a fourth flag, wherein the fourth flag and the third flag are used to generate the stereo encoded bitstream, wherein the second signal type flag identifies a signal type of the second primary channel signal and a signal type of the second secondary channel signal; and separately encoding a pitch period of the second secondary channel signal and a pitch period of the second primary channel signal.

4. The method according to claim 1, wherein the frame structure similarity value is determined in the following manner:

performing open-loop pitch period analysis on the first secondary channel signal, to obtain an estimated open-loop pitch period value of the first secondary channel signal;

determining a closed-loop pitch period reference value of the first secondary channel signal based on the estimated pitch period value of the first primary channel signal and a quantity of subframes of the first secondary channel signal; and determining the frame structure similarity value based on the estimated open-loop pitch period value and the closed-loop pitch period reference value.

5. The method according to claim 4, wherein the determining a closed-loop pitch period reference value of the first secondary channel signal based on an estimated pitch period value of the first primary channel signal and a quantity of subframes of the first secondary channel signal comprises:

determining a closed-loop pitch period integer part loc_T0 of the first secondary channel signal and a closed-loop pitch period fractional part loc_frac_prim of the first secondary channel signal based on the estimated pitch period value; and calculating the closed-loop pitch period reference value f_pitch_prim of the first secondary channel signal in the following manner:

$$f\_pitch\_prim = loc\_T0 + loc\_frac\_prim/N;$$ wherein

N represents the quantity of subframes of the first secondary channel signal.

6. The method according to claim 4, wherein the determining the frame structure similarity value based on the estimated open-loop pitch period value and the closed-loop pitch period reference value comprises:

calculating the frame structure similarity value ol_pitch in the following manner:

$$ol\_pitch = T\_op - f\_pitch\_prim;$$ wherein

T_op represents the estimated open-loop pitch period value of the first secondary channel signal, and f_pitch_prim represents the closed-loop pitch period reference value of the first secondary channel signal.

7. The method according to claim 1, wherein the performing differential encoding on a first pitch period of the first secondary channel signal using an estimated pitch period value of the first primary channel signal comprises:

performing secondary channel closed-loop pitch period search based on the estimated pitch period value of the first primary channel signal, to obtain an estimated pitch period value of the first secondary channel signal;

determining an upper limit of the pitch period index value of the first secondary channel signal based on a pitch period search range adjustment factor of the first secondary channel signal; and calculating the pitch period index value of the first secondary channel signal based on the estimated pitch period value of the first primary channel signal, the estimated pitch period value of the first secondary channel signal, and the upper limit of the pitch period index value of the first secondary channel signal.

8. The method according to claim 7, wherein the performing secondary channel closed-loop pitch period search based on the estimated pitch period value of the first primary channel signal, to obtain an estimated pitch period value of the first secondary channel signal comprises:

performing closed-loop pitch period search by using integer precision and fractional precision and by using the closed-loop pitch period reference value of the first secondary channel signal as a start point of the first secondary channel signal closed-loop pitch period search, to obtain the estimated pitch period value of the first secondary channel signal, wherein the closed-loop pitch period reference value of the first secondary channel signal is determined based on the estimated pitch period value of the first primary channel signal and the quantity of subframes of the first secondary channel signal.

9. The method according to claim 7, wherein the determining an upper limit of the pitch period index value of the first secondary channel signal based on a pitch period search range adjustment factor of the first secondary channel signal comprises:

calculating the upper limit soft_reuse_index_high_limit of the pitch period index value of the first secondary channel signal in the following manner:

$$soft\_reuse\_index\_high\_limit = 0.5 + 2^{Z};$$ wherein

Z is the pitch period search range adjustment factor of the first secondary channel signal.

10. The method according to claim 7, wherein the calculating the pitch period index value of the first secondary channel signal based on the estimated pitch period value of the first primary channel signal, the estimated pitch period value of the first secondary channel signal, and the upper limit of the pitch period index value of the first secondary channel signal comprises:

determining a closed-loop pitch period integer part loc_T0 of the first secondary channel signal and a closed-loop pitch period fractional part loc_frac_prim of the first secondary channel signal based on the estimated pitch period value of the first primary channel signal; and calculating the pitch period index value soft_reuse_index of the first secondary channel signal in the following manner:

soft_reuse_index=(N*pitch_soft_reuse+pitch_frac_soft_reuse)−(N*loc_T0+loc_frac_prim)+soft_reuse_index_high_limit/M;

wherein pitch_soft_reuse represents an integer part of the estimated pitch period value of the first secondary channel signal, pitch_frac_soft_reuse represents a fractional part of the estimated pitch period value of the first secondary channel signal, soft_reuse_index_high_limit represents the upper limit of the pitch period index value of the first secondary channel signal, N represents a quantity of subframes of the first secondary channel signal, M represents an adjustment factor of the upper limit of the pitch period index value of the first secondary channel signal, M is a non-zero real number, * represents a multiplication operator, + represents an addition operator, and − represents a subtraction operator.

11. A stereo encoding apparatus, comprising:

at least one processor; and one or more memories coupled to the at least one processor and storing programming instructions for execution by the at least one processor that, when executed by the at least one processor, cause the encoding apparatus to:

perform downmix processing on a first left channel signal of a first frame and a first right channel signal of the first frame, to obtain a first primary channel signal of the first frame and a first secondary channel signal of the first frame;

determine that a first frame structure similarity value between the first primary channel signal and the first secondary channel signal falls within a preset frame structure similarity interval;

in response to determining that the first frame structure similarity value falls within the frame structure similarity interval, perform differential encoding on a first pitch period of the first secondary channel signal using an estimated pitch period value of the first primary channel signal, to obtain a first pitch period index value of the first secondary channel signal; and generate a to-be-sent stereo encoded bitstream according to the first pitch period index value of the first secondary channel signal.

12. The apparatus according to claim 11, wherein the programming instructions for execution by the at least one processor, when executed by the at least one processor, cause the encoding apparatus further to:

obtain a first signal type flag based on the first primary channel signal and the first secondary channel signal, wherein the first signal type flag identifies a signal type of the first primary channel signal and a signal type of the first secondary channel signal; and in response to the signal type flag being a preset first flag and the first frame structure similarity value falling within the frame structure similarity interval, configure a first secondary channel pitch period reuse flag to a second flag, wherein the first flag and the second flag are used to generate the stereo encoded bitstream.

13. The apparatus according to claim 12, wherein the programming instructions for execution by the at least one processor, when executed by the at least one processor, cause the encoding apparatus further to:

perform downmix processing on a second left channel signal of a second frame and a second right channel signal of the second frame, to obtain a second primary channel signal of the second frame and a second secondary channel signal of the second frame;

determine that a second frame structure similarity value between the second primary channel signal and the second secondary channel signal falls outside the preset frame structure similarity interval, or that a second signal type flag corresponding to the second frame is a preset third flag;

in response to determining that the second frame structure similarity value falls outside the frame structure similarity interval, or that the second signal type flag corresponding to the second frame is the preset third flag, configure a second secondary channel pitch period reuse flag corresponding to the second frame to a fourth flag, wherein the fourth flag and the third flag are used to generate the stereo encoded bitstream, wherein the second signal type flag identifies a signal type of the second primary channel signal and a signal type of the second secondary channel signal; and separately encode a pitch period of the second secondary channel signal and a pitch period of the second primary channel signal.

14. The apparatus according to claim 11, wherein the programming instructions for execution by the at least one processor, when executed by the at least one processor, cause the encoding apparatus further to determine the frame structure similarity value in the following manner:

perform open-loop pitch period analysis on the first secondary channel signal, to obtain an estimated open-loop pitch period value of the first secondary channel signal;

determine a closed-loop pitch period reference value of the first secondary channel signal based on the estimated pitch period value of the first primary channel signal and a quantity of subframes of the first secondary channel signal; and determine the frame structure similarity value based on the estimated open-loop pitch period value and the closed-loop pitch period reference value.

15. The apparatus according to claim 14, wherein the programming instructions for execution by the at least one processor, when executed by the at least one processor cause the encoding apparatus further to:

determine a closed-loop pitch period integer part loc_T0 of the first secondary channel signal and a closed-loop pitch period fractional part loc_frac_prim of the first secondary channel signal based on the estimated pitch period value; and calculate the closed-loop pitch period reference value f_pitch_prim of the first secondary channel signal in the following manner:

$$f\_pitch\_prim=loc\_T0+loc\_frac\_prim/N;$$ wherein

N represents the quantity of subframes of the first secondary channel signal.

16. The apparatus according to claim 14, wherein the programming instructions for execution by the at least one processor, when executed by the at least one processor cause the encoding apparatus further to:

calculate the frame structure similarity value ol_pitch in the following manner:

$$ol\_pitch=T\_op-f\_pitch\_prim;$$ wherein

T_op represents the estimated open-loop pitch period value of the first secondary channel signal, and f_pitch_prim represents the closed-loop pitch period reference value of the first secondary channel signal.

17. The apparatus according to claim 11, wherein the programming instructions for execution by the at least one processor, when executed by the at least one processor cause the encoding apparatus further to:

perform secondary channel closed-loop pitch period search based on the estimated pitch period value of the first primary channel signal, to obtain an estimated pitch period value of the first secondary channel signal;

determine an upper limit of the pitch period index value of the first secondary channel signal based on a pitch period search range adjustment factor of the first secondary channel signal; and calculate the pitch period index value of the first secondary channel signal based on the estimated pitch period value of the first primary channel signal, the estimated pitch period value of the first secondary channel signal, and the upper limit of the pitch period index value of the first secondary channel signal.

18. The apparatus according to claim 17, wherein the programming instructions for execution by the at least one processor, when executed by the at least one processor cause the encoding apparatus further to:

perform closed-loop pitch period search by using integer precision and fractional precision and by using the closed-loop pitch period reference value of the first secondary channel signal as a start point of the first secondary channel signal closed-loop pitch period search, to obtain the estimated pitch period value of the first secondary channel signal, wherein the closed-loop pitch period reference value of the first secondary channel signal is determined based on the estimated pitch period value of the first primary channel signal and the quantity of subframes of the first secondary channel signal.

19. The apparatus according to claim 17, wherein the programming instructions for execution by the at least one processor, when executed by the at least one processor cause the encoding apparatus further to:

calculate the upper limit soft_reuse_index_high_limit of the pitch period index value of the first secondary channel signal in the following manner:

$$soft\_reuse\_index\_high\_limit=0.5+2^{Z};$$ wherein

Z is the pitch period search range adjustment factor of the first secondary channel signal.

20. The apparatus according to claim 17, wherein the programming instructions for execution by the at least one processor, when executed by the at least one processor cause the encoding apparatus further to:

determine a closed-loop pitch period integer part loc_T0 of the first secondary channel signal and a closed-loop pitch period fractional part loc_frac_prim of the first secondary channel signal based on the estimated pitch period value of the first primary channel signal; and calculate the pitch period index value soft_reuse_index of the first secondary channel signal in the following manner:

$$soft\_reuse\_index=(N*pitch\_soft\_reuse+pitch\_frac\_soft\_reuse)-(N*loc\_T0+loc\_frac\_prim)+soft\_reuse\_index\_high\_limit/M;$$ wherein pitch_soft_reuse represents an integer part of the estimated pitch period value of the first secondary channel signal, pitch_frac_soft_reuse represents a fractional part of the estimated pitch period value of the first secondary channel signal, soft_reuse_index_high_limit represents the upper limit of the pitch period index value of the first secondary channel signal, N represents a quantity of subframes of the first secondary channel signal, M represents an adjustment factor of the upper limit of the pitch period index value of the first secondary channel signal, M is a non-zero real number, * represents a multiplication operator, + represents an addition operator, and − represents a subtraction operator.

* * * * *